US011920378B2

(12) United States Patent
Barnett, III et al.

(10) Patent No.: US 11,920,378 B2
(45) Date of Patent: Mar. 5, 2024

(54) ELECTRONIC LOCK

(71) Applicant: dormakaba USA Inc., Indianapolis, IN (US)

(72) Inventors: Street Anthony Barnett, III, Watertown, MA (US); Brendon Allen, Upland, CA (US); John Andrew Snodgrass, Plainwell, MI (US); Shaine Strullmyer, Carmel, IN (US)

(73) Assignee: dormakaba USA, Inc, Indianapolis, IN (US)

( * ) Notice: Subject to any disclaimer, the term of this patent is extended or adjusted under 35 U.S.C. 154(b) by 0 days.

(21) Appl. No.: 17/419,682

(22) PCT Filed: Apr. 4, 2020

(86) PCT No.: PCT/US2020/026762

§ 371 (c)(1),
(2) Date: Jun. 29, 2021

(87) PCT Pub. No.: WO2020/206388

PCT Pub. Date: Oct. 8, 2020

(65) Prior Publication Data

US 2022/0042349 A1 Feb. 10, 2022

Related U.S. Application Data

(60) Provisional application No. 62/872,121, filed on Jul. 9, 2019, provisional application No. 62/829,778, filed on Apr. 5, 2019.

(51) Int. Cl.
*E05B 47/06* (2006.01)
*E05B 47/00* (2006.01)
(Continued)

(52) U.S. Cl.
CPC ...... *E05B 47/0603* (2013.01); *E05B 47/0012* (2013.01); *E05B 2047/0017* (2013.01);
(Continued)

(58) Field of Classification Search
CPC .. E05B 47/06; E05B 47/0607; E05B 47/0012; E05B 2047/0017;
(Continued)

(56) References Cited

U.S. PATENT DOCUMENTS 4,262,504 A 4/1981 Inoue
4,784,415 A 11/1988 Malaval
(Continued)

FOREIGN PATENT DOCUMENTS

CN 108590431 A 9/2018
KR 200204780 Y1 * 12/2000
WO 2014/186475 A1 11/2014

OTHER PUBLICATIONS

International Search Report and Written Opinion issued in PCT/US2020/026762, dated Jun. 18, 2020, 13 pages.
(Continued)

*Primary Examiner* — Alyson M Merlino
(74) *Attorney, Agent, or Firm* — Faegre Drinker Biddle & Reath LLP

(57) ABSTRACT

The present disclosure generally relates to a lock including a blocker (e.g., a bolt) useable to selectively prevent access through a portal such as a door. The blocker can be retained in a blocking position to prevent access through the portal by a retainer. In alternative embodiments, the blocker can also be retained in an open position to allow access through the portal. A retainer can be utilized to retain the blocker in the blocking position preventing access through the portal and can also be utilized, in certain embodiments, to retain the blocker in the open position to allow access through the
(Continued)

portal. A retainer blocker can be utilized to maintain the retainer in position to retain the blocker (e.g., bolt) in a fixed position. An actuator may, in certain alternative embodiments, be employed to position the retainer blocker. In certain embodiments, the actuator is controlled by an electronic controller.

12 Claims, 52 Drawing Sheets

(51) Int. Cl.
*E05B 65/00* (2006.01)
*E05B 65/02* (2006.01)

(52) U.S. Cl.
CPC . *E05B 2047/002* (2013.01); *E05B 2047/0036* (2013.01); *E05B 65/0075* (2013.01); *E05B 65/025* (2013.01)

(58) Field of Classification Search
CPC ....... E05B 2047/002; E05B 2047/0022; E05B 2047/0036; E05B 17/20; E05B 17/2007; E05B 17/203; E05B 17/2034; E05B 17/2084; E05B 63/18; E05B 55/00; E05B 55/005; E05B 65/0021; E05B 65/0028; E05B 65/02; E05B 65/025
See application file for complete search history.

(56) References Cited

U.S. PATENT DOCUMENTS 5,588,318 A 12/1996 Osborne
5,839,305 A 11/1998 Aston
6,094,953 A 8/2000 Evans
6,295,848 B1 10/2001 Suzuki
6,318,138 B1 11/2001 Mathews et al.
6,619,085 B1 9/2003 Hsieh
6,666,054 B1 12/2003 Hsieh
7,044,509 B2 5/2006 Radel
7,187,089 B2 3/2007 Fukano et al.
7,520,152 B2 4/2009 Sabo et al.
7,731,250 B2 * 6/2010 Garneau ............. E05B 47/0012 292/144
8,261,586 B2 * 9/2012 Gartner ............... E05B 47/0607 292/201
8,495,899 B2 7/2013 Gartner
8,528,373 B2 9/2013 Hyatt, Jr. et al.
8,616,031 B2 12/2013 Ullrich et al.
9,903,137 B2 * 2/2018 Min .................... E05B 47/0607
10,669,744 B2 * 6/2020 Arnold .................... E05B 47/06
11,505,967 B2 * 11/2022 Mantena ............. E05B 47/0607
2002/0124612 A1 * 9/2002 Evans ................. E05B 47/0607 70/469
2006/0112747 A1 * 6/2006 Moon ................. E05B 47/0673 70/283
2010/0180511 A1 7/2010 Mahdi
2010/0251787 A1 * 10/2010 Dayanikli ........... E05B 47/0012 70/277
2015/0115629 A1 * 4/2015 Gartner ............... E05B 47/0607 292/220
2018/0051486 A1 2/2018 Yuan
2022/0251878 A1 * 8/2022 Weinerman ......... E05B 47/0607

OTHER PUBLICATIONS

Search Report received for EP Application No. 20783828.5, dated Nov. 17, 2022, 8 pages.
Janus International Noke Smart Entry System Online brochure dated Mar. 16, 2019.
Janus International Noke Smart Entry System (Access Control) Online brochure dated Mar. 16, 2019.
Salto Geo Cylinder—the next generation of electronic cylinder lock Online brochure, www.saltosystems.com dated 2013.
ASSA ABLOY Cabinet Lock Overview Online brochure, www.assaabloyesh.com dated 2018.
"Cabinet Lock Overview" ASSA ABLOY, ESH Cabinet Lock Brochure lowres, 2018, pp. 1-10.
"Cam Lock cylinder—GxCL," Salto System, Networked Electronic locking solution, URL: www.saltosystems.com, pp. 1-6.
International Preliminary Report on Patentability received for PCT Patent Application No. PCT/US2020/026762, dated Oct. 14, 2021, 11 pages.
International Search Report and Written Opinion received for PCT Patent Application No. PCT/US2020/026762, dated Jun. 18, 2020, 20 pages.
Noke Smart Entry, "Access Control," Janus International, URL: https://www.janusintl.com/access-control, Mar. 16, 2019, pp. 1-5.
Noke Smart Entry, "Noke Smart Entry System," Janus International, URL: https://www.janusintl.com/products/noke, Mar. 16, 2019, pp. 1-10.
Noke Smart Entry, "Steel Roll Up Doors & Self Storage Metal Building Manufacturer," Janus International, Mar. 16, 2019, pp. 1-7.

* cited by examiner

ELECTRONIC LOCK

CROSS-REFERENCE TO RELATED APPLICATIONS

This application is a 371 national stage application of PCT Patent Application No. PCT/US20/26762, filed Apr. 4, 2020, titled ELECTRONIC LOCK which claims the benefit of U.S. Provisional Application No. 62/872,121, filed Jul. 9, 2019, titled ELECTRONIC LOCK and claims the benefit of U.S. Provisional Application No. 62/829,778, filed Apr. 5, 2019, titled ELECTRO-MECHANICAL STORAGE DOOR LOCK, the entire disclosures of which are expressly incorporated by reference herein.

FIELD

The present disclosure relates to door locks and, in particular, to door locks having an electro-mechanical locking system.

BACKGROUND

Storage areas, such as lockers, safes, rooms, and other storage areas, are known to have mechanical or electro-mechanical locking systems which control access to an interior of the storage container or room through a door. In certain circumstances, a door is lifted upwardly to reveal an access to a storage area. In these circumstances, the door can be lifted upwardly along a track like a typical "garage door" or the door can be implemented as a roll-up door.

SUMMARY

The present disclosure generally relates to a lock including a blocker (e.g., a bolt) useable to selectively prevent access through a portal such as a door. The blocker can be retained in a blocking position to prevent access through the portal by a retainer. In alternative embodiments, the blocker can also be retained in an open position to allow access through the portal. A retainer can be utilized to retain the blocker in the blocking position preventing access through the portal and can also be utilized, in certain embodiments, to retain the blocker in the open position to allow access through the portal. A retainer blocker can be utilized to maintain the retainer in position to retain the blocker (e.g., bolt) in a fixed position. An actuator may, in certain alternative embodiments, be employed to position the retainer blocker. In certain embodiments, the actuator is controlled by an electronic controller.

In an exemplary embodiment of the present disclosure, a storage area is provided. The storage area comprising: a door; and a lock. The lock comprising: a blocker (e.g., a bolt) positioned atop a front side of the door, the blocker moveable between an extended position locking the door and a retracted position unlocking the door along a first direction; and a blocker actuator operable to receive a user input motion along the first direction to actuate the blocker between the extended position and the retracted position; an electronic controller operatively coupled to the lock and actuatable to selectively block movement of the blocker actuator; and an input device, the electronic controller actuatable by the input device.

In an example thereof, the lock further comprises: a retainer, selectively positionable to a blocking position to block the blocker actuator from actuating the blocker and selectively positionable to an unblocking position to allow the blocker actuator to actuate the blocker; and a retainer blocker operable to selectively cooperate with the retainer to maintain the retainer in the blocking position to block the blocker actuator from actuating the blocker, the electronic controller operatively coupled to the retainer blocker and actuatable to position the retainer blocker to cooperate with the retainer to maintain the retainer in the blocking position.

In further examples thereof, the lock comprises: a blocker; a blocker actuator operable to selectively actuate the blocker; a retainer selectively positionable to a blocking position to block the blocker actuator from actuating the blocker and selectively positionable to an unblocking position to allow the blocker actuator to actuate the blocker; and a retainer blocker operable to selectively cooperate with the retainer to maintain the retainer in the blocking position to block the blocker actuator from actuating the blocker. In further examples thereof, the retainer comprises a protrusion positionable in at least one recess in the blocking position of the retainer. In further examples thereof, the lock includes a biasing member biasing the protrusion of the retainer into the at least one recess. In further examples thereof, the blocker actuator includes the at least one recess. In certain examples thereof, the at least one recess comprises a first recess positioned to cooperate with the protrusion to hold the blocker in a retracted position, and the at least one recess further comprise a second recess positioned to cooperate with the protrusion to hold the blocker in an extended position.

In further examples, the retainer is reciprocatable between the blocking position and the unblocking position along a reciprocation direction, the retainer blocker comprising a stop insertable along an insertion direction orthogonal to the reciprocation direction into a stop position preventing a movement of the retainer blocker along the reciprocation direction. In certain examples thereof, the stop comprises a tab insertable into a recess in the retainer. In certain examples thereof, the stop comprises a bearing insertable along the insertion direction to a stop position creating a physical barrier to a reciprocation of the retainer from the blocking position to the unblocking position.

In examples thereof, the lock further comprises: a motor; and an armature linkage moveable by energization of the motor, the armature linkage positioned to selectively position the bearing in the stop position and move the bearing from the stop position. In certain examples thereof, a magnet is carried by the armature linkage, a magnetic attraction between the bearing and the magnet capable of effecting movement of the bearing from the stop position. In examples thereof, the retainer, the bearing, the motor and the armature linkage are carried by a carriage, the carriage, the retainer, the bearing, the motor and the armature linkage comprising a subassembly securable to the blocker for translation therewith.

In examples thereof, the retainer is rotatable between the blocking position and the unblocking position, the retainer blocker comprising a stop rotatable into a stop position preventing a rotation of the retainer. In further examples thereof, the lock further comprises: at least one stop surface presented by the blocker actuator, in the stop position, the retainer trapped against rotation between the stop and the stop surface. In additional examples, the lock further comprises: a worm wheel carrying the stop; a motor; a worm screw rotatable by the motor the worm screw intermeshed with the worm wheel whereby energization of the motor actuates the stop. In examples thereof, the lock further comprises a biasing element positionable to bias the retainer into the blocking position and further positionable to bias the retainer into the unblocking position, the stop defining a datum for the biasing element. In examples thereof, the biasing element comprises a torsion spring.

In examples thereof, the lock further comprises: an actuator, operable to selectively move the retainer blocker to the blocking position and to selectively move the retainer blocker from the blocking position; and an electronic controller operatively coupled to the actuator to selectively cause the actuator to move the retainer blocker In examples thereof, the retainer comprises a cam. In further examples the retainer blocker comprises a worm wheel having a radial protrusion positionable to maintain the retainer in the blocking position to block the blocker actuator from actuating the blocker. In examples thereof, the worm wheel includes an open center and the radial protrusion comprises a radially inward protrusion.

In further examples of the lock, the blocker and the blocker actuator each form a part of an integral slide.

In further examples of the lock, the blocker actuator comprises a subassembly.

In examples thereof, the lock further includes a biasing element, the biasing element selectively biasing a cam to move between the blocking position and the unblocking position. In examples thereof, the biasing element comprises a spring and the lock further comprises a moveable spring datum, the moveable spring datum moveable between a first position corresponding to a neutral position in which the spring cooperates with the moveable spring datum to position the retainer.

In examples thereof, the input device comprises a portable operator device and the electronic controller and the portable operator device communicate over a wireless connection.

In examples thereof, the input device is operable to communicate a credential to the electronic controller and the electronic controller is operable to evaluate the credential to make a determination whether the credential is a valid credential capable of actuating the controller to cease blocking movement of the blocker actuator and thereby allow the user input motion along the first direction to actuate the blocker between the extended position locking the door and the retracted position unlocking the door.

In an exemplary embodiment of the present disclosure, a door lock for use with a door is provided. The door lock comprising a bolt moveable between an extended position and a retracted position along a first direction; a retainer operatively coupled to the bolt and positionable to maintain the bolt in one of the extended position or the retracted position; a blocker operatively coupled to the retainer, the blocker moveable between a blocking position and a release position, wherein when the blocker is in the blocking position the retainer maintains the bolt in one of the extended position and the retracted position and when the blocker is in the release position the retainer is moveable to permit the bolt to move from one of the extended position and the retracted position to the other of the extended position and the retracted position; an actuator operatively coupled to the blocker to move the blocker from the release position to the blocking position; and an electronic controller operatively coupled to the actuator to cause the actuator to move the blocker in the second direction from the release position to the blocking position.

In an example thereof, the retainer is moveable in a second direction angled relative to the first direction.

In an example thereof, the second direction is orthogonal to the first direction. In another example thereof, the blocker is moveable in a third direction to move between the release position and the blocking position, the third direction is angled relative to the second direction. In a variation thereof, the third direction is orthogonal to the first direction. In another variation thereof, the actuator includes an electric motor. In yet a further variation thereof, the electric motor rotates a pinion gear, the pinion gear intermeshed with a gear rack carried by the blocker.

In a further example thereof, the bolt extends from a slide, the slide having a first recess and a second recess, a protrusion of the retainer is received in the first recess when the bolt is received in the retracted position and the protrusion of the retainer is received in the second recess when the bolt is in the extended position. In a variation thereof, the door lock further comprises a plurality of biasing members, a first biasing member biases the protrusion of the retainer into one of the first recess or the second recess of the slide. In a further variation thereof, a second biasing member biases the bolt to the extended position. In still another example, the door lock further comprises a front mounting bracket positionable over a front side of the door and a rear mounting bracket positionable over a rear side of the door. In a variation thereof, the bolt is captured between the door and the front mounting bracket.

In further examples, the door lock is utilized in combination with a door and the bolt is positioned atop a front side of the door, the bolt moveable between the extended position and the retracted position along the front side of the door. In examples, the door lock further comprising an operator actuatable input operable to receive an input motion along the first direction from a user to move the bolt between the extended position and the retracted position.

In an alternative embodiment of the disclosure, a door lock for use with a door is provided. The lock comprising: a bolt moveable between an extended position and a retracted position in along a first direction; a retainer operatively coupled to the bolt and positionable to maintain the bolt in one of the extended position or the retracted position; a blocker operatively coupled to the retainer, the blocker moveable between a blocking position and a release position, wherein when the blocker is in the blocking position the retainer maintains the bolt in one of the extended position and the retracted position and when the blocker is in the release position the retainer is moveable to permit the bolt to move from one of the extended position and the retracted position to the other of the extended position and the retracted position; an actuator operatively coupled to the blocker to move the blocker from the release position to the blocking position; and an electronic controller operatively coupled to the actuator to cause the actuator to move the blocker in the second direction from the release position to the blocking position.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1B:
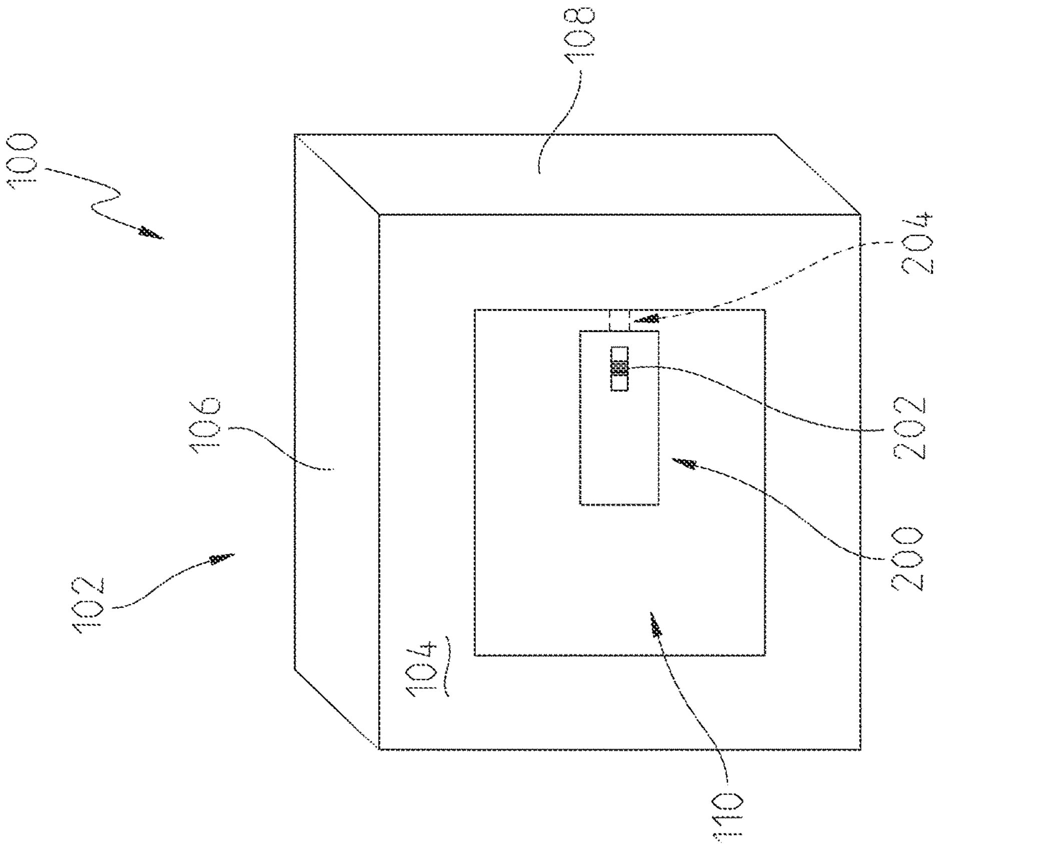
FIG. 1B illustrates a representative view of the storage container of FIG. 1A with the door being moveable from the closed position to an open position to permit access to the enclosed volume due to the bolt of the door lock being positioned in a retracted position.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1A:
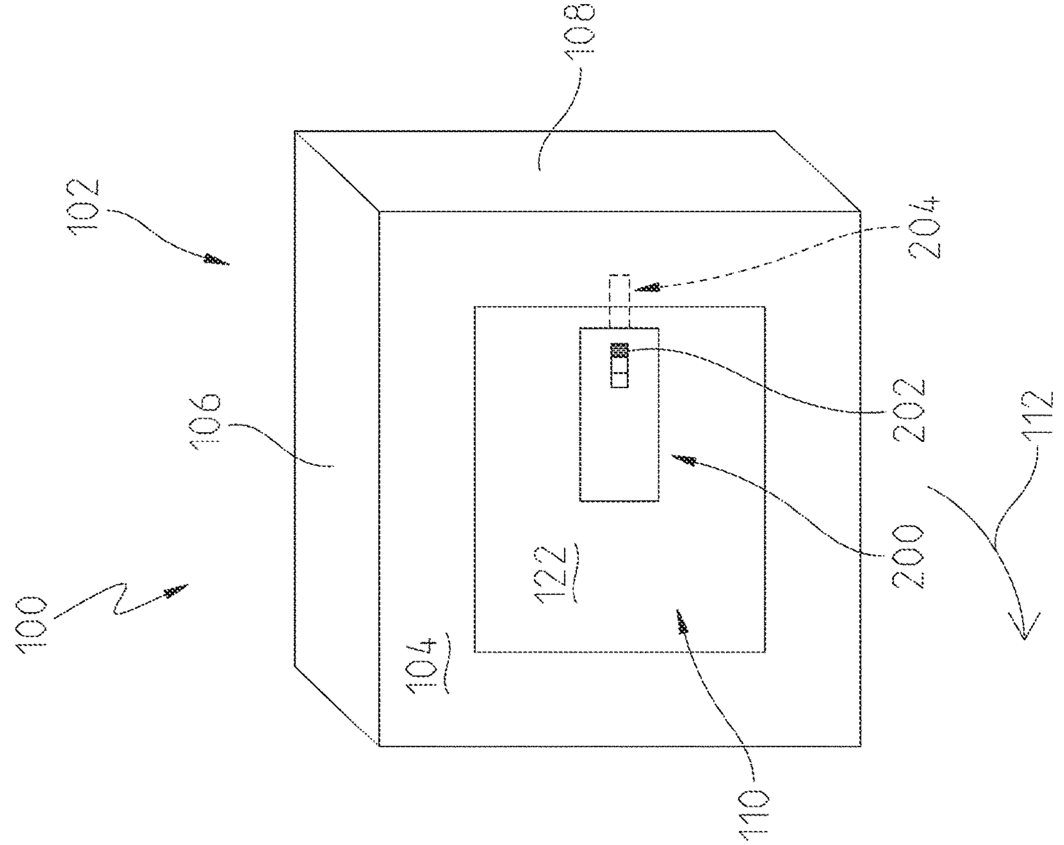
FIG. 1A illustrates a representative view of a storage container having an enclosed volume which is accessible through a door, the door being secured in a closed position to deny access to the enclosed volume with a door lock having a bolt positioned in an extended position.

Referring to FIGS. 1A and 1B, an exemplary storage container 100 is illustrated. Storage container 100 includes an enclosure 102 having a front wall 104, a top 106, a right side wall 108, a floor (not shown), a back wall (not shown), and a left side wall (not shown). A door 110 is provided in front wall 104 of storage container 100. Door 110 is hinged to front wall 104 generally along a left side of door 110 such that door 110 may swing open generally in direction 112. With door 110 in an open position, an interior 114 (see FIG. 6) of storage container 100 may be accessed while, with door 110 in a closed position, interior 114 of storage container 100 may not be accessed.

Exemplary storage containers include lockers, safes, and other types of containers, portable or stationary. Other storage containers include rooms in a structure and other bounded areas accessible through a door or gate. In embodiments, storage containers may have one or more solid walls. In embodiments, storage containers may have one or more permeable walls, such as wire mesh or bars. In embodiments, storage containers may have doors pivotably movable, vertically movable (e.g. overhead garage doors or roll-up doors), and/or collapsible doors (e.g. folding doors).

Figure 4:
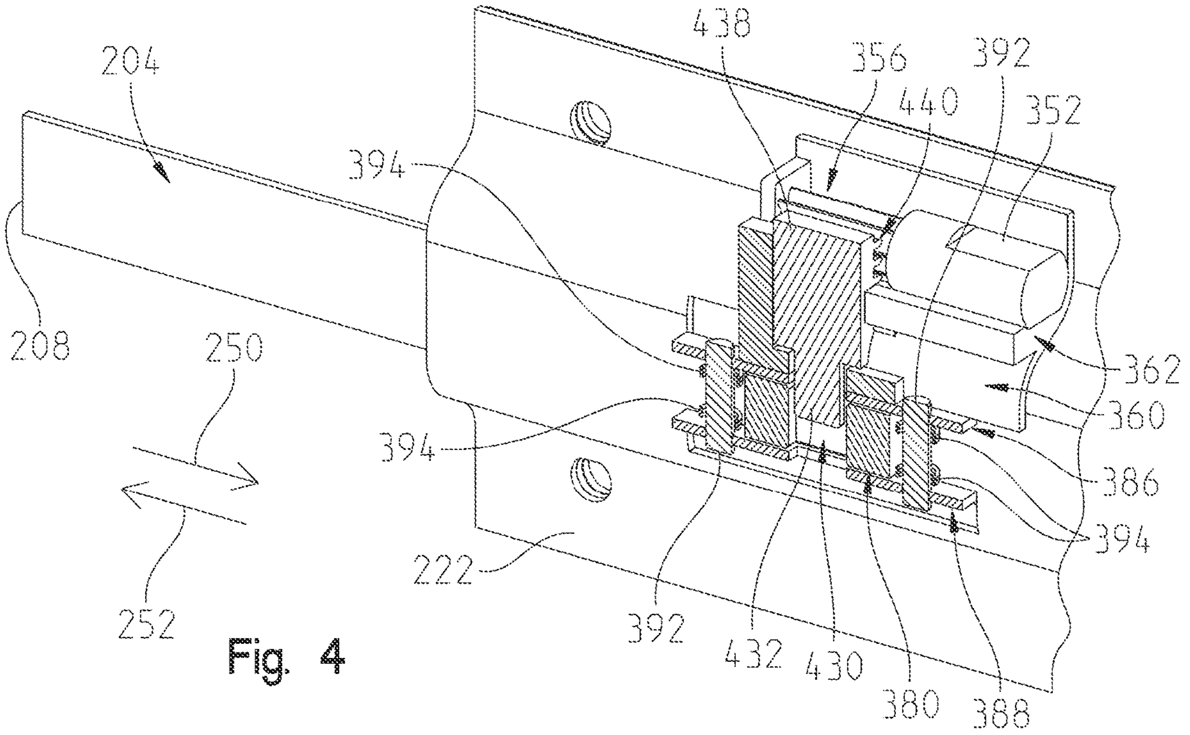
FIG. 4 illustrates a partial sectional view of the door lock of FIG. 2A with a blocker and a retainer of the door lock cooperating to provide a locked configuration for the door lock wherein a movement of a bolt of the door lock between an extended position and a retracted position is blocked.
Figure 5:
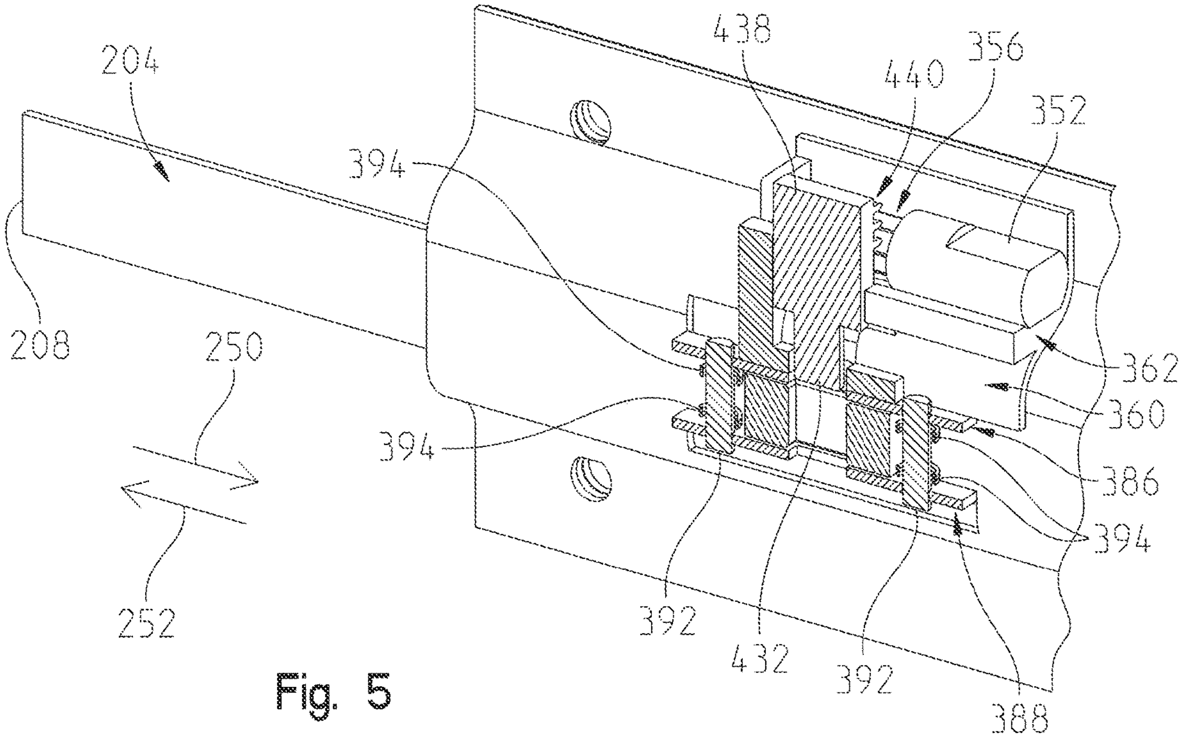
FIG. 5 illustrates a partial sectional view of the door lock of FIG. 2A with the blocker and the retainer of the door lock cooperating to provide an unlocked configuration for the door lock wherein a movement of the bolt of the door lock between the extended position and the retracted position is permitted.
Figure 6:
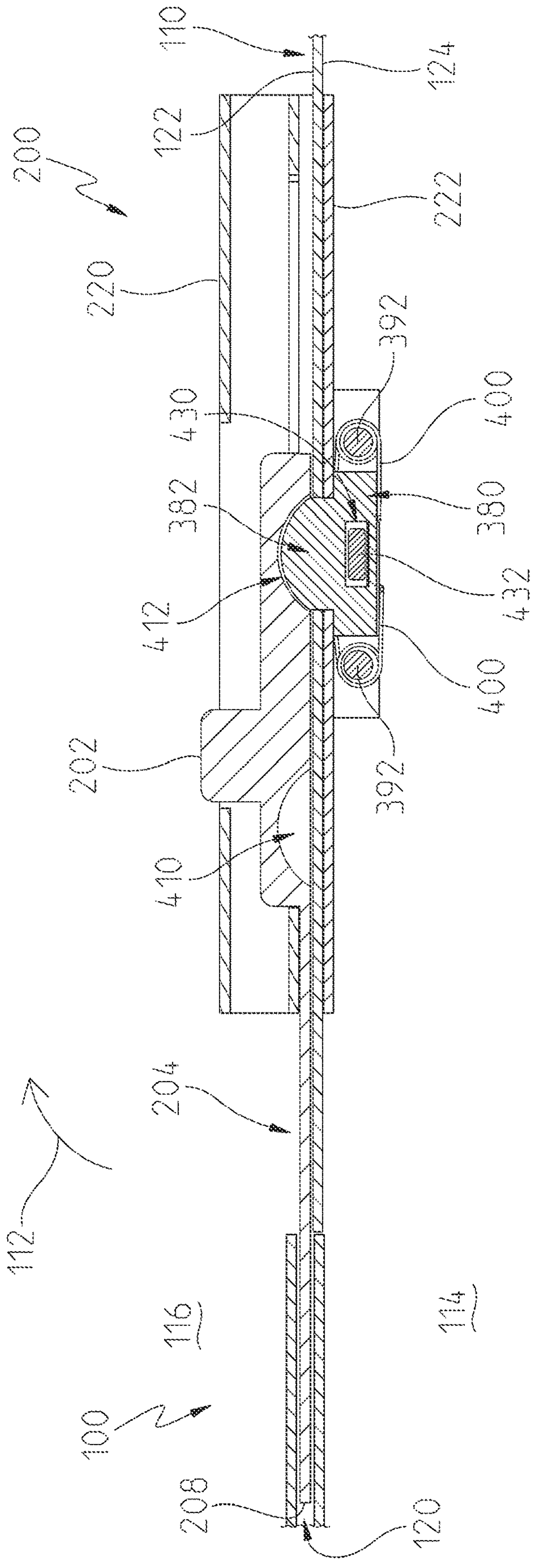
FIG. 6 illustrates a sectional view of the door lock and door of FIG. 2A along lines 6-6 in FIG. 2A with the bolt of the door lock in an extended position.
Figure 8:
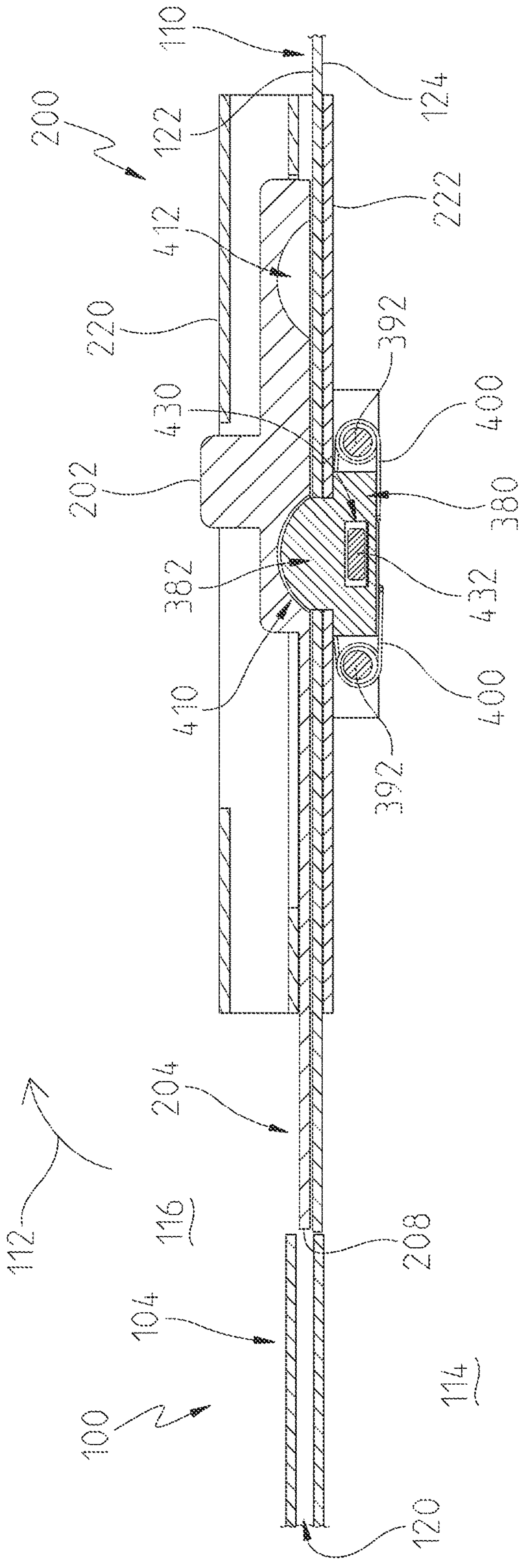
FIG. 8 illustrates the sectional view of FIG. 6 with the bolt of the door lock in the retracted position.

The ability to move door 110 from a closed position to an open position is controlled by a door lock 200. Door lock 200 includes an operator actuatable input 202 accessible from an exterior 116 (see FIG. 6) of storage container 100. Through an actuation of operator actuatable input 202, a bolt 204 of door lock 200 is moved from an extended position (see FIGS. 1A and 6) to a retracted position (see FIGS. 1B and 8). As shown in FIG. 6, when bolt 204 is in the extended position, a first end 208 of bolt 204 is received in a recess 120 in storage container 100 and blocks rotation of door 110 in direction 112 or vertical movement of door 110. As shown in FIG. 8, when bolt 204 is in the retracted position, first end 208 of bolt 204 is positioned outside of recess 120 of storage container 100 and does not block rotation of door 110 in direction 112. Based on this functionality, first end 208 of bolt 204 can be referred to as a "blocker." As illustrated in FIG. 6, bolt 204 is positioned adjacent to and actuated along a front side 122 of door 110 to be positioned into and out of recess 120. This is different from standard deadbolt locks, for example, in which a bolt extends from and is retracted into an aperture formed in the thickness of a door, i.e., between the front and back faces of the door. To actuate bolt 204 along directions 250, 252 (FIGS. 4 & 5) atop first side of door 110, operator actuatable input 202 receives input motion from a user to articulate operator actuatable input 202 along directions 250, 252.

Figure 2A:
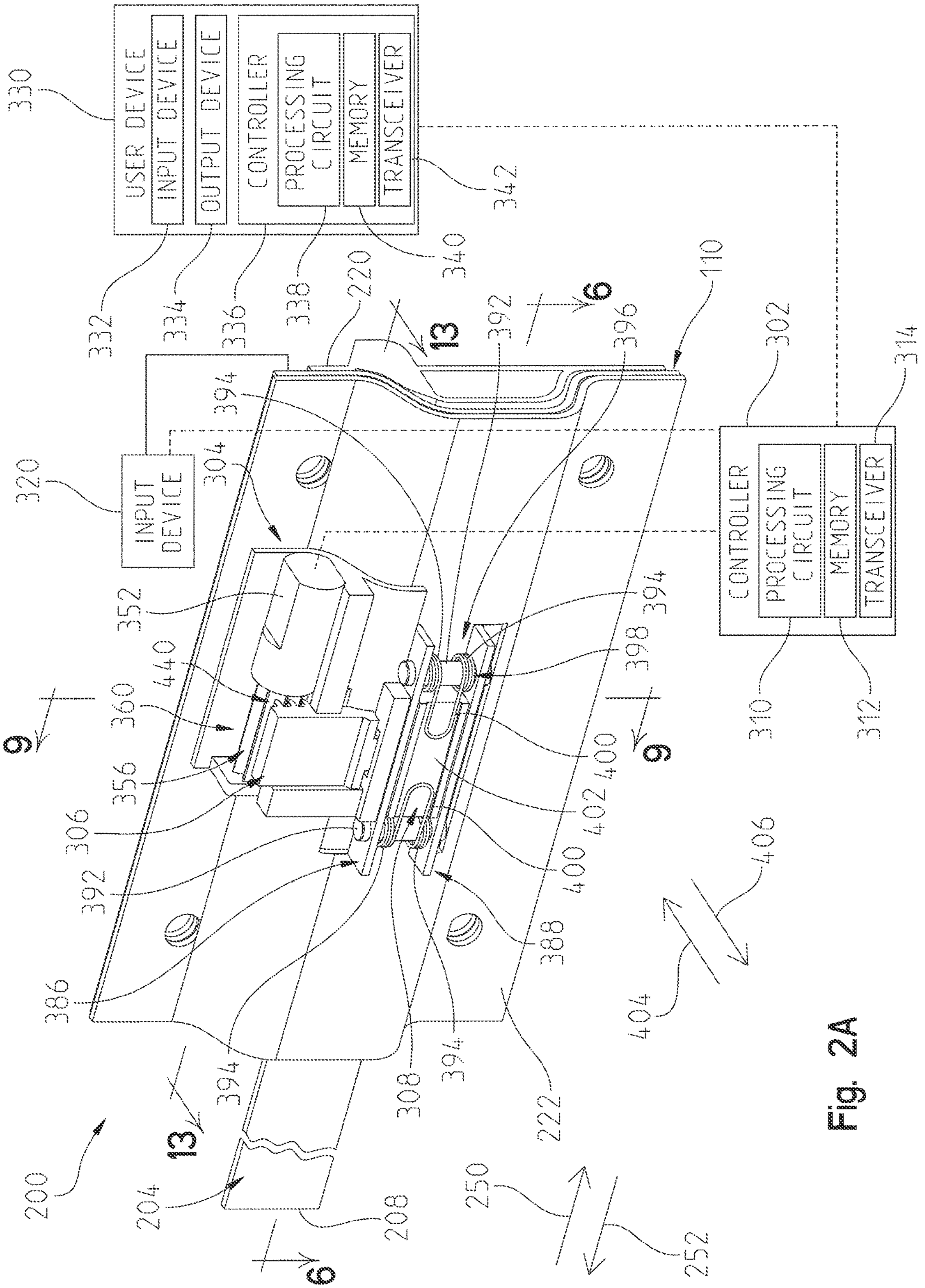
FIG. 2A illustrates a rear perspective view of an exemplary door lock for the storage container of FIGS. 1A and 1B and a door of the storage container.
Figure 2B:
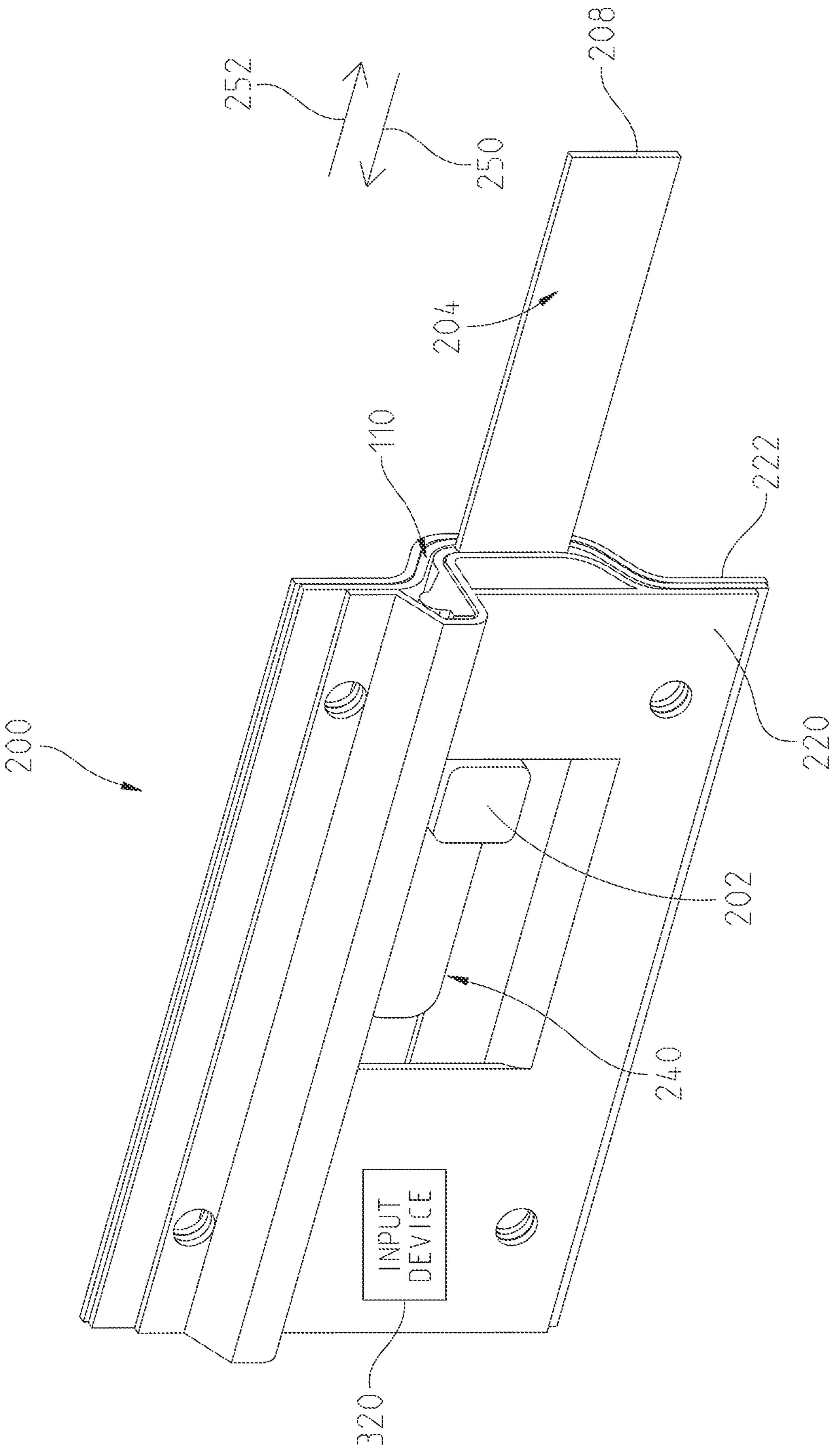
FIG. 2B illustrates a front perspective view of the door lock of FIG. 2A.
Figure 3A:
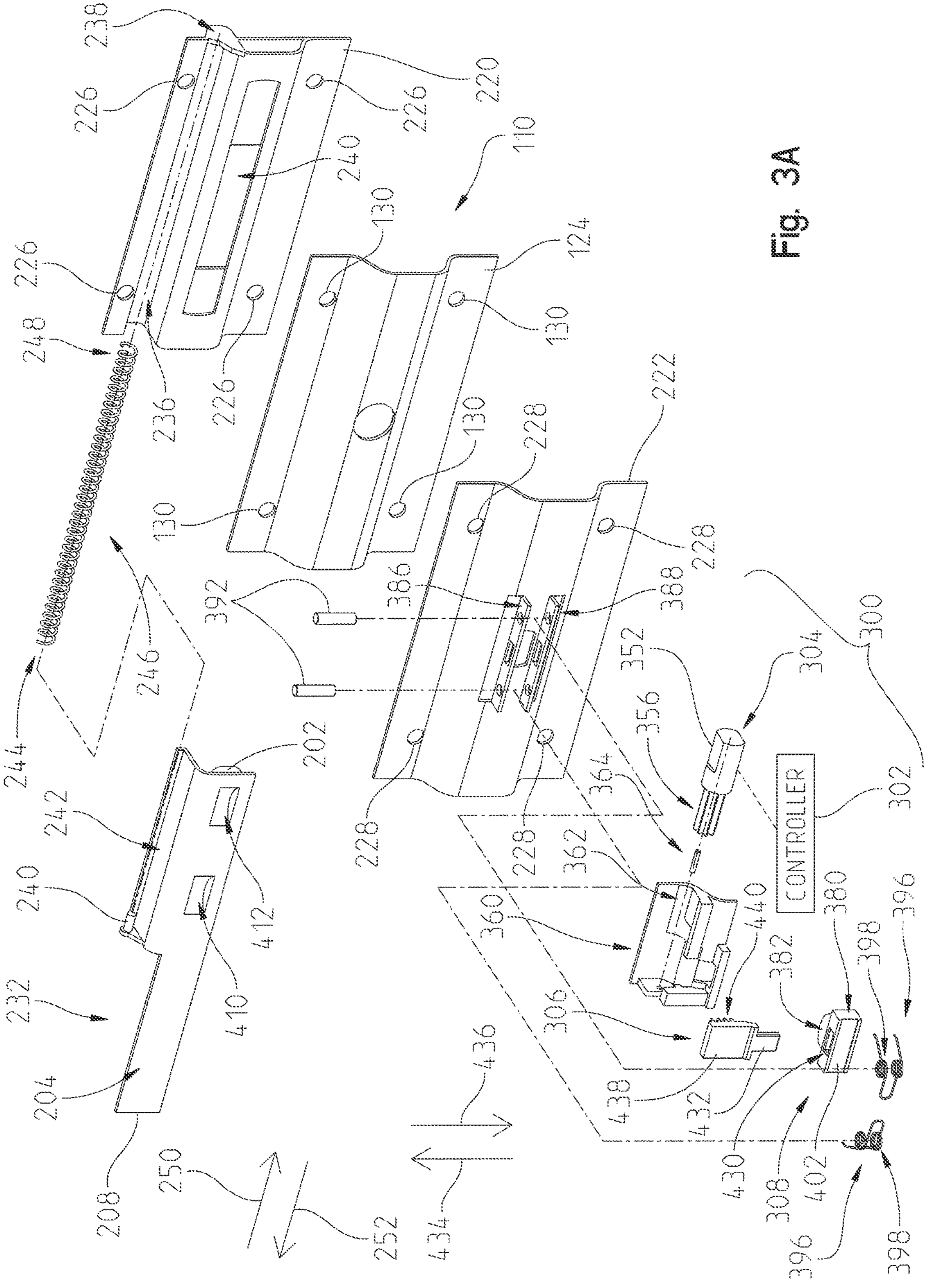
FIG. 3A illustrates a rear exploded view of the door lock of FIG. 2A.

Referring to FIGS. 2A and 2B, door lock 200 includes a front mounting bracket 220 placed over a front side 122 (see FIG. 6) of door 110 and a rear mounting bracket 222 placed over a rear side 124 (see FIGS. 3A and 6) of door 110. Front mounting bracket 220 and rear mounting bracket 222 are secured to door 110. In the illustrated embodiment as shown in FIG. 3A, door 110 includes a plurality of apertures 130, front mounting bracket 220 includes a plurality of apertures 226 aligned with the plurality of apertures 130 of door 110, and rear mounting bracket 222 includes a plurality of apertures 228 also aligned with the plurality of apertures 130 of door 110. Fasteners (not shown) pass through respective aligned sets of apertures 130, 226, and 228 to hold front mounting bracket 220 and rear mounting bracket 222 to door 110.

Exemplary fasteners include bolts having heads which are positioned on top of front mounting bracket 220 and threaded shafts extending beyond rear mounting bracket 222. The bolts are secured with nuts. The shape of the bolt heads prevents a tool being applied exterior to storage container 100 to loosen the nuts from the bolts. Other exemplary fasteners include weldments, tabs of front mounting bracket 220 which pass through door 110 and are secured to rear mounting bracket 222 and other suitable structures to secure one or both of front mounting bracket 220 and rear mounting bracket 222 to door 110.

Referring to FIG. 2B, front mounting bracket 220 includes an elongated aperture 240 which receives operator actuatable input 202 of door lock 200. Referring to FIG. 3A, operator actuatable input 202 and bolt 204 are portions of an integral slide 232 which is captured between a front side 122 (see FIGS. 1A and 9) of door 110 and front mounting bracket 220. In other embodiments, operator actuatable input 202 and bolt 204 are separate components coupled to slide 232 or otherwise operatively coupled together such that an actuation of operator actuatable input 202 results in a movement of bolt 204 when door lock 200 is in an unlocked configuration. For the purposes of this document, "integral"

signals that elements are made of one continuous material, as opposed to being formed of discreet components that are secured one to the other in some fashion.

Figure 3B:
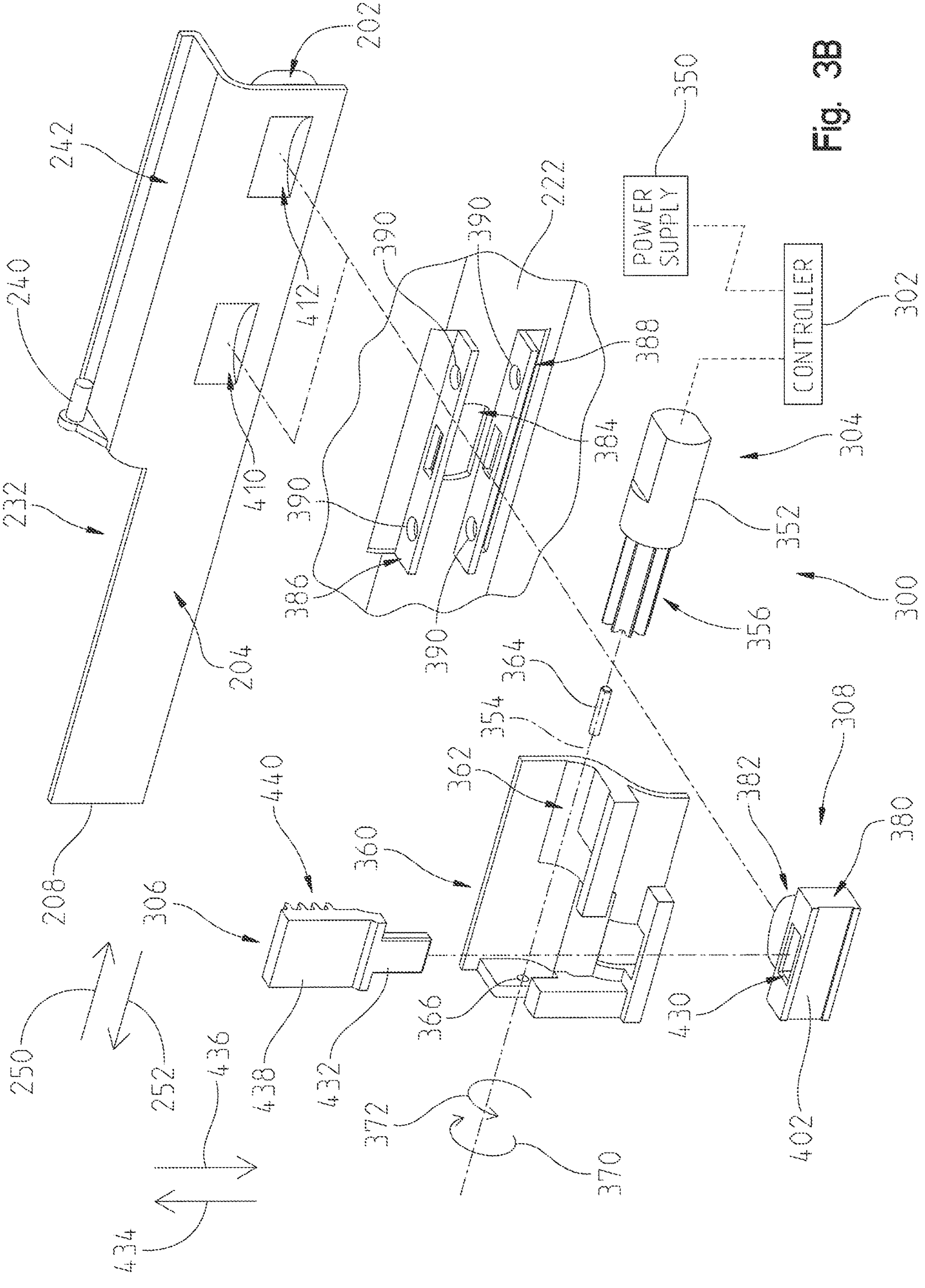
FIG. 3B illustrates a partial rear exploded view of the door lock of FIG. 2A.

Referring to FIG. 3B, slide 232 further includes a receiver 240 positioned above a guide 242. Illustratively, receiver 240 is a pin, but other suitable receivers such as a recess are contemplated. A first end 244 of a biasing member 246 (FIG. 3A) is placed over receiver 240 and biasing member 246 extends along guide 242. Biasing member 246 is further received in a guide 236 (see FIG. 3A) of front mounting bracket 220 and a second end 248 of biasing member 246 contacts a stop 238 (see FIG. 3A) of front mounting bracket 220.

Figure 13:
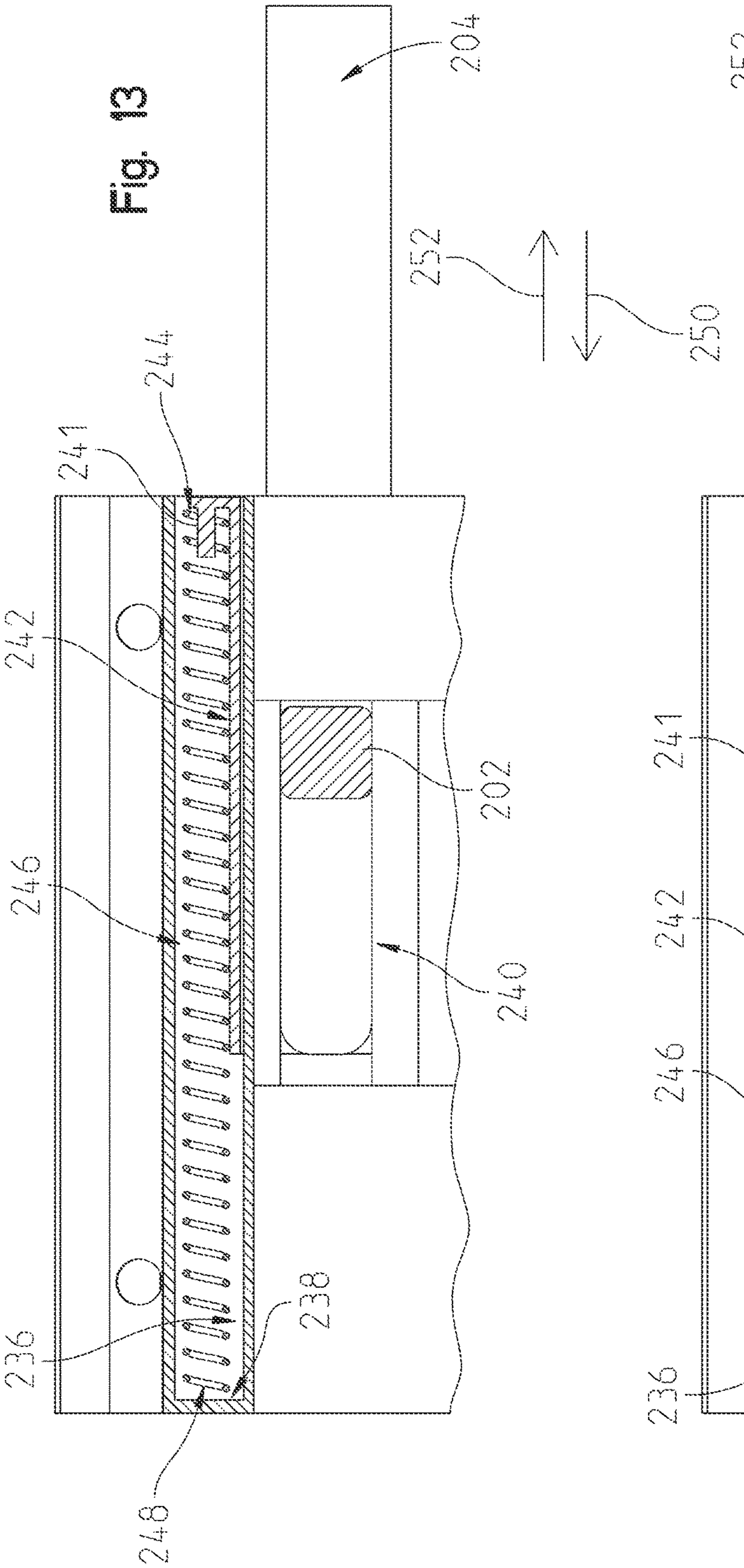
FIG. 13 illustrates a partial sectional view of the door lock of FIG. 2A with the bolt in the extended position of FIG. 6.
Figure 14:
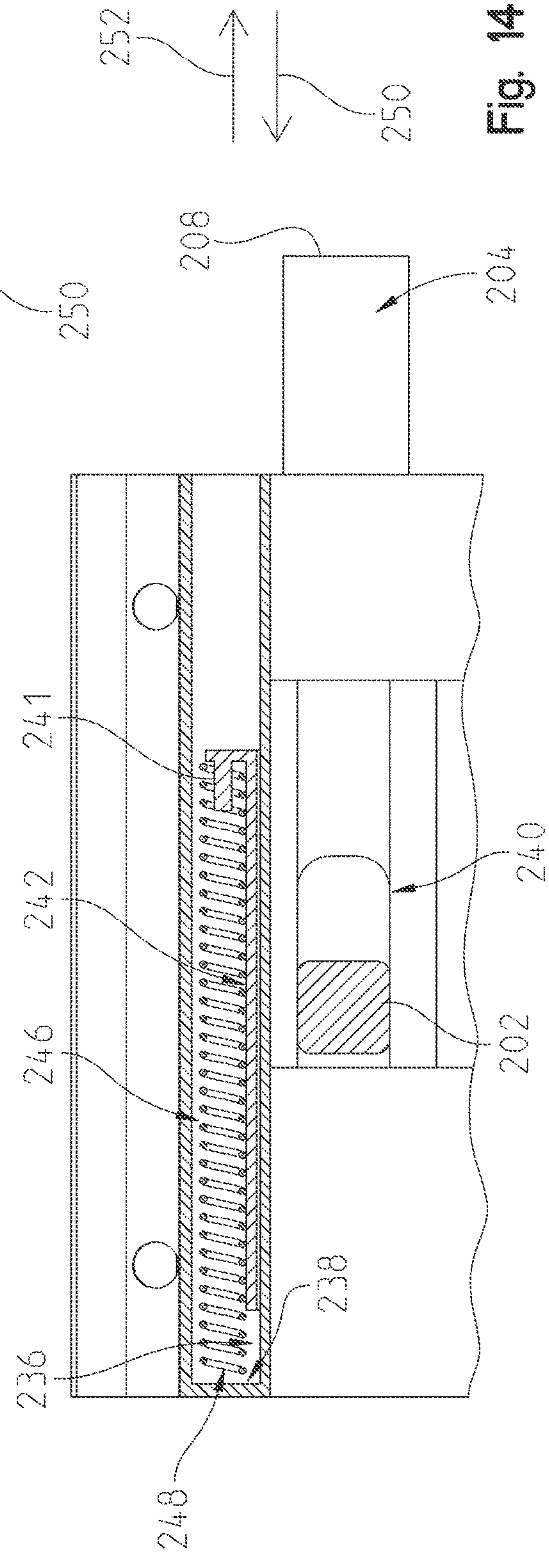
FIG. 14 illustrates the partial sectional view of FIG. 13 with the bolt in the retracted position of FIG. 8

An operator will contact operator actuatable input 202 and push operator actuatable input 202 in direction 250 to move bolt 204 also in direction 250 towards a retracted position of bolt 204 (see FIGS. 1B and 8). Similarly, an operator will contact operator actuatable input 202 and push operator actuatable input 202 in direction 252 to move bolt 204 also in direction 252 towards an extended position of bolt 204 (see FIGS. 1A and 6). Referring to FIGS. 13 and 14, when bolt 204 is in the extended position (see FIG. 13) biasing member 246 is less compressed than when bolt 204 is in the retracted position (see FIG. 14). Thus, absent an additional holding force in the retracted position, bolt 204 will be biased by biasing member 246 to the extended position of FIG. 13 when the operator releases operator actuatable input 202.

Referring to FIG. 3B, door lock 200 includes a locking assembly 300 which holds bolt 204 in the extended position unless a valid credential is presented to door lock 200. Locking assembly 300 includes a controller 302, an actuator 304 controlled by the controller 302, a blocker 306 operatively coupled to actuator 304, and a retainer 308 selectively coupled to blocker 306.

Referring to FIG. 2A, controller 302 is an electronic controller including processing circuits 310 and memory 312. In embodiments, controller 302 is microprocessor-based and memory 312 is a non-transitory computer readable medium which includes processing instructions stored therein that are executable by the microprocessor of controller 302 to control operation of actuator 304 to position blocker 306 in one of a blocking or lock position (see FIG. 9) and a release position (see FIG. 10). Exemplary non-transitory computer-readable mediums include random access memory (RAM), read-only memory (ROM), erasable programmable read-only memory (e.g., EPROM, EEPROM, or Flash memory), or any other tangible medium capable of storing information.

In embodiments, controller 302 is one of wired or wirelessly coupled to an input device 320 mounted to storage container 100 or received in an interface mounted to storage container 100. Exemplary input devices 320 include keypads, biometric readers, touch screens, removeable electronic keys, and other suitable input devices. At least one of input devices 320 and controller 302 exchanges information with the other of input devices 320 and controller 302 to determine whether the operator has a valid credential to access interior 114 of storage container 100. In embodiments, controller 302 receives information from input devices 320 and makes a determination whether the information indicates a valid credential (granting access) or an invalid credential (denying access). In embodiments, input devices 320 receives information from controller 302 and makes a determination whether the information indicates a valid credential (granting access) or an invalid credential (denying access). In embodiments, one of input devices 320 and controller 302 is operatively coupled to a remote computing device and the information from one or both of input devices 320 and controller 302 is provided to the remote computing device which makes a determination whether the information indicates a valid credential (granting access) or an invalid credential (denying access). In the illustrated embodiment of door lock 200, a valid credential is required to transition door lock 200 from a locked state (denying access) to an unlocked state (granting access) and from an unlocked state (granting access) to a locked state (denying access).

In embodiments, controller 302 is wirelessly coupled to a portable operator device 330. Exemplary portable operator devices 330 include smart phones, fobs, portable computing devices, badges, and other suitable devices that an operator may transport from location to location. Portable operator device 330 includes at least one input device 332, at least one output device 334, and a controller 336. Exemplary input devices include buttons, dials, switches, touch screens, microphones, scanners, cameras, and other suitable devices which receive an input from an operator. Exemplary output devices include displays, touch screens, speakers, vibration devices, and other suitable device which provide a perceivable output to an operator.

Referring to FIG. 2A, controller 336 is an electronic controller including processing circuits 338 and memory 340. In embodiments, controller 336 is microprocessor-based and memory 340 is a non-transitory computer readable medium which includes processing instructions stored therein that are executable by the microprocessor of controller 336 to control operation of actuator 304 to position blocker 306 in one of a blocking position (see FIG. 9) and a release position (see FIG. 10). Exemplary non-transitory computer-readable mediums include random access memory (RAM), read-only memory (ROM), erasable programmable read-only memory (e.g., EPROM, EEPROM, or Flash memory), or any other tangible medium capable of storing information.

Controller 302 and portable operator device 330 communicate over a wireless connection, either directly or through one or more networks. Exemplary direct wireless connections include BLUETOOTH, BLUETOOTH low energy, near field communication ("NFC"), and other suitable wireless connections. Controller 302 and portable operator device 330 each include a respective transceiver 314 and 342.

At least one of portable operator device 330 and controller 302 exchanges information with the other of portable operator device 330 and controller 302 to determine whether the operator has a valid credential to access interior 114 of storage container 100. In embodiments, controller 302 receives information from portable operator device 330 and makes a determination whether the information indicates a valid credential (granting access) or an invalid credential (denying access). In embodiments, portable operator device 330 receives information from controller 302 and makes a determination whether the information indicates a valid credential (granting access) or an invalid credential (denying access). In embodiments, one of portable operator device 330 and controller 302 is operatively coupled to a remote computing device and the information from one or both of portable operator device 330 and controller 302 is provided to the remote computing device which makes a determination whether the information indicates a valid credential (granting access) or an invalid credential (denying access). In the illustrated embodiment of door lock 200, a valid credential is required to transition door lock 200 from a locked state (denying access) to an unlocked state (granting access) and from an unlocked state (granting access) to a locked state (denying access).

Referring to FIG. 3B, controller 302 controls the flow of electricity from a power source 350 to actuator 304. Exemplary power sources 350 include batteries and other suitable power storage devices. Actuator 304, in the illustrated embodiment, is an electric motor 352 having an output shaft rotatable about axis 354. A pinion gear 356 is coupled to and rotates with the output shaft of motor 352.

A locking assembly chassis 360 supports electric motor 352 in a cradle 362. In embodiments, motor 352 is glued to cradle 362, coupled to cradle 362 through one or more fasteners, and/or coupled to cradle 362 in other suitable ways. A pin 364 is received in an opening 366 of locking assembly chassis 360 and in an end of pinion gear 356. Pin 364 supports an end of pinion gear 356. Controller 302 controls a direction of rotation of the output shaft of electric motor 352 and hence of pinion gear 356 in either direction 370 about axis 354 or direction 372 about 354.

Retainer 308 includes a base 380 and a protrusion 382 extending from base 380. Protrusion 382 of retainer 308 is received in an opening 384 in rear mounting bracket 222. Base 380 is positioned between an upper flange 386 and a lower flange 388 of rear mounting bracket 222. In certain embodiments, rear mounting bracket 222 is made of sheet metal and upper flange 386 and lower flange 388 are formed as bends in rear mounting bracket 222.

Each of upper flange 386 and lower flange 388 include apertures 390 (see FIG. 3B) which receive respective pins 392. Pins 392 pass through respective biasing members 396, illustratively coil portions 394 of torsion springs 398, as illustrated in FIG. 2A. A portion 400 of the respective torsion springs 398 presses on a rear side 402 of retainer 308 to bias retainer 308 in direction 404 as opposed to direction 406.

Returning to FIG. 3B, slide 232 includes a first recess 410 and a second recess 412. When bolt 204 is in the extended position of FIGS. 1A and 6, protrusion 382 of retainer 308 is received in second recess 412 of slide 232 due to bias of torsion springs 398 in direction 404. When bolt 204 is in the retracted position of FIGS. 1B and 8, protrusion 382 of retainer 308 is received in first recess 410 of slide 232 due to bias of torsion springs 398 in direction 404. Each of protrusion 382, first recess 410, and second recess 412 has a sloping profile which permits protrusion 382 to move out of either first recess 410 or second recess 412 as slide 232 moves in one of direction 250 and direction 252. As protrusion 382 moves out of either first recess 410 or second recess 412, retainer 308 moves in direction 406 against the bias of torsion springs 398.

Retainer 308 includes a recess 430 which receives a tab 432 of blocker 306 (see FIG. 2A). Tab 432 of blocker 306 may be raised in direction 434 or lowered in direction 436 by actuator 304. Blocker 306 includes a base 438 from which tab 432 extends. Base 438 further includes a gear rack 440. Gear rack 440 intermeshes with pinion gear 356 of actuator 304, as illustrated in FIG. 2A. By rotating pinion gear 356 in direction 370, controller 302 raises blocker 306 relative to retainer 308 to a level that tab 432 is removed from recess 430 of retainer 308 (see FIG. 5) which is a release position of blocker 306 due to the ability of retainer 308 to move in direction 406 relative to blocker 306. By rotating pinion gear 356 in direction 372, controller 302 lowers blocker 306 relative to retainer 308 to a level that tab 432 is received in recess 430 of retainer 308 (see FIG. 4) which is a blocking or lock position of blocker 306 due to the inability of retainer 308 to move in direction 406 relative to blocker 306. Recess 430 of retainer 308 is vertically aligned with tab 432 of blocker 306 when protrusion 382 of retainer 308 is received in one of first recess 410 and second recess 412 of slide 232.

Figure 9:
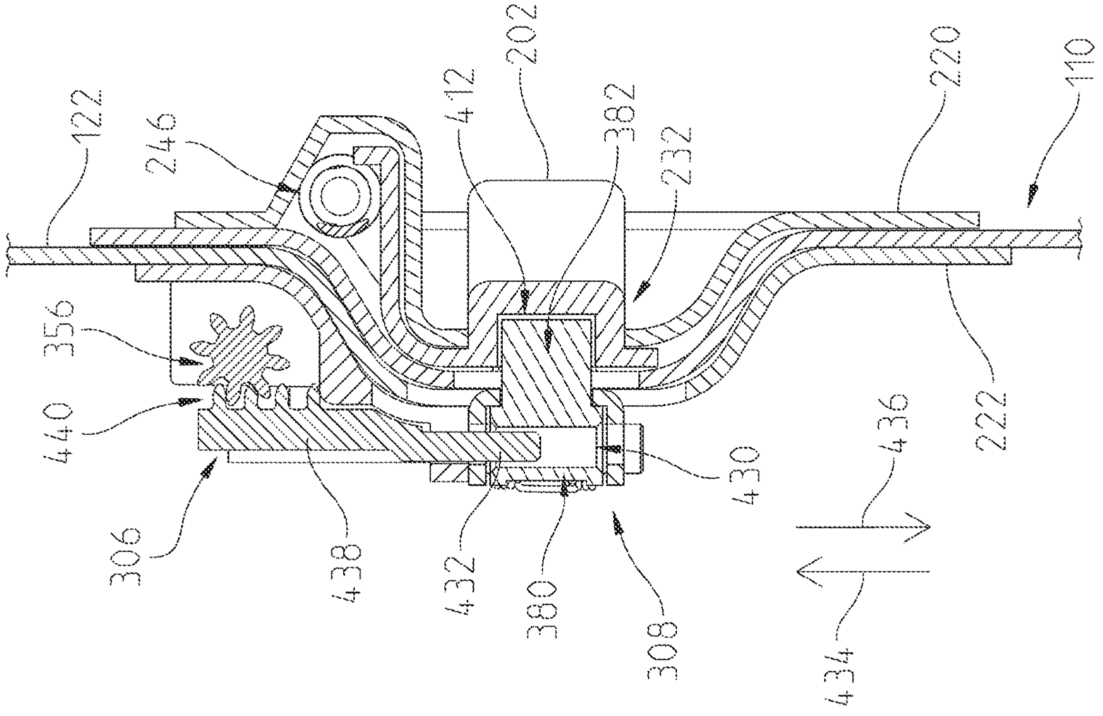
FIG. 9 illustrates a sectional view of the door lock and door of FIG. 2A along lines 9-9 in FIG. 2A with the blocker and the retainer of the door lock being in the locked configuration of FIG. 4 and the bolt in the extended position of FIG. 6.

Referring to FIGS. 6-12, an operation of door lock 200 is illustrated. As illustrated in FIGS. 6 and 9, bolt 204 is in an extended position with protrusion 382 of retainer 308 received in second recess 412 of slide 232. Further, tab 432 of blocker 306 is received in recess 430 of retainer 308. Due to the blocking or lock position of blocker 306 and retainer 308, an operator cannot push operator actuatable input 202 in direction 250 because blocker 306 is blocking a movement of retainer 308 in direction 406.

Figure 7:
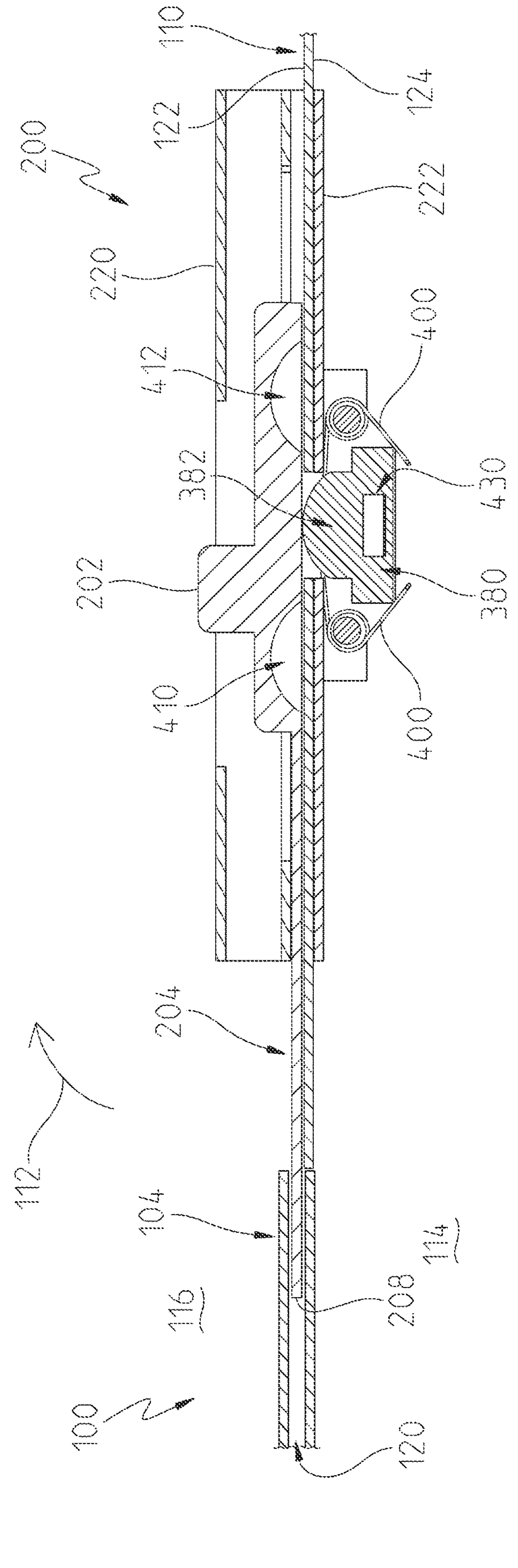
FIG. 7 illustrates the sectional view of FIG. 6 with the bolt of the door lock transitioning from the extended position to a retracted position.
Figure 10:
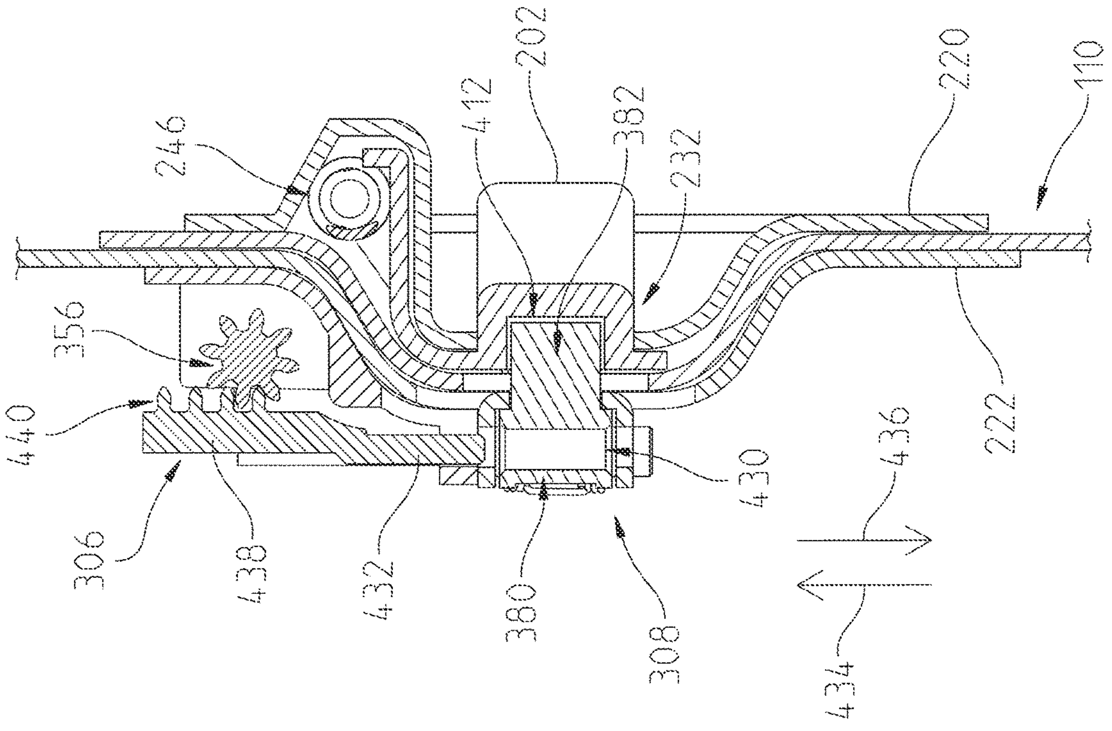
FIG. 10 illustrates the sectional view of FIG. 9 with the blocker and the retainer of the door lock being in the unlocked configuration of FIG. 5 and the bolt in the extended position of FIG. 6.
Figure 11:
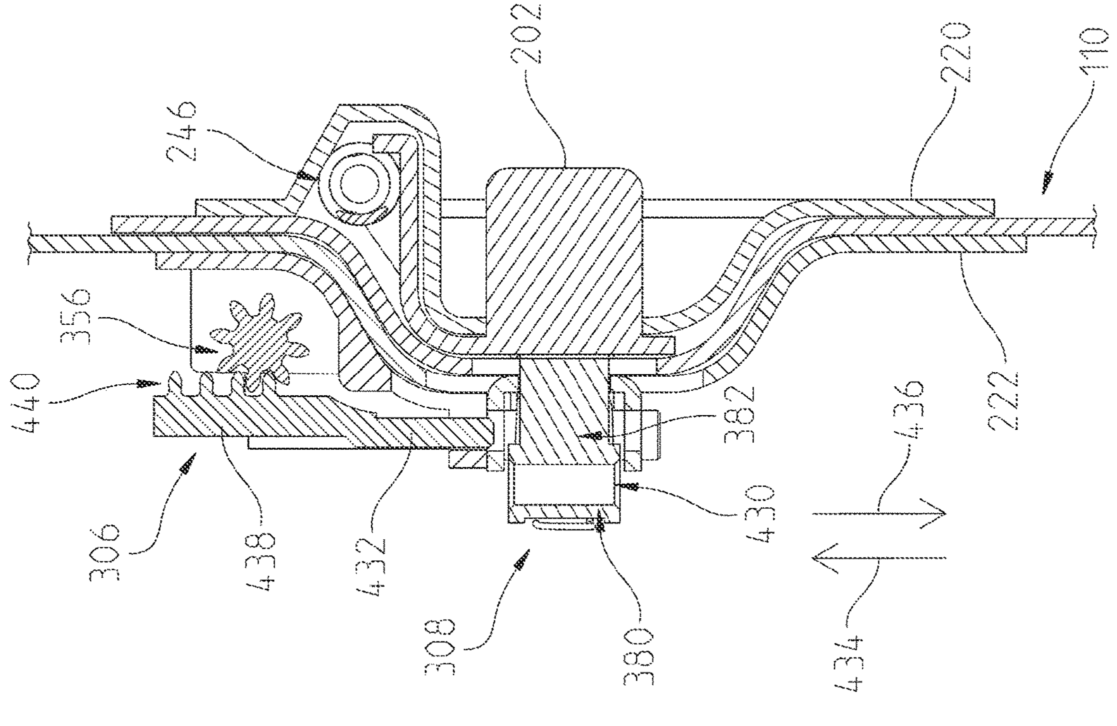
FIG. 11 illustrates the sectional view of FIG. 9 with the blocker and the retainer of the door lock being in the unlocked configuration of FIG. 5 and the bolt transitioning from the extended position of FIG. 6 to the retracted position of FIG. 8.

If a valid credential is determined to have been presented by one of input device 320 or portable operator device 330 (which can also generically be referred to as an "input device" in that it is capable of providing an input to electronic controller 302), controller 302 rotates pinion gear 356 in direction 370 to raise blocker 306 in direction 434 to its release position wherein tab 432 of blocker 306 is removed from recess 430 of retainer 308 as illustrated in FIG. 10. With tab 432 of blocker 306 removed from recess 430 of retainer 308, an operator can push operator actuatable input 202 in direction 250 which results in retainer 308 moving in direction 406 against the bias of torsion springs 398 as illustrated in FIGS. 7 and 11. As shown in FIG. 11, recess 430 of retainer 308 is no longer vertically aligned with tab 432 of blocker 306.

Figure 12:
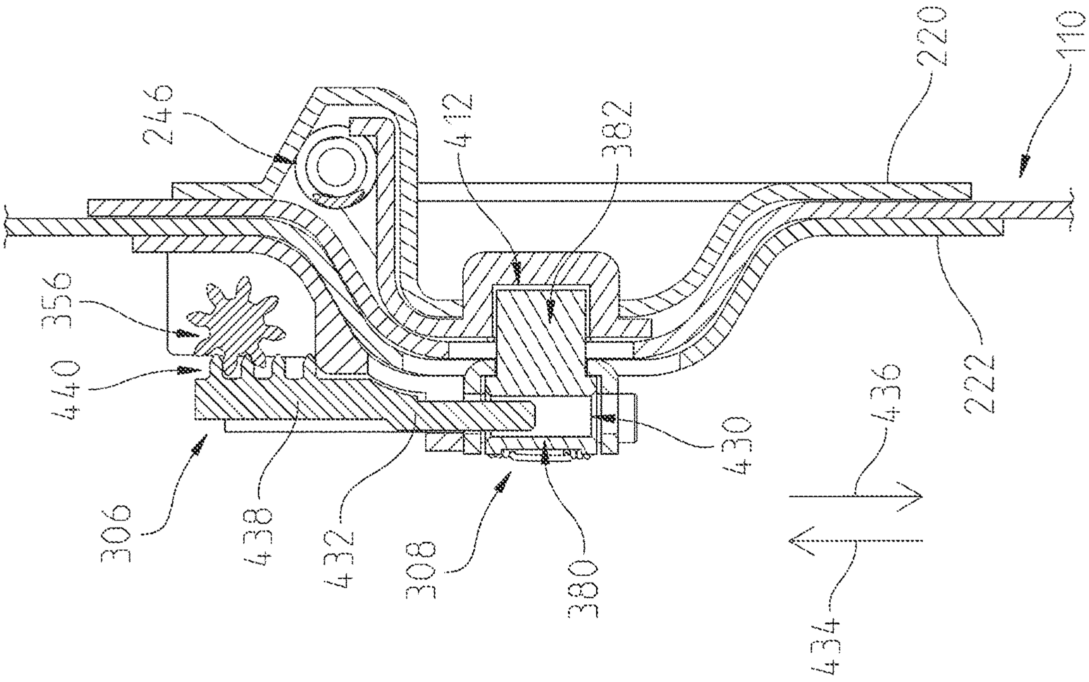
FIG. 12 illustrates the sectional view of FIG. 9 with the blocker and the retainer of the door lock being in the locked configuration of FIG. 4 and the bolt in the retracted position of FIG. 8.

As the operator continues to move operator actuatable input 202 in direction 250, protrusion 382 of retainer 308 is received in first recess 410 of integral slide 232, as illustrated in FIGS. 8 and 12 which corresponds to actuator 304 being in the retracted position. Controller 302 rotates pinion gear 356 in direction 372 to lower tab 432 of blocker 306 into recess 430 of retainer 308; thereby preventing an operator from pushing on operator actuatable input 202 in direction 252 to once again move bolt 204 to the extended position.

In embodiments, door lock 200 includes at least one sensor such as a position sensor to monitor when protrusion 382 of retainer 308 is fully seated in first recess 410 of slide 232 or in second recess 412 of slide 232. Controller 302 is operatively coupled to the at least one sensor.

If an operator moves slide 232 only part way as shown in FIG. 7 and releases operator actuatable input 202, door lock 200 moves slide 232 to the position shown in FIG. 6. This movement is due to the biasing of slide 232 to the position of FIG. 6, by biasing member 246 (see FIG. 13).

In embodiments, controller 302 stores an audit trail in memory 312 of the credential and date/time that door lock 200 was actuated to one of the locked configuration (see FIGS. 1A and 6) and the unlocked configuration (see FIGS. 1B and 8). The audit trail may be communicated to portable operator device 330 for review or subsequent transmission to a remote computing device.

FIGS. 15-35 illustrate an alternative embodiment of the present disclosure. More particularly, door lock 200*a* is illustrated. Throughout this disclosure, associated elements of the various embodiments are identified with the same reference numeral, but may also include an alphabetic indicator to distinguish between the various embodiments. Elements bearing the same reference numeral (with or without an alphabetic indicator) have similar functionality, but not necessarily identical or even similar structure. Door lock 200*a* provides the same functionality as door lock 200, i.e., door lock 200*a* controls the ability to move door 110 (when door lock 200*a* is installed in place of door lock 200 as shown in FIGS. 1A and 1B) from a closed position to an open position. Door lock 200*a* includes operator actuatable input 202*a* (FIGS. 18, 20-22, and 28) accessible from an exterior of storage container 100. Through an actuation of operator actuatable input 202*a* (which will be further described hereinbelow), bolt 204*a* of door lock 200*a* is moved from an extended position (FIGS. 16, 22, 23A, 26, 27, 30, and 32) to a retracted position (FIGS. 15, 23, 24, 25, 29, 31, and 33). When bolt 204*a* is in the extended position, a first end 208*a* of bolt 204*a* is received in a recess in storage container 100 to block rotation of door 110 in direction 112 (FIG. 1A) or vertical movement of door 110. A recess operable to cooperate with door lock 200*a* in this way is recess 120 illustrated in FIG. 6 in conjunction with door lock 200. Similar to the arrangement of door lock 200 shown in FIG. 8, when bolt 204*a* of lock 200*a* is in the retracted position, first end 208*a* of bolt 204*a* is positioned outside of a recess, e.g., recess 120 of storage container 100, and does not block actuation of a door to which it is attached. Based on its ability to alternately block (when extended) and allow movement (when retracted) of a door to which it is attached, bolt 204*a* can be referred to as a "blocker."

Figure 28:
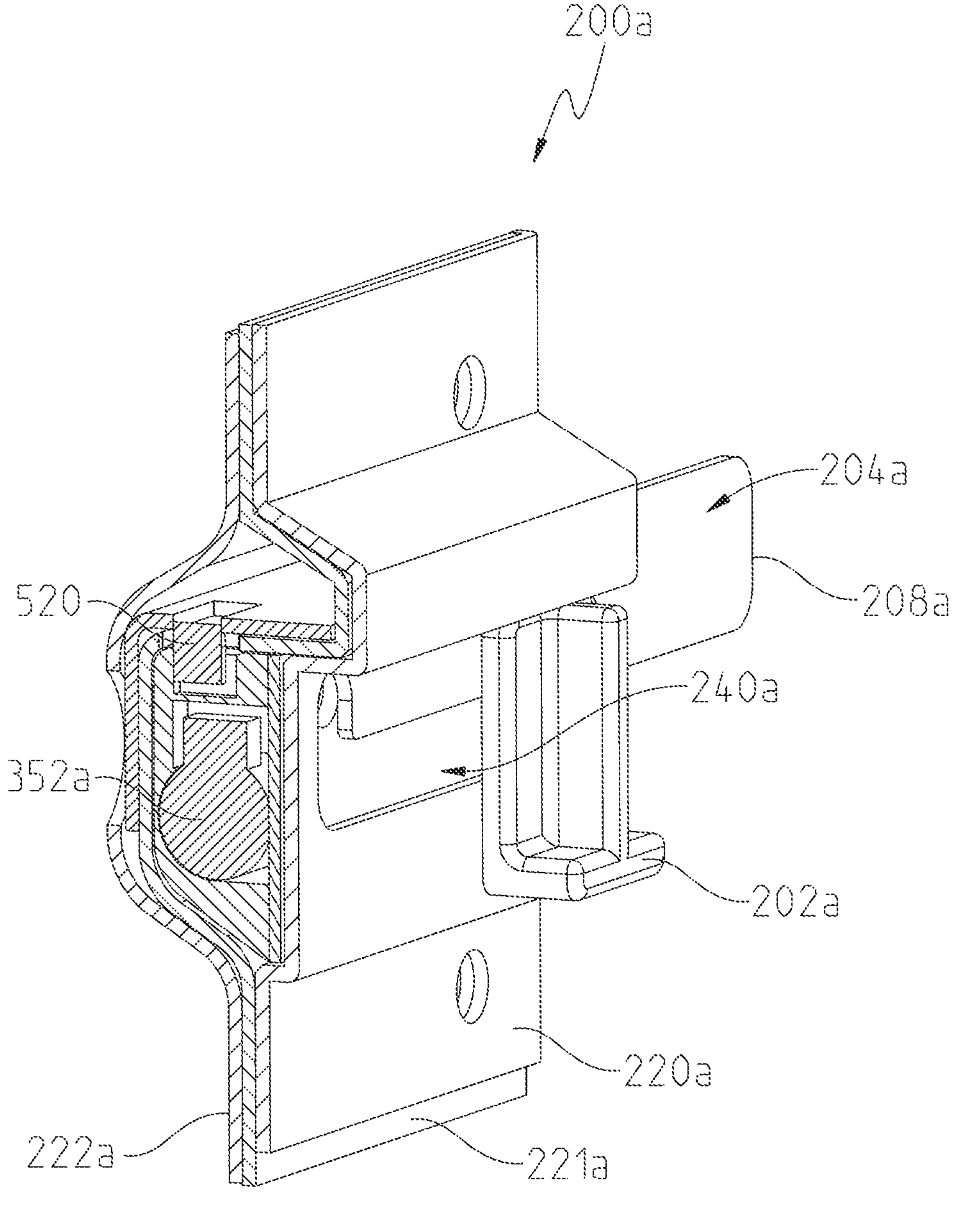
FIG. 28 is a sectional view of the lock of FIGS. 15-27 taken through a section plane intersecting the tab and slot used to secure the actuation subassembly to the slider for translation therewith.
Figure 29:
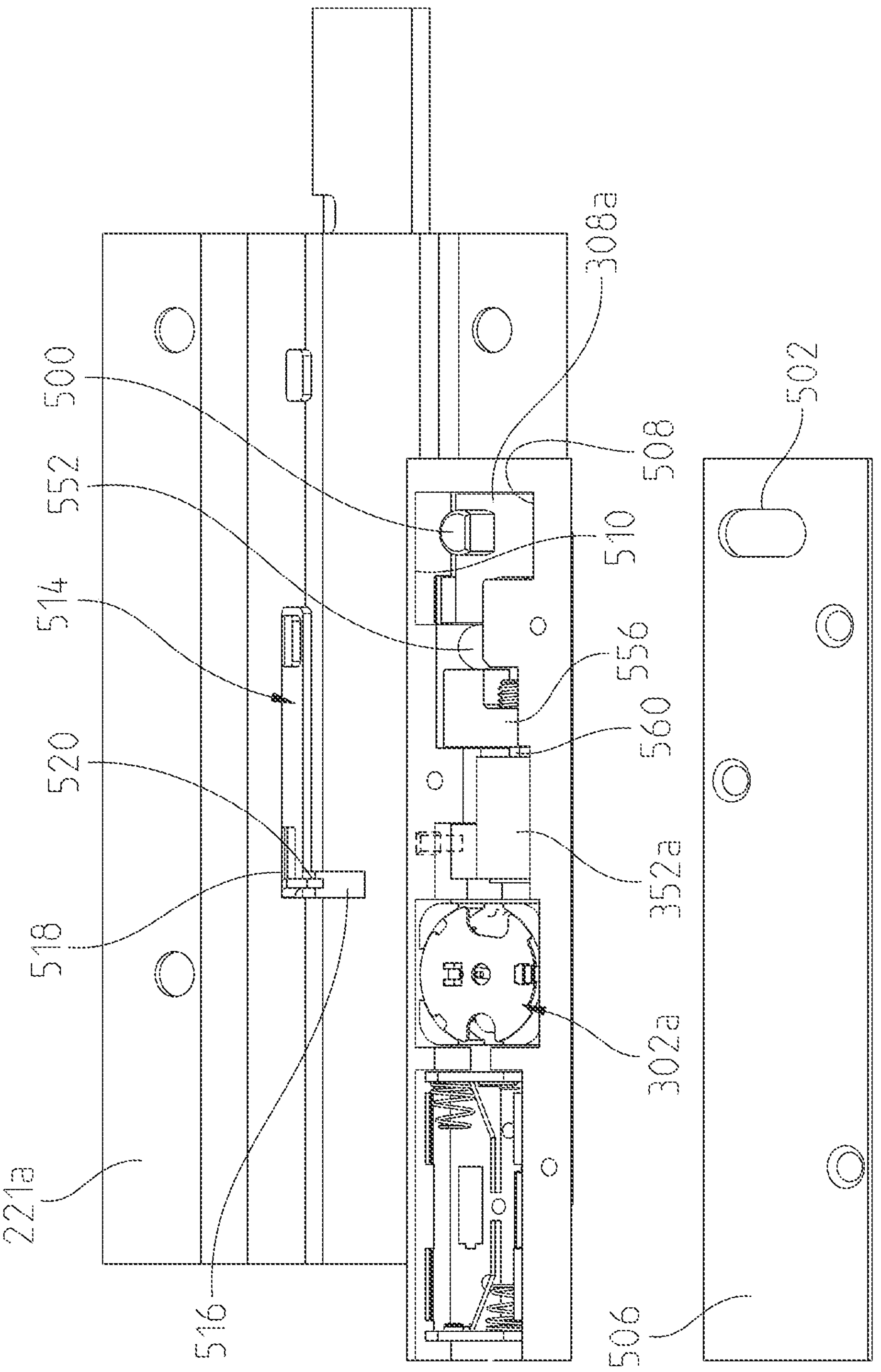
FIG. 29 is an exploded view of the lock shown in FIGS. 15-28, showing disengagement of the actuation subassembly from the slider and showing the bolt in the retracted position.
Figure 30:
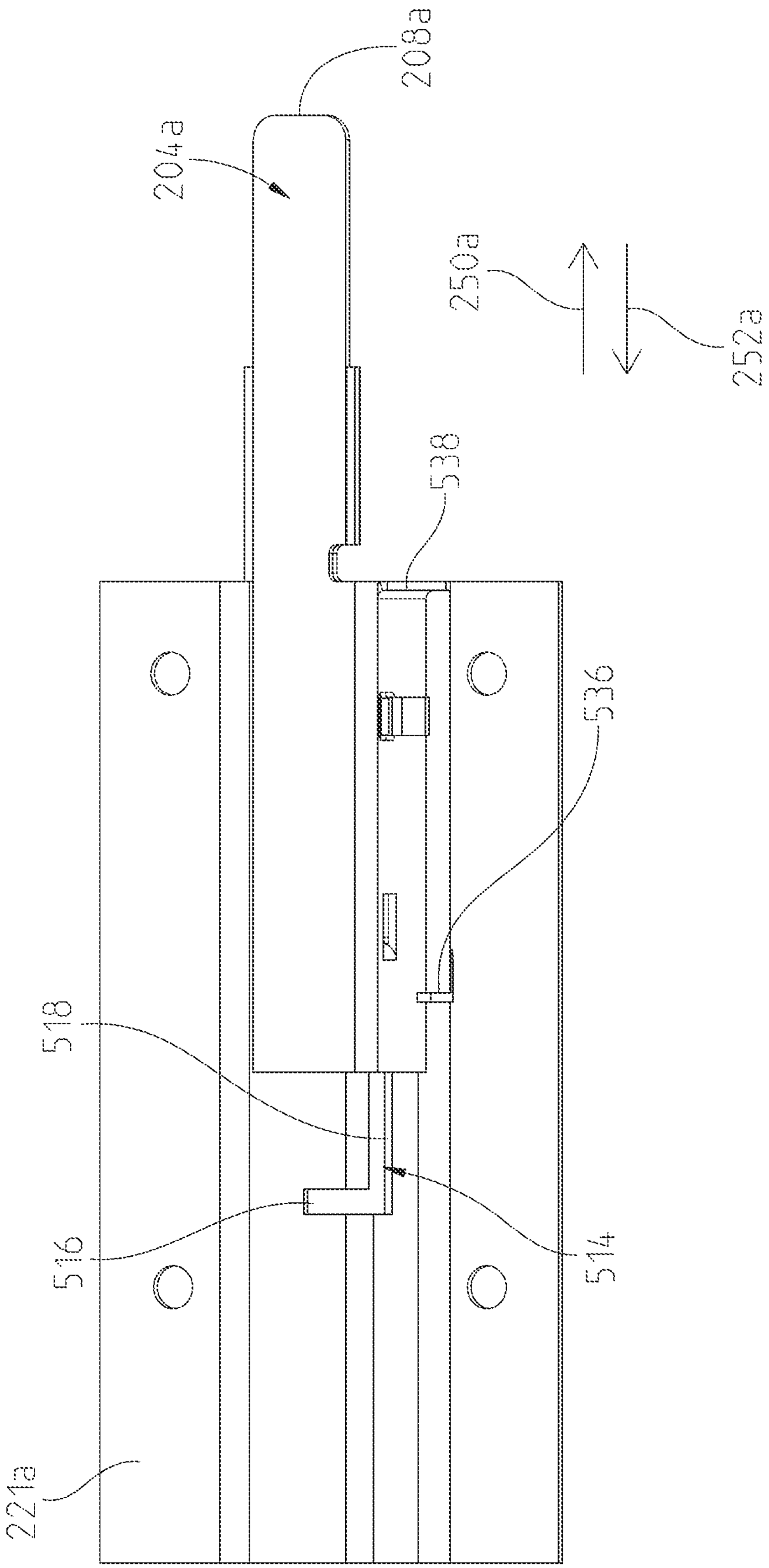
FIG. 30 is a rear perspective view of the slider and rear mounting bracket of the lock of FIGS. 15-29, showing the slider in the extended position.

Lock 200*a* includes front mounting bracket 220*a* and intermediate mounting bracket 221*a* as shown, e.g., in FIGS. 15, 16, 20, 22, and 28. FIG. 28 also illustrates rear mounting bracket 222*a*. Similar to the arrangement of lock 200 shown in FIGS. 2A and 2B, front mounting bracket 220*a* can be placed over a front side 122 (see FIG. 6) of door 110 and rear mounting bracket 222*a* can be placed over a rear side 124 (see FIGS. 3A and 6) of door 110. Front mounting bracket 220*a* and rear mounting bracket 222*a* can be, in use, secured to door 110. In the illustrated embodiment as shown in FIG. 3A, door 110 includes a plurality of apertures 130, front mounting bracket 220*a* includes a plurality of apertures 226*a* (FIG. 20) alignable with the plurality of apertures 130 of door 110. Intermediate mounting bracket 221*a* and rear mounting bracket 222*a* (FIG. 28) each include a plurality of apertures corresponding to apertures 226*a* (FIG. 20) and also alignable with the plurality of apertures 130 of door 110. Fasteners (not shown) pass through respective aligned sets of apertures to hold front mounting bracket 220 and rear mounting bracket 222 to door 110.

Exemplary fasteners include bolts having heads which are positioned on top of front mounting bracket 220*a* and threaded shafts extending beyond rear mounting bracket 222*a*. The bolts are secured with nuts. The shape of the bolt heads prevents a tool being applied exterior to storage container 100 to loosen the nuts from the bolts. Other exemplary fasteners include weldments, tabs of front mounting bracket 220*a* which pass through door 110 and are secured to rear mounting bracket 222*a* and other suitable structures to secure one or both of front mounting bracket 220 and rear mounting bracket 222 to door 110.

Figure 15:
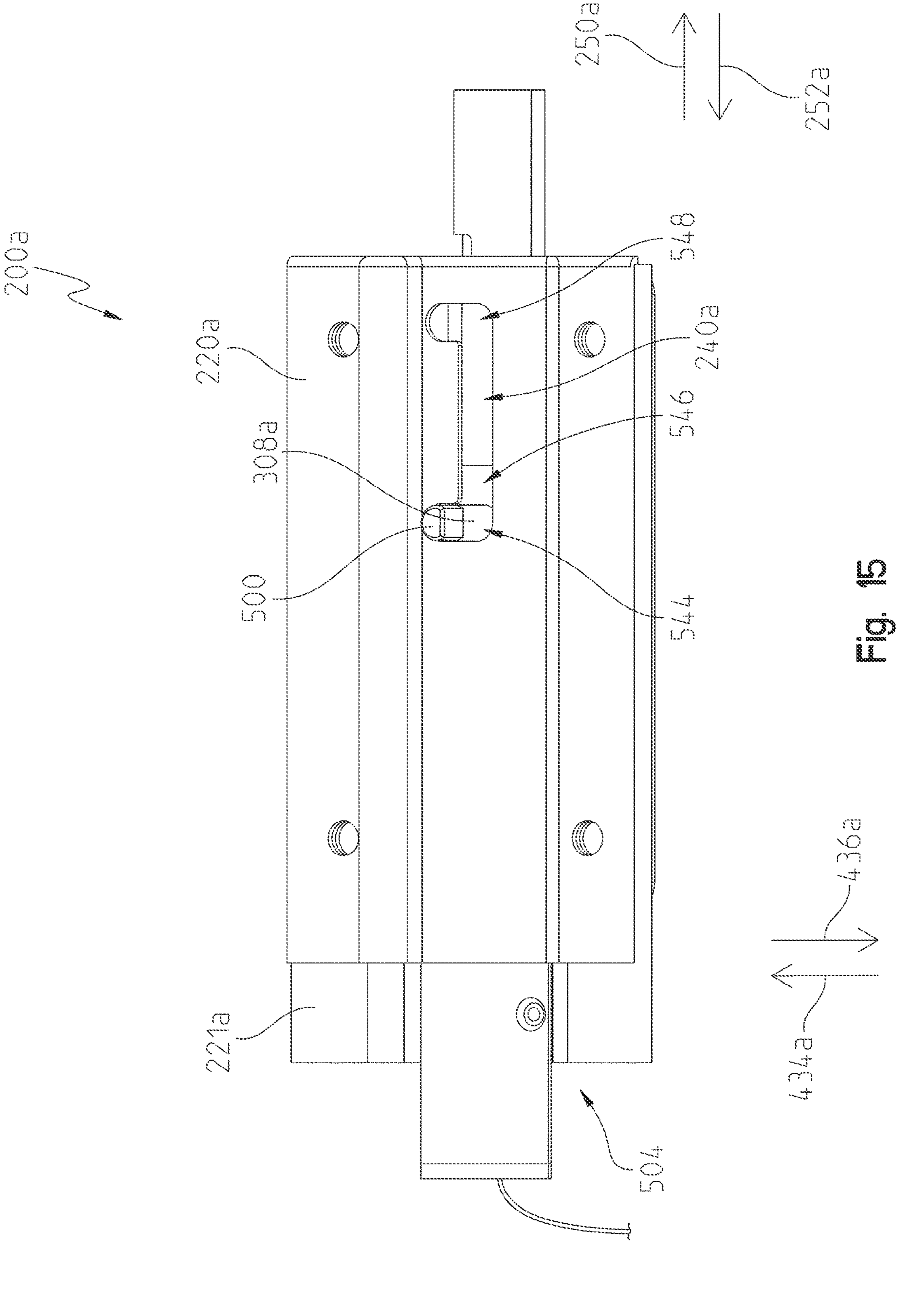
FIG. 15 is a perspective view of an alternative embodiment lock in accordance with the present disclosure showing the bolt in a retracted position.
Figure 16:
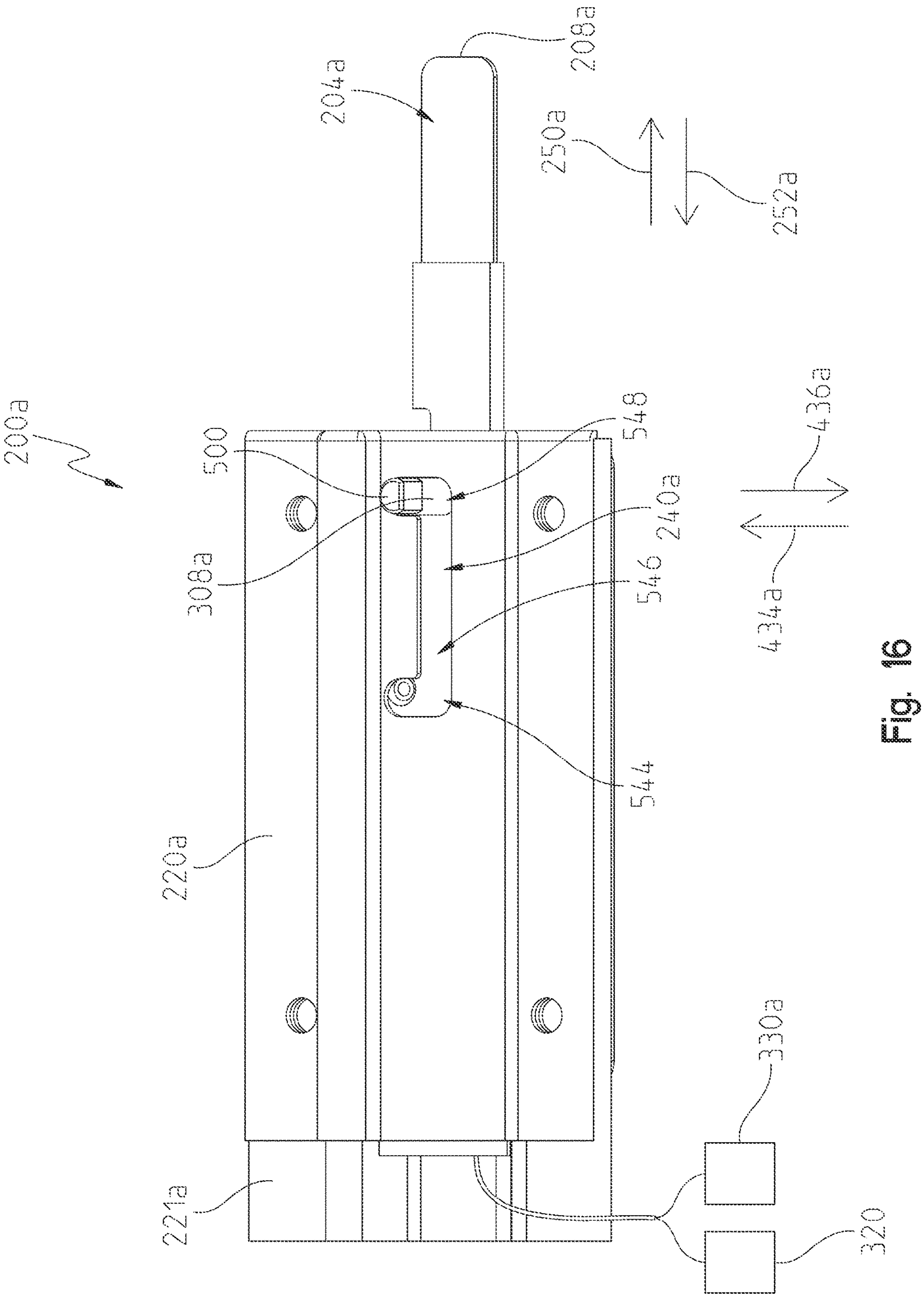
FIG. 16 is a perspective view of the lock of FIG. 15, showing the bolt in n extended position.
Figure 20:
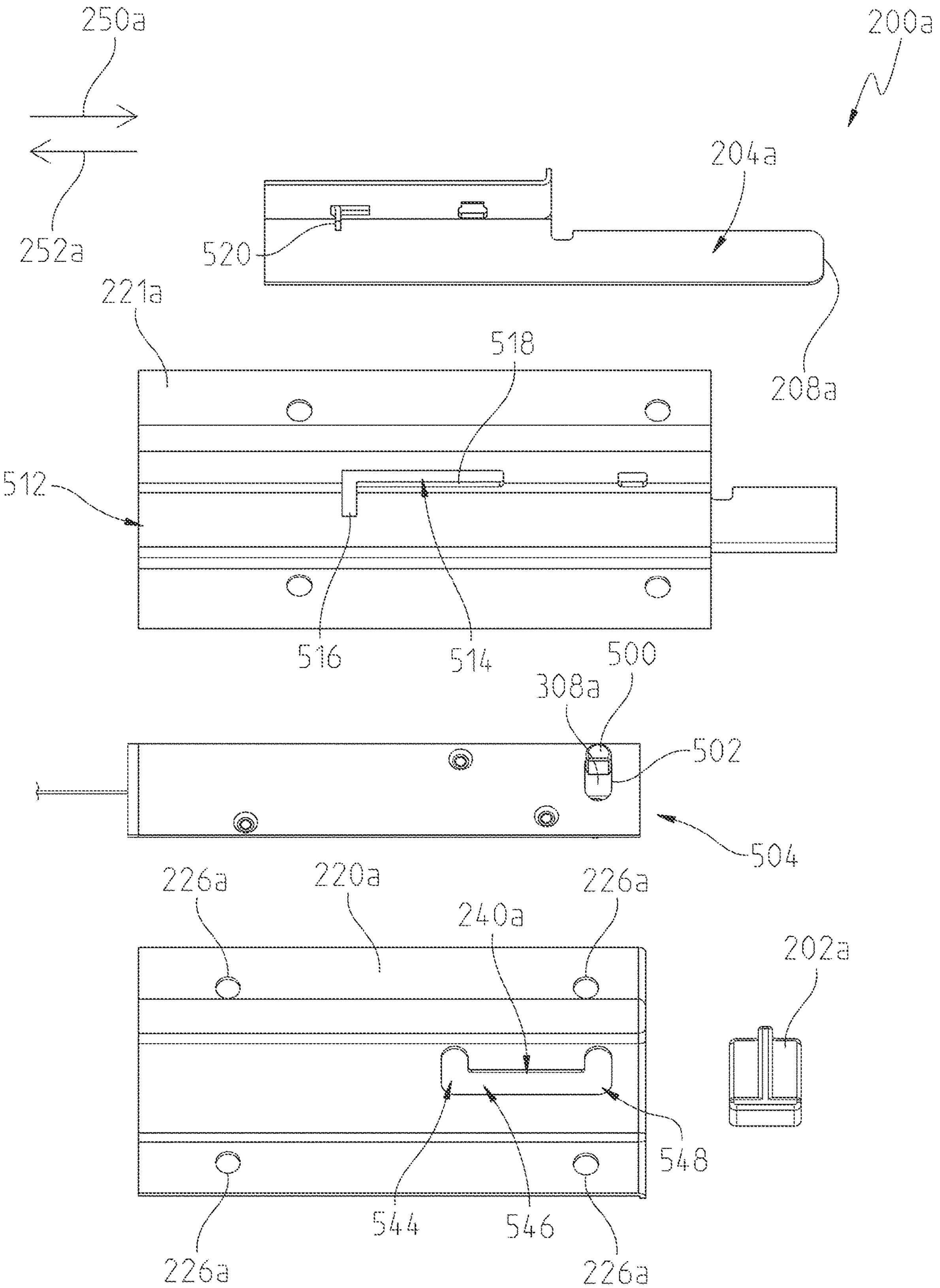
FIG. 20 is a perspective, exploded view of the lock shown assembled in FIGS. 15 and 16.

Referring to FIGS. 15, 16, and 28, front mounting bracket 220*a* includes U-shaped aperture 240*a* which receives boss 500 of retainer 308*a*. Operator actuatable input 202*a* is secured to boss 500 and is operable to actuate boss 500 through U-shaped aperture 240*a*. Boss 500 can be secured to operator actuatable input via an interference fit. Referring to FIG. 20, boss 500 is vertically actuatable in slot 502 of subassembly 504. As illustrated in FIGS. 24-27, and 29, slot 502 is formed in faceplate 506 of subassembly 504. Slot 502 is sized relative to boss 500 to allow vertical travel of boss 500 through vertically oriented slot 502 while resisting lateral movement of boss 500.

Boss 500 extends from subassembly 504 through slot 502 of faceplate 506 and is sufficiently long to extend through U-shaped aperture 240*a* of front mounting bracket 220*a* and engage operator actuatable input 202*a*. With operator actuatable input 202*a* secured to boss, subassembly 504 is free to slide laterally, i.e., along directions 250*a* and 252*a* (FIGS. 15 and 16) when permitted by U-shaped aperture 240*a* of front mounting bracket 220*a*. In the position shown, e.g., in FIGS. 15 and 24, retainer 308*a* is reciprocatable vertically along directions 434*a* and 436*a* within subassembly 504. Spring 550 (FIGS. 34 and 35) biases retainer 308*a* vertically along direction 434*a* into engagement with upper stop surface 510 of subassembly 504. Spring 550 can be positioned in an aperture (not shown) in retainer 308*a* to allow retainer 308*a* to be actuated against the spring force until retainer 308*a* sits against lower stop surface 508. The spring of this exemplary embodiment is a compression spring that is positioned at one end against retainer 308*a* (at the internal end of an internal aperture in certain embodiments) and at the other end against lower stop surface 508 of subassembly 504.

Referring primarily to FIGS. 15 and 20, subassembly 504 is sized and shaped to translate laterally along directions 250*a* and 252*a* when sandwiched between front mounting bracket 220*a* and intermediate mounting bracket 221*a*. More particularly, subassembly 504 is sized and shaped to translate along directions 250*a* and 252*a* within groove 512 of intermediate mounting bracket 221*a*. Groove 512 allows lateral movement of subassembly 504 positioned therein, while resisting vertical and rotational movement of subassembly 504. Translation of subassembly 504 within groove 512 yields extension or retraction of bolt 204*a*. Specifically, translation of subassembly 504 along direction 250*a* from the position shown in FIGS. 15 and 24 to the position shown in FIGS. 16 and 26 extends bolt 204*a*. Conversely, translation of subassembly 504 along direction 252*a* from the position shown in FIGS. 16 and 26 retracts bolt 204*a*. Translation of subassembly 504 yields translation of bolt 204*a* because bolt 204 is secured to subassembly 504 for translation therewith.

Figure 17:
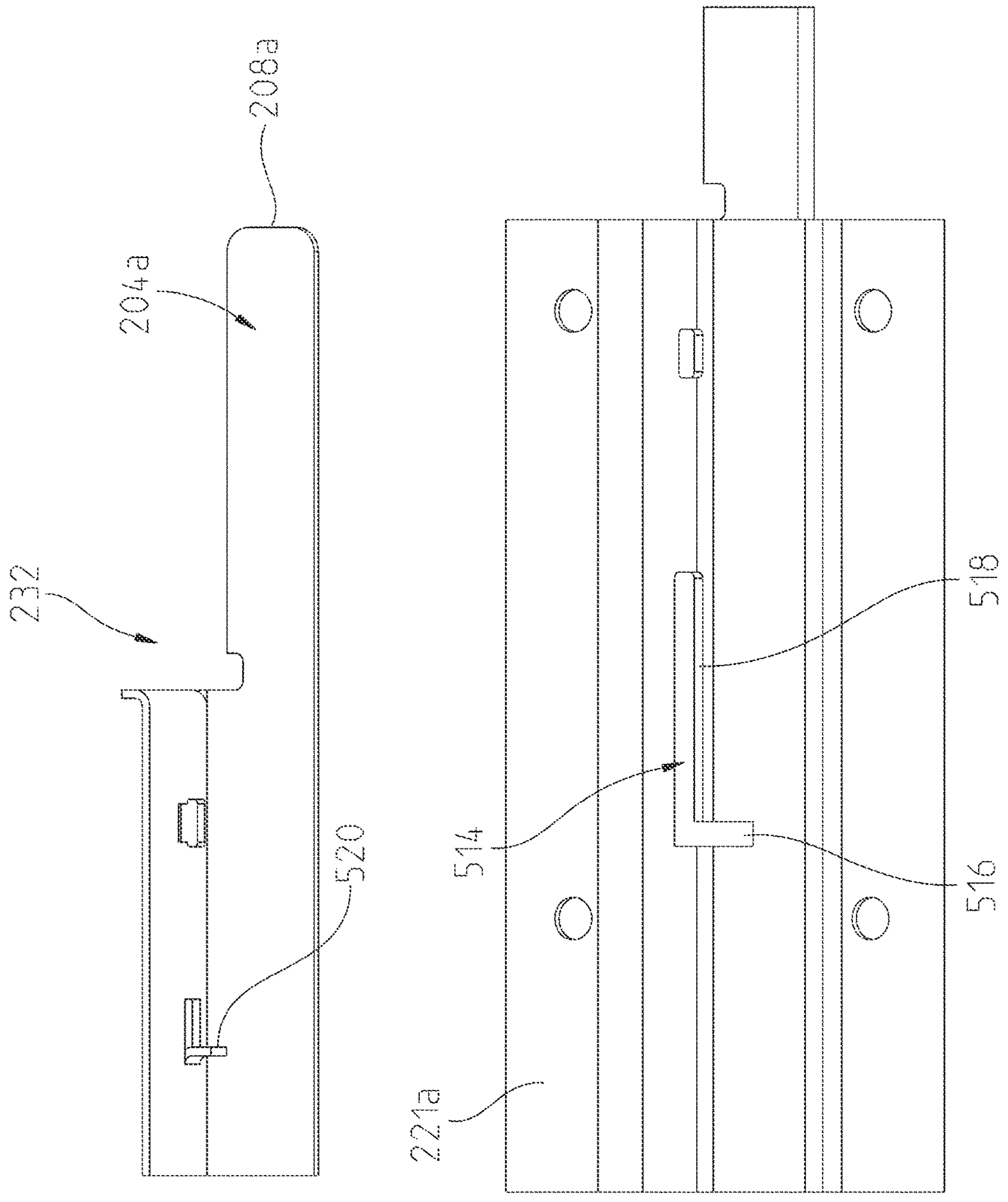
FIG. 17 is a perspective, exploded view showing the rear mounting bracket and the bolt carrying slide of the embodiment of FIGS. 15 and 16.
Figure 18:
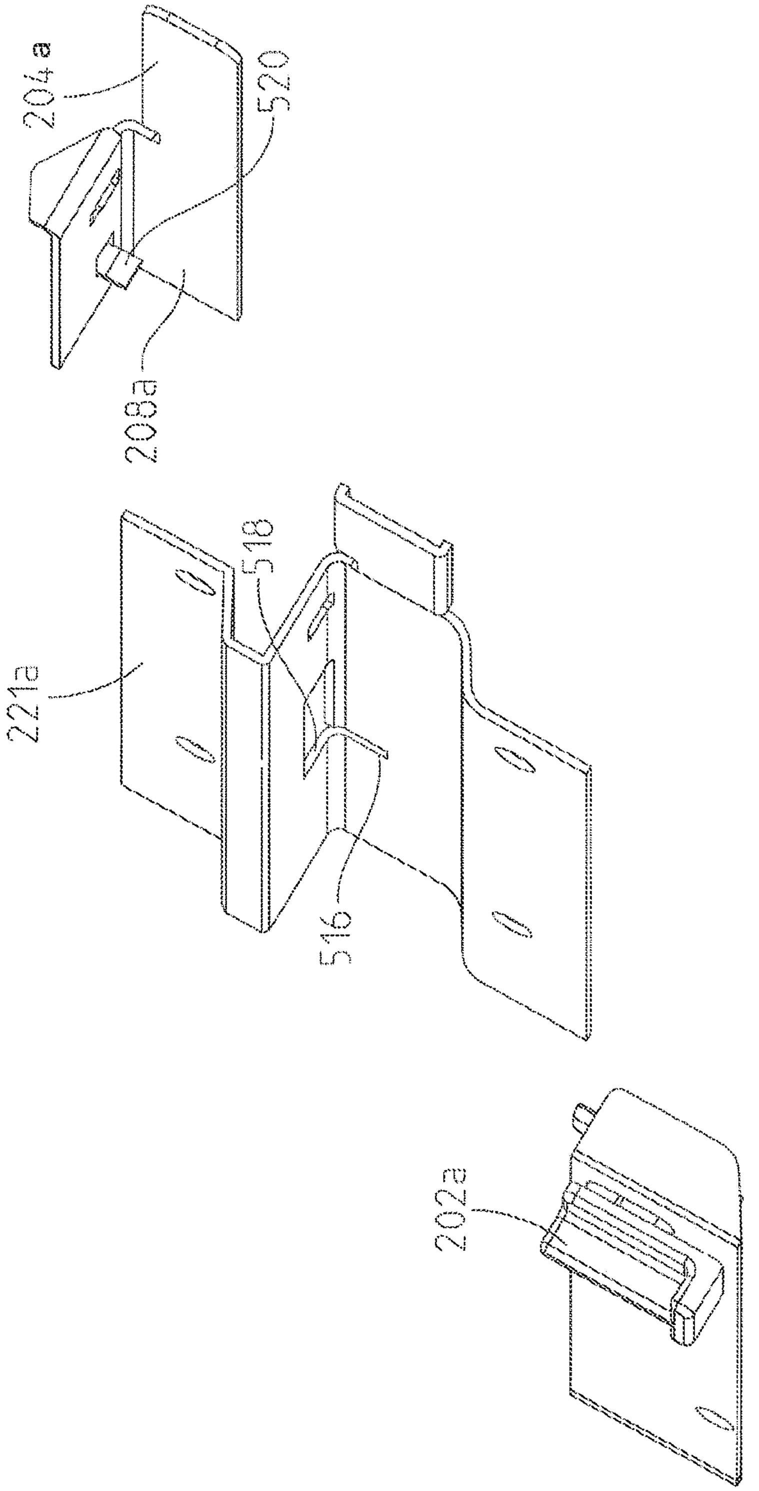
FIG. 18 is a perspective, exploded view of the rear mounting bracket, the bolt carrying slide and the actuation subassembly of the embodiment of FIGS. 15-17.
Figure 19:
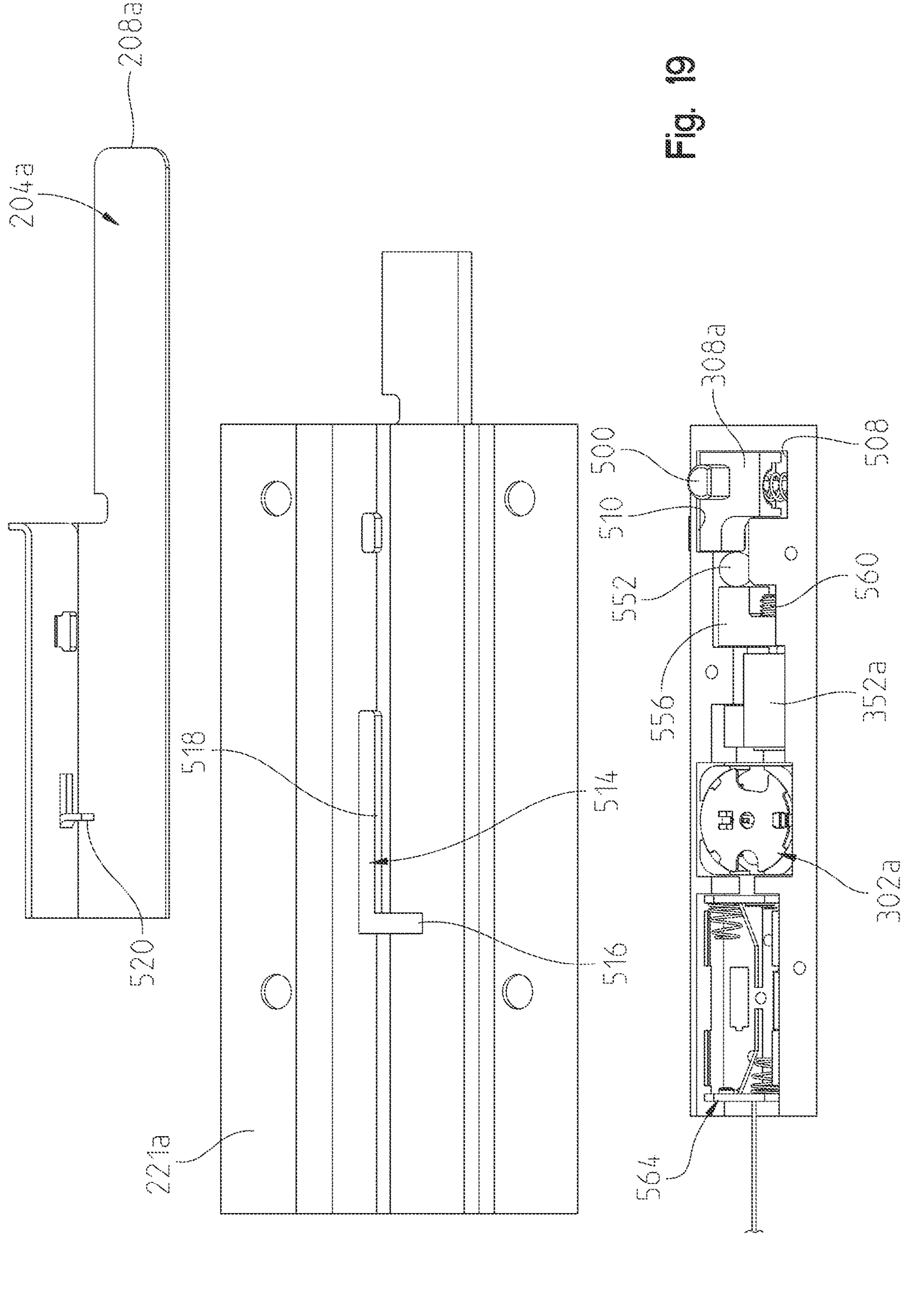
FIG. 19 is another perspective, exploded view of the rear mounting bracket, the bolt carrying slide and the actuation subassembly of the embodiment of FIGS. 15-18, with the front access panel of the actuation subassembly removed to reveal the internal components of the actuation subassembly.
Figure 21:
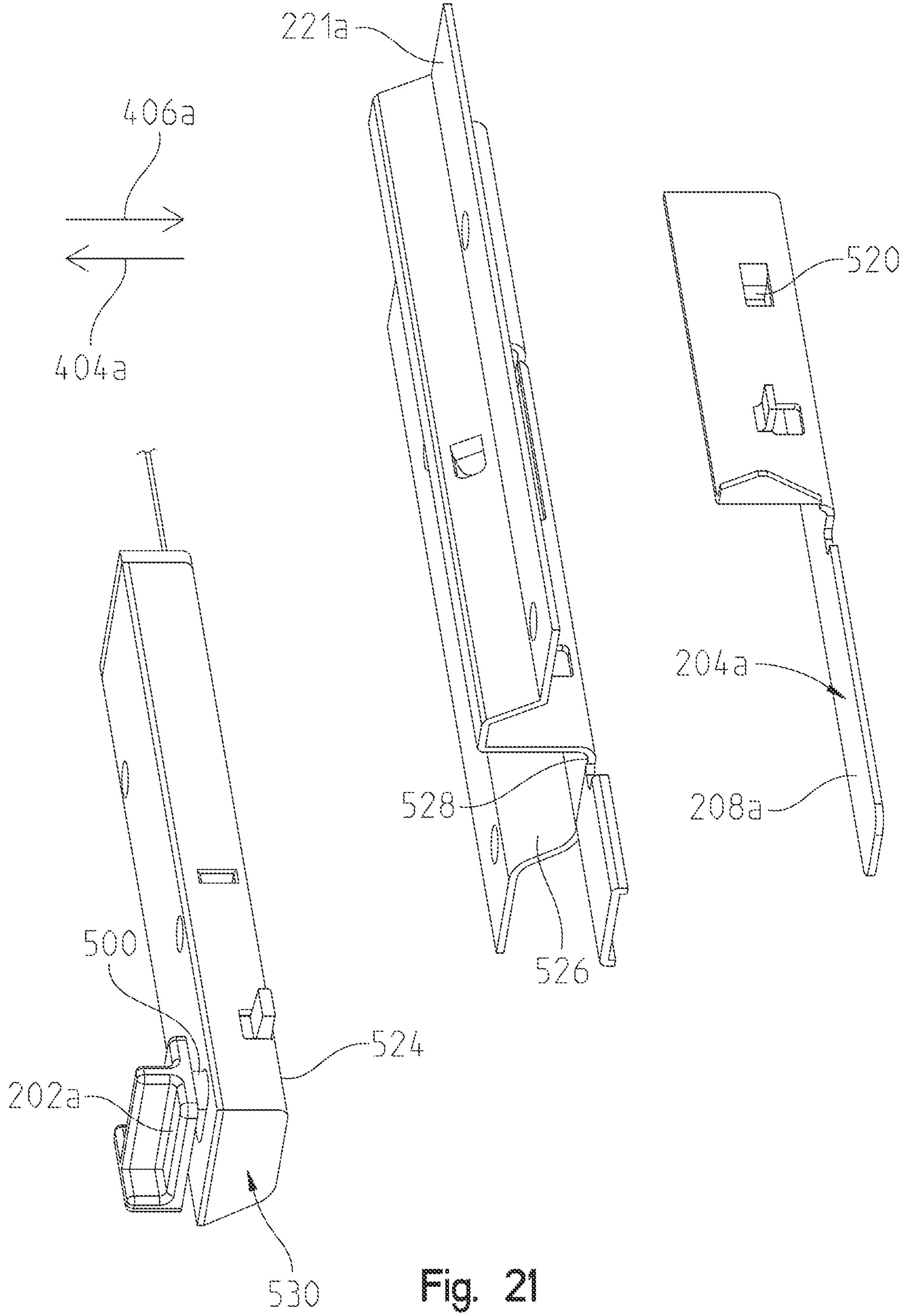
FIG. 21 is a perspective, exploded view showing the bolt carrying slider, rear mounting bracket and actuation subassembly of the embodiment shown in FIGS. 15-20.
Figure 22:
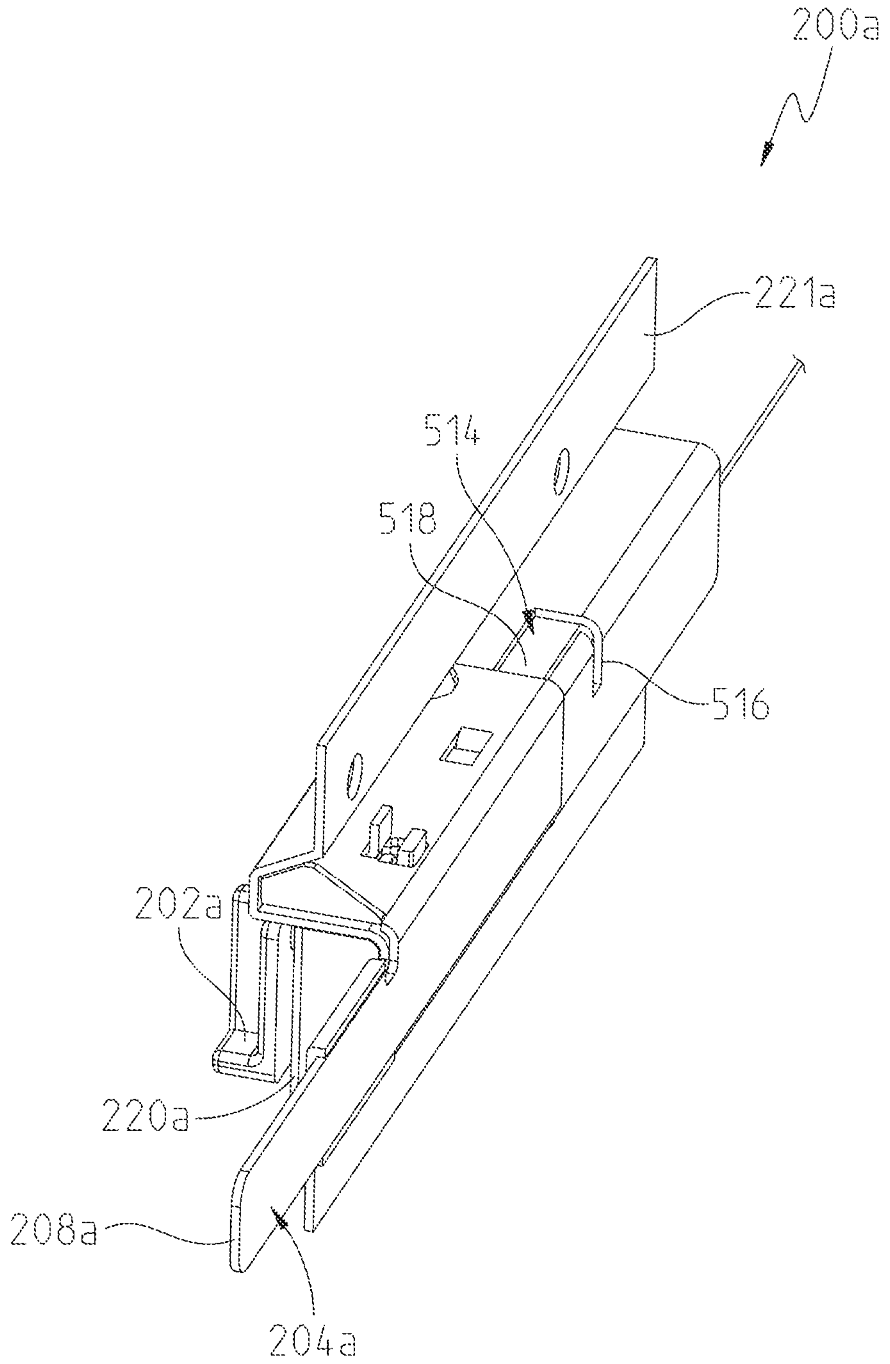
FIG. 22 is an assembled, perspective of the lock shown in FIGS. 15-21.
Figure 23:
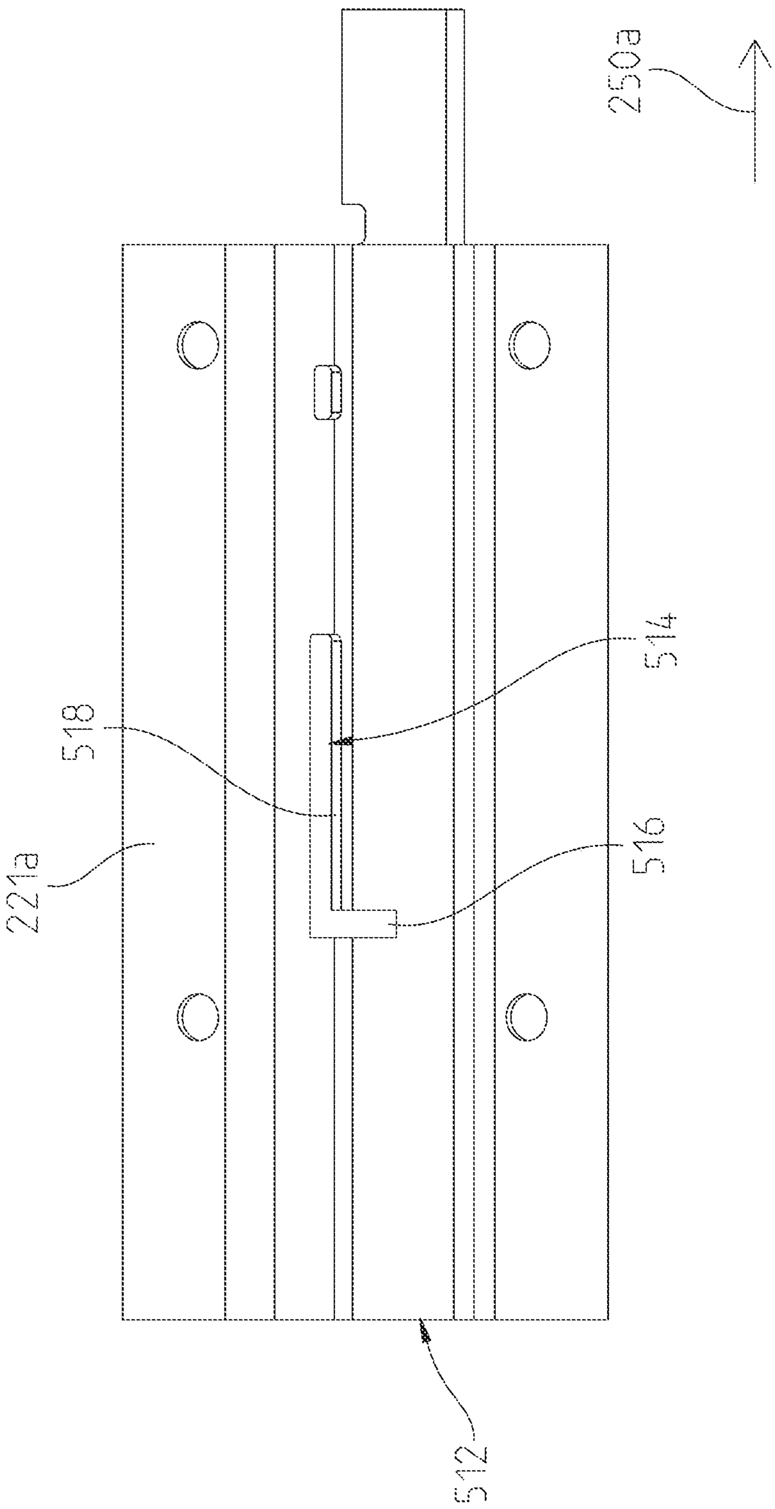
FIG. 23 is a partial perspective of the rear mounting bracket.
Figure 23A:
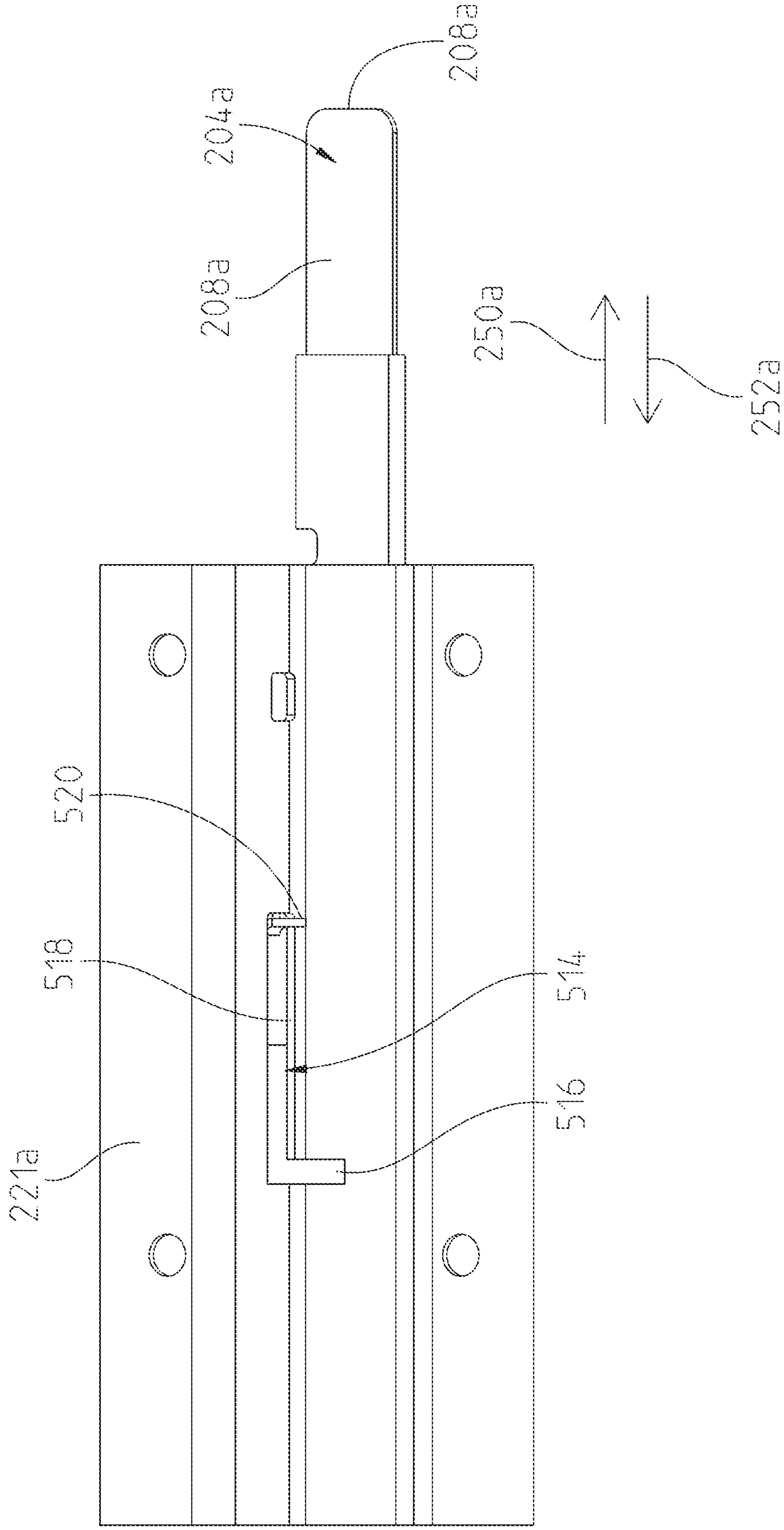
FIG. 23A is a partial perspective view of the lock shown n FIGS. 15-22 with the bolt carrying slider assembled to the rear mounting bracket and with the bolt shown in an extended position.
Figure 24:
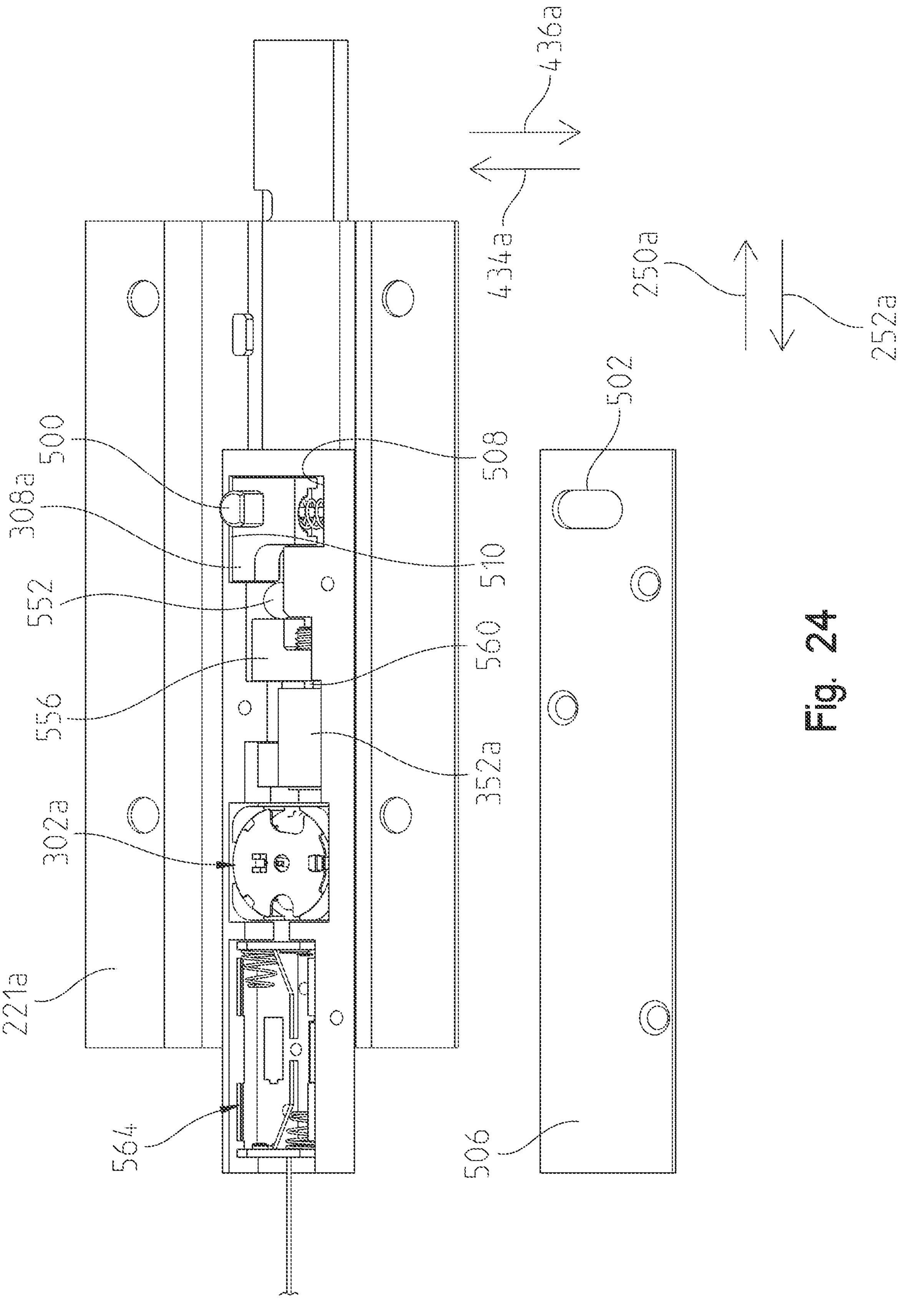
FIG. 24 is a perspective view of the lock of FIGS. 15-23 showing assembly of the actuation subassembly to the slider, with the front access panel of the actuation subassembly removed to reveal the internal components of the actuation subassembly and showing the retainer positioned to retain the bolt in a retracted position, as also shown in FIG. 15.
Figure 25:
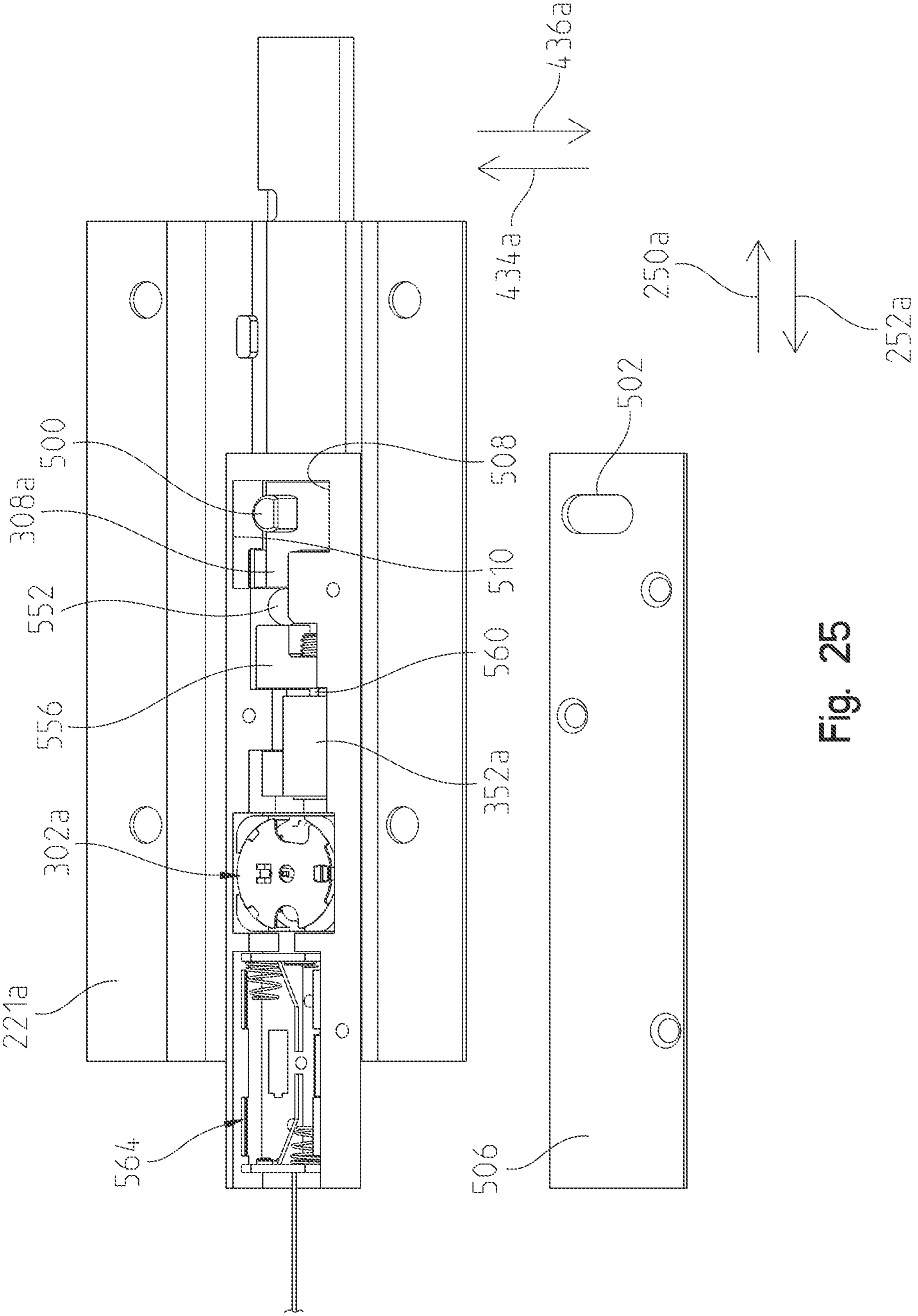
FIG. 25 is a perspective similar to the view of FIG. 24 with the exception that the retainer has undergone an initial actuation from the position of FIG. 24 to allow retraction of the bolt.
Figure 26:
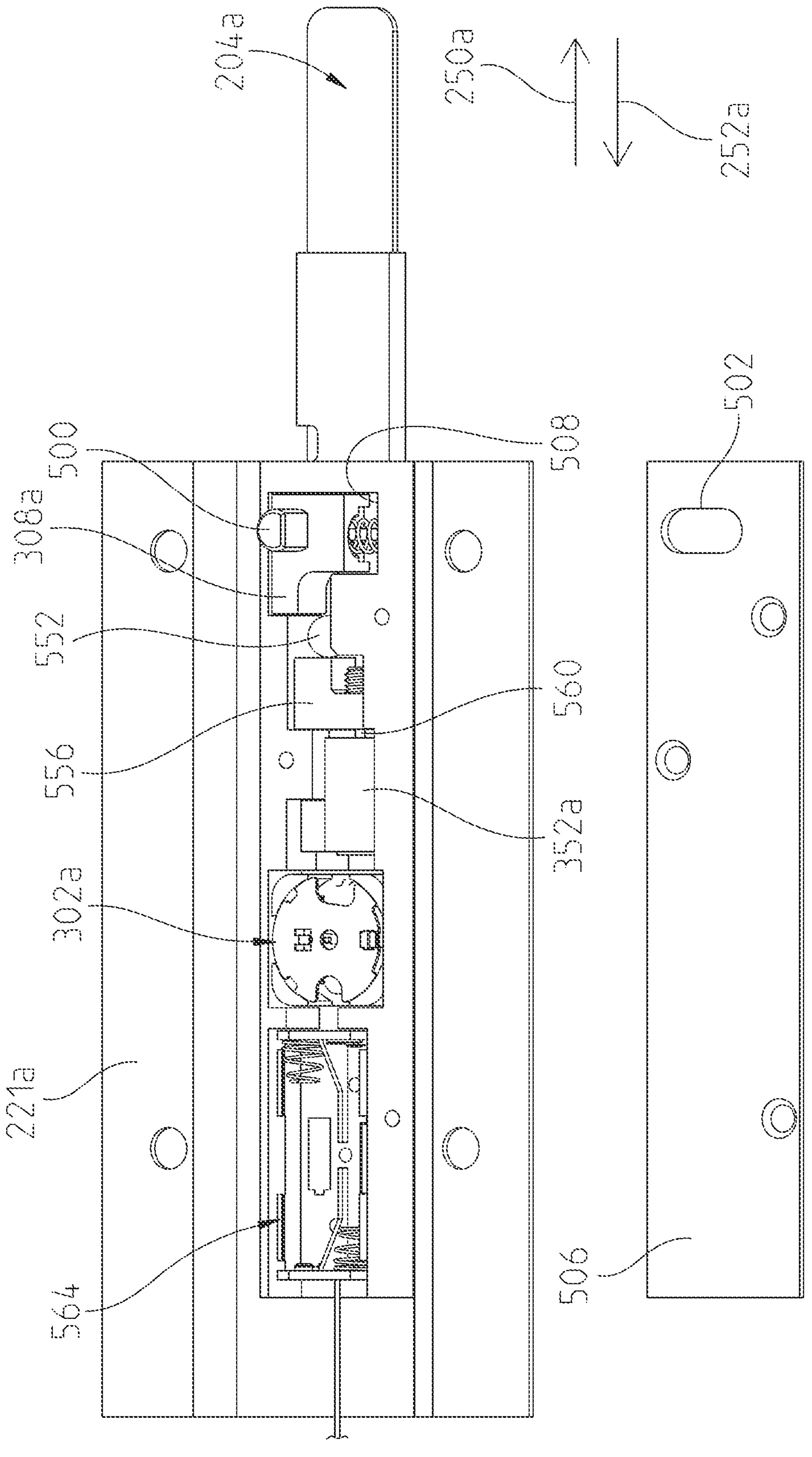
FIG. 26 is a perspective similar to the views of FIGS. 24 and 25, but showing the bolt in an extended position and the retainer returned to its normally biased position (from the position illustrated in FIG. 25)
Figure 31:
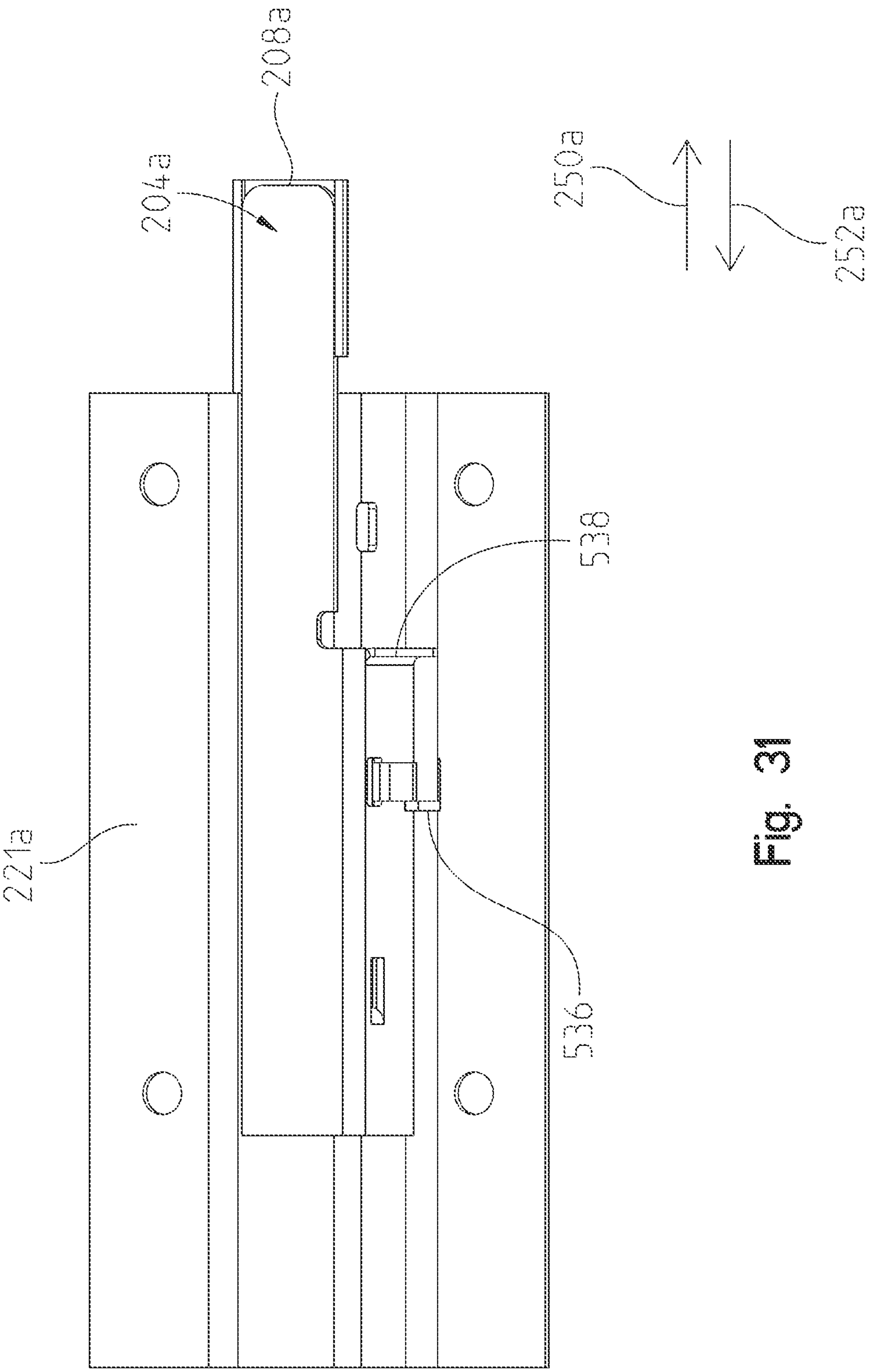
FIG. 31 is a rear perspective view of the slider and rear mounting bracket of the lock of FIGS. 15-29, showing the slider in the retracted position.
Figure 32:
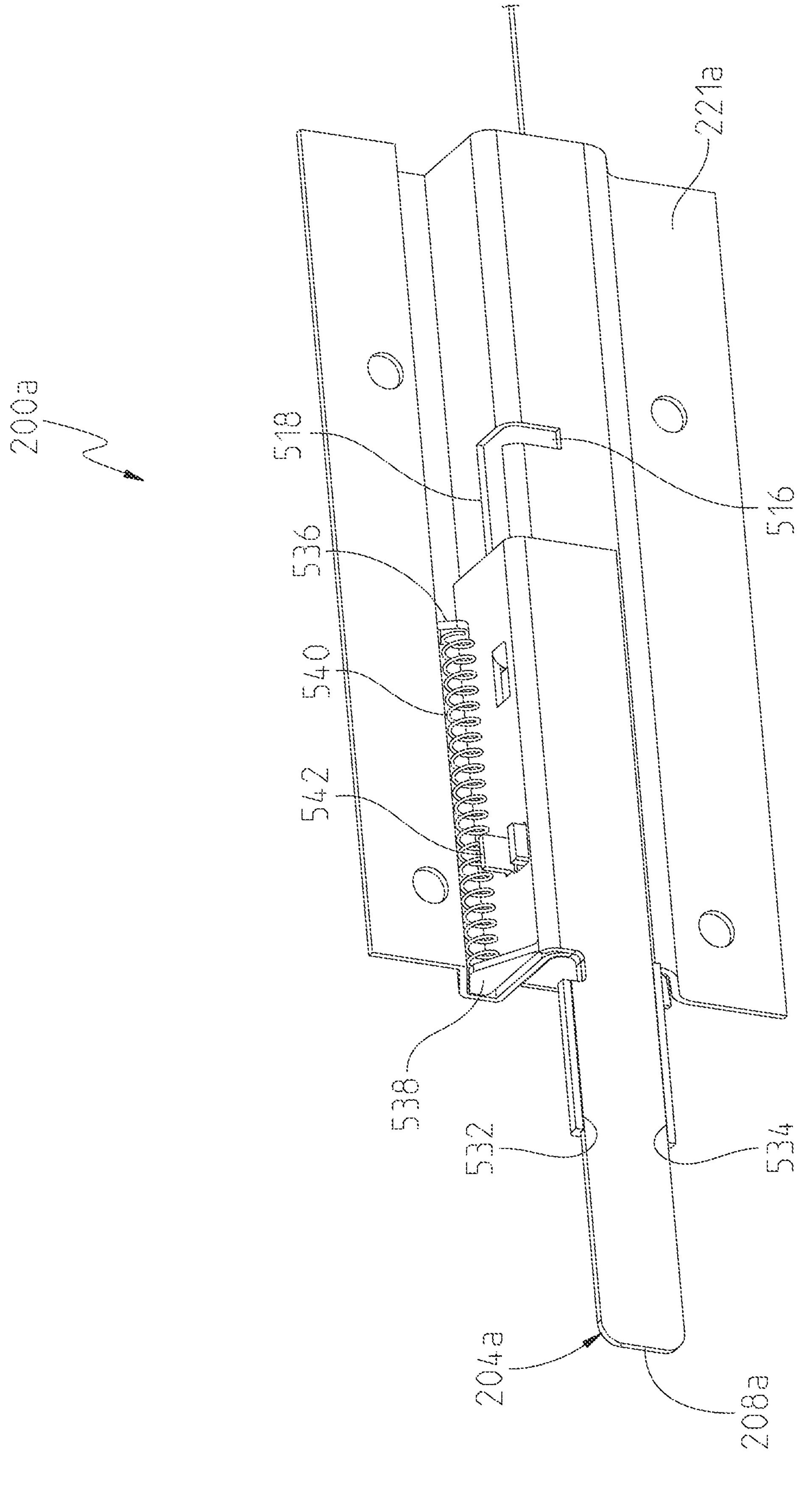
FIG. 32 is a rear perspective view illustrating the slider biasing element biasing the slider to an extended position.
Figure 33:
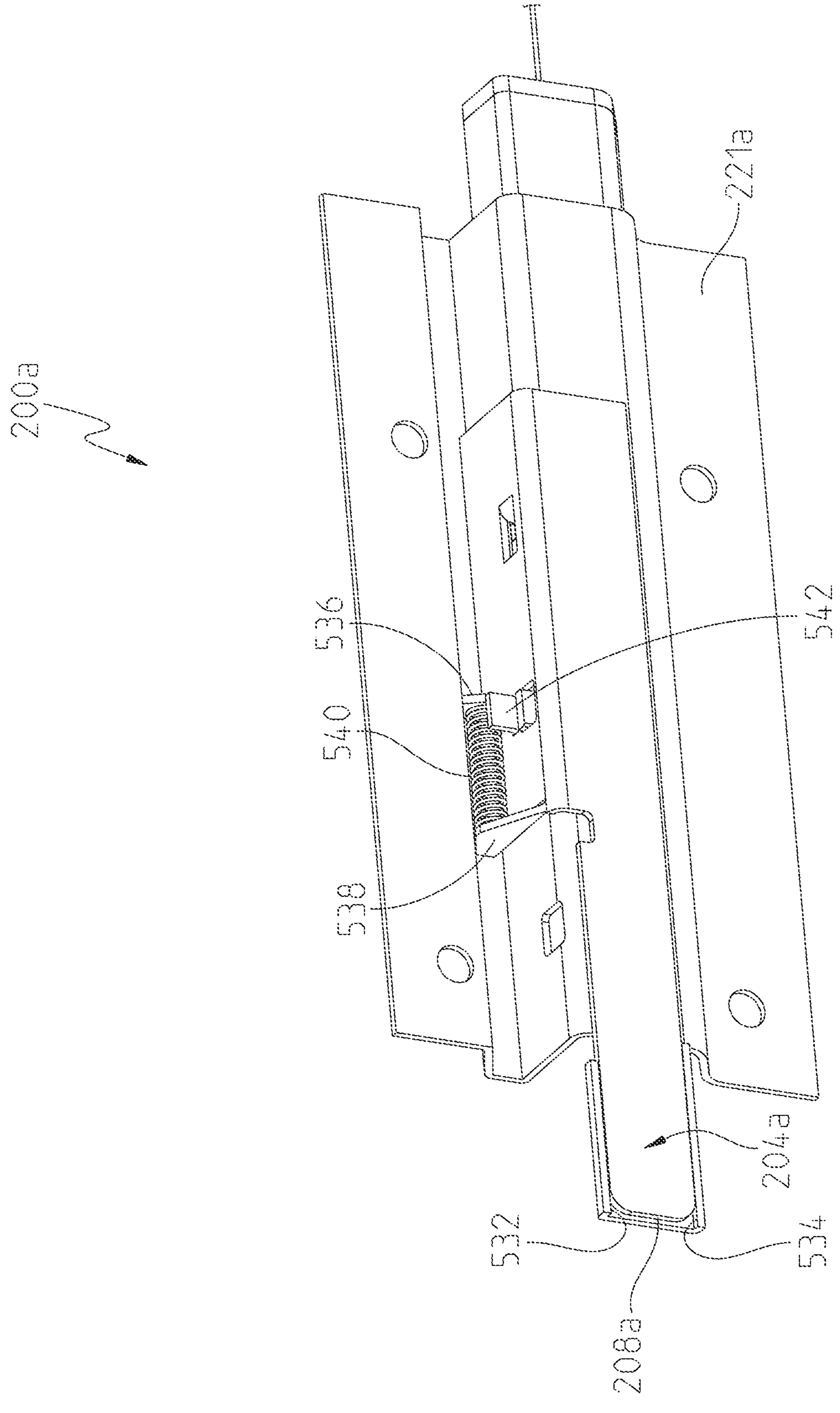
FIG. 33 is a rear perspective view illustrating the slider biasing element compressed to allow the slider to maintain a retracted position.

Referring primarily to FIGS. 17 and 20, intermediate mounting bracket 221*a* includes slot 514. Slot 514 includes vertically oriented entry leg 516 and travel leg 518. Vertically oriented entry leg 516 allows for assembly of slide 232 with intermediate mounting bracket 221*a*. With slide 232 separate from intermediate mounting bracket 221*a*, as shown in FIGS. 17, 20 and 21, guide tab 520 of slide 232*a* is aligned behind entry leg 516 of slot 514. From this position, slide 232 is moved relative to intermediate mounting bracket 221*a* along direction 404*a* (FIG. 21) until guide tab of slide 232*a* is positioned through entry leg 516 of slot 514 and slide 232*a* is flush with the backside of intermediate mounting bracket 221*a* as shown in FIG. 31. In this position, slide 232*a* can translate relative to intermediate mounting bracket 221*a* along directions 250*a*, 252*a*, with guide tab 520 riding in travel leg 518 of slot 514.

Slide 232*a* is shown at one extreme of travel at a first end of travel leg 518 of slot 514 in FIG. 31. The position shown in FIG. 31 corresponds with a retracted position of bolt 204*a*. Slide 232*a* is shown at the other extreme of travel at a second end of travel leg 518 of slot 514 in FIGS. 23A and 30. The position shown in FIGS. 23A and 30 corresponds with an extended position of bolt 204*a*.

Figure 27:
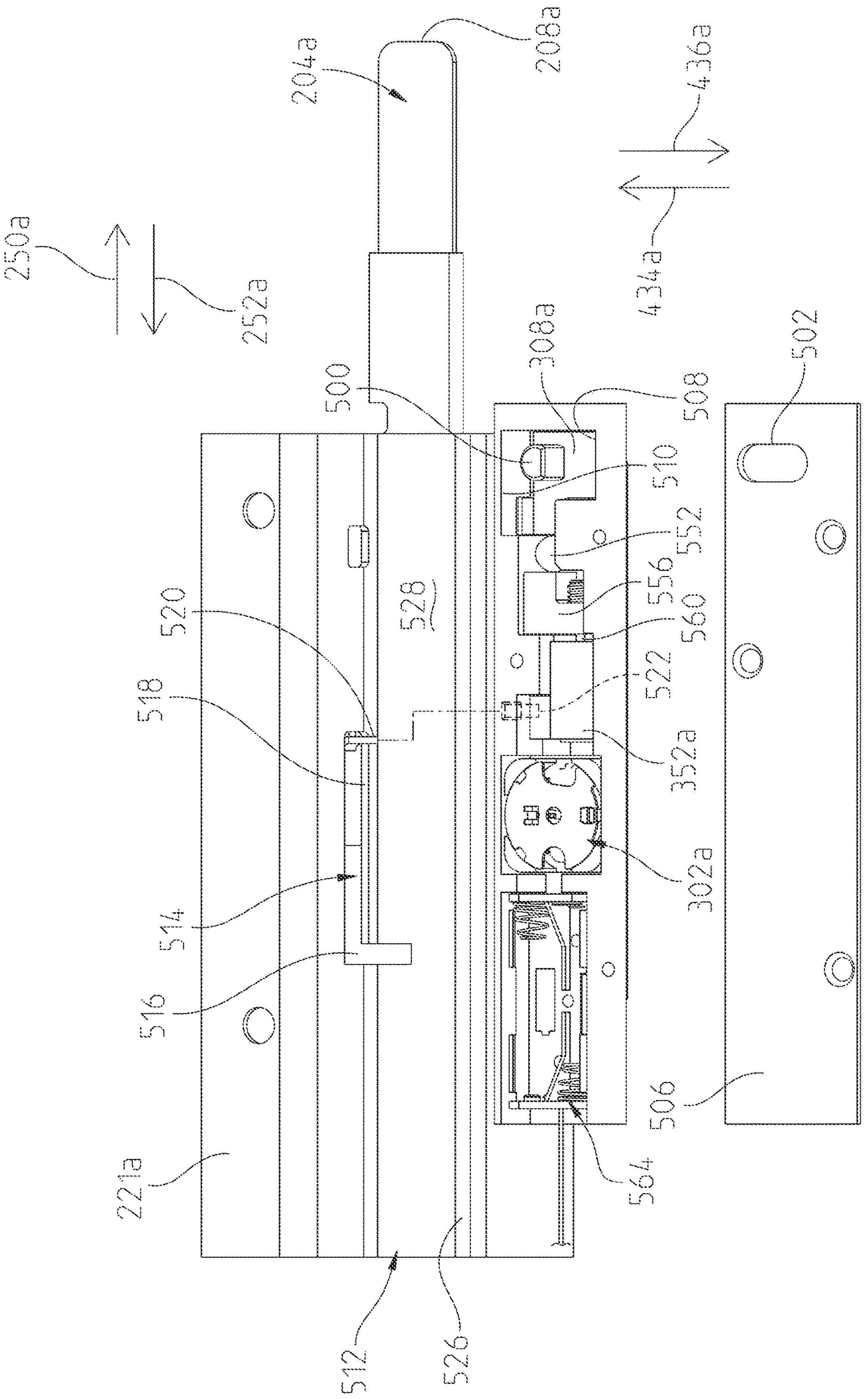
FIG. 27 is an exploded view of the lock shown in FIGS. 15-26, showing disengagement of the actuation subassembly from the slider and showing the bolt in the extended position.

With guide tab 520 of slide 232*a* operably positioned in slot 514, as described above, subassembly 504 can be operably connected to slide 232*a*. Referring to FIG. 27, subassembly 504 includes tab slot 522 sized to receive guide tab 520 securely. Tab slot 522 can receive guide tab 520 with a frictional engagement between the walls of subassembly forming tab slot and guide tab 520. This frictional engagement will allow slight rotational movement of subassembly 504 relative to guide tab 520 as subassembly 504 is rotated into groove 512 during assembly.

To assemble subassembly to intermediate mounting bracket 221*a* and slide 232, subassembly 504 is positioned relative to the subassembly of intermediate mounting bracket 221*a* and slide 232 (FIG. 23A), with tab slot 522 aligned with guide tab 520 of slide 232*a*, as shown in FIG. 27. From this position, subassembly 504 can be moved with leading edge 524 (FIG. 21) moved along direction 406*a* (FIG. 21). More particularly, leading edge 524 can ride along curved guide surface 526 of intermediate mounting bracket 221*a* and then substantially vertical guide surface 528 of intermediate mounting bracket 221*a* until guide tab 520 reaches the mouth of tab slot 522 in subassembly 504. At this point, trailing edge 530 of subassembly 504 rests atop curved guide surface 526. Subassembly 504 is then rotated, with tab 520 entering tab slot 522 and trailing edge 530 riding along curved guide surface 526 until achieving the finally seated position of subassembly 504 shown in FIGS. 24-26.

In the finally seated position, subassembly 504 substantially fills groove 512 of intermediate mounting bracket 221*a*, with sufficient clearance for subassembly 504 to move laterally along directions 250*a* and 252*a*. In this position, front mounting bracket 220*a* can be operably positioned for securement to intermediate mounting bracket 221*a* and rear mounting bracket 222*a*, as described above. With front mounting bracket 220*a* secured to intermediate mounting bracket 221*a*, subassembly 504 is sandwiched between front mounting bracket 220*a* and intermediate mounting bracket 221*a*, with sufficient clearance for the lateral movement of subassembly 504 relative to intermediate mounting bracket 221*a*, described above. Lateral movement of subassembly 504 is guided by the walls of intermediate mounting bracket 221*a* forming groove 512, including curved guide surface 526 and substantially vertical guide surface 528 and well as the undersurface of front mounting bracket 220*a* positioned atop subassembly 504.

With subassembly 504 operably seated, as shown in FIG. 15, operator actuatable input 202*a* can be secured to boss 500. With subassembly 504 operably positioned, seating of guide tab 520 in tab slot 522 works to retain slide 232*a* to the backside of intermediate mounting bracket 221*a*. With intermediate mounting bracket 221*a* secured atop a door, slide 232*a* is sandwiched between the door and intermediate mounting bracket 221*a*. Opposing guide surfaces 532, 534 can be used to guide lateral movement of bolt 204*a* along directions 250*a* and 252*a*. Referring to FIGS. 30-33, intermediate mounting bracket 221*a* includes spring stop 536 and slide 232*a* includes spring stop 538, between which spring 540 (shown only in FIGS. 32 and 33) is positioned. Spring 540 is a biasing member biasing bolt 204*a* into the extended position. More particularly, spring 540 is a compression spring that is compressed between spring stops 536, 538, with further compression of spring 540 required as bolt 204 is moved from the extended position to the retracted position. Spring 540 is guided by intermediate mounting bracket 221*a* and spring tab 542 of slide 232*a*.

Actuation of bolt 204*a* between the retracted position (see, e.g., FIGS. 15, 33 and 31) and the extended position (see, e.g., FIGS. 16, 32 and 30) is effected by operator actuatable input 202*a* moving boss 500 of retainer 308*a* from one end of aperture 240*a* to the other. Retainer 308*a* is incapable of lateral movement (i.e., movement along directions 250*a* and 252*a*) relative to the remaining components of subassembly 504; therefore, lateral movement of boss 500 in aperture 240*a* yields lateral movement of subassembly 504 in groove 512 of intermediate mounting bracket 221*a*, which, in turn yields lateral movement of bolt 204*a* between the retracted and extended positions, owing to the securement of tab 520 of slide 232*a* in tab slot 522 of subassembly 504. Therefore, guide tab 232*a*, the portion of slide 232*a* connecting guide tab 232*a* to bolt 204*a*, subassembly 504 (including boss 500) and operator actuatable input are all "blocker actuators" in that bolt 204 can be termed a "blocker" and these elements cooperate to actuate the blocker. So long as each listed element is operatively connected to bolt 204, each listed element can itself be termed a "blocker actuator."

In the retracted position of bolt 204*a*, boss 500 occupies retraction upright 544 of aperture 240. In the extended position of bolt 204*a*, boss 500 occupies extension upright 548 of aperture 240*a*. Boss 500 travels through lateral displacement base of aperture 240 between retraction upright 544 and extension upright 548. As will be further described below, boss 500 is biased upward along direction 434*a*; therefore, if boss 500 occupies retraction upright 544 of aperture 240, it is forced upward and locked against lateral movement as shown in FIG. 15. Similarly, if boss 500 occupies extension upright 548 of aperture 240*a*, it is forced upward and locked against lateral movement as shown in FIG. 16. When boss 500 is locked against lateral movement, it is in a blocking position to block actuation of bolt 204*a*. When boss 500 is able to move laterally (in displacement base 546 of aperture 240*a*), it is in an unblocking position allowing actuation of the bolt 204*a*. To move boss 500 along lateral displacement base 546 of aperture 240*a*, boss 500 must be pushed against the biasing force of spring 550 (described above) and into lateral displacement base 546 of aperture 240*a*. Vertical movement of retainer 308*a* is selectively blocked by a retainer blocker taking the form of bearing 552. In the exemplification illustrated, bearing 552 is a ball bearing, as illustrated in FIGS. 19, 24-27, 29, 34 and 35.

FIGS. 19, 24-27 and 29 illustrate subassembly 504 with faceplate 506 removed to reveal the components of subassembly 504 contained within the subassembly housing. In the stop position shown in FIG. 34, ball bearing 552 is positioned intermediate retainer 308*a* and wall 554 of the housing of subassembly 504 to create a physical barrier to a reciprocation of retainer 308*a*. To move ball bearing 552 from the position illustrated in FIG. 34, controller 302*a* actuates electric motor 352*a* to rotate output shaft 560 in a direction causing armature 556 to withdraw along direction 252*a*. Output shaft 560 of electric motor 352*a* is threaded into armature 556 and armature 556 is prevented from rotating by the internal walls of the housing of subassembly 504, including faceplate 506; therefore, rotating of output shaft 560 of electric motor 352*a* causes linear displacement of armature 556 along direction 252*a*. Electric motor 352A may be a battery powered electric motor powered by batteries (not shown) housed in battery compartment 564.

Figure 34:
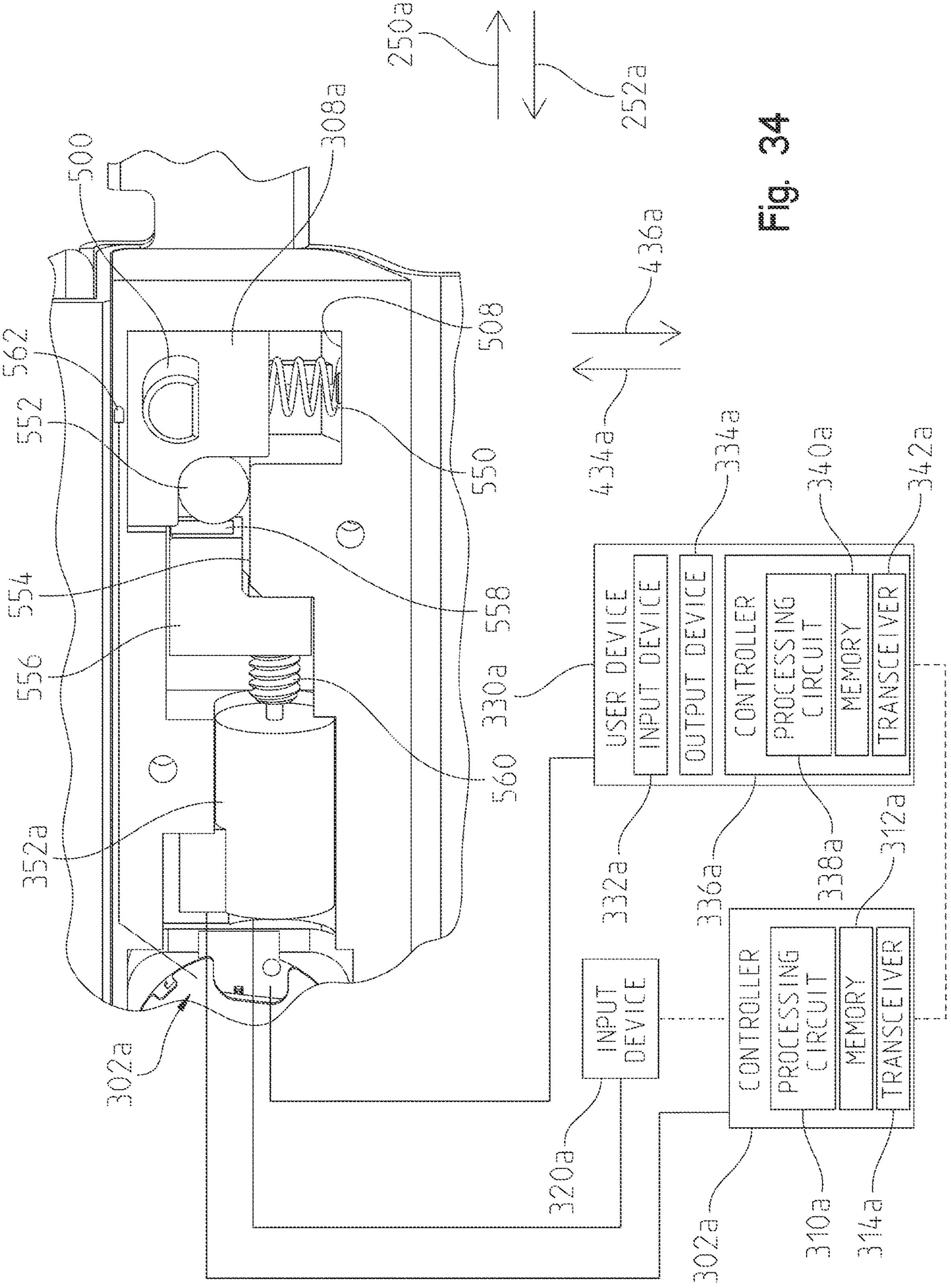
FIGS. 34 and 35 are sectional views through an actuation subassembly of an embodiment of the disclosure.

Armature 556 carries magnet 558, which creates a magnetic field attracting bearing 552. When armature 556 is moved along direction 252*a* from the position shown in FIG. 34 to the position illustrated in FIG. 35, the magnetic force originating with magnet 558 pulls bearing 552 from the position illustrated in FIG. 34 to the position illustrated in FIG. 35. If retainer 308*a* is forced downwardly along direction 436*a* just prior to actuation of motor 352*a* (with armature positioned as shown in FIG. 34), then the friction force created when retainer 308*a* presses bearing 552 against wall 554 may be sufficient to overcome the magnet attraction between armature 556 and bearing 552. If this should happen, then bearing 552 will remain in position blocking actuation of retainer 308*a* until the friction force is released by no longer applying a force to boss 500 along direction 436*a*. When the friction force is released, bearing 552 will succumb to the force from magnet 558 and travel to the position shown in FIG. 35. With bearing 552 maintaining the position shown in FIG. 35, retainer 308*a* can be moved against the biasing force of spring 550 by operator actuatable input 202*a* connected to boss 500 to allow movement of boss 500 through aperture 240*a* to actuate bolt 204*a* between the retracted and extended positions, as described above.

Operation of lock 200*a* can begin with bolt in the secure state, with bolt 204*a* in the extended position, as illustrated in FIGS. 16, 26, 27 and 32, boss 500 occupying the upper most extent of extension upright 548 (FIG. 16) and bearing 552 blocking actuation of retainer 308*a* (FIG. 34). From this position, a valid credential is needed to actuate lock 200*a* to the unsecure state.

As shown in FIG. 34, controller 302*a* (which includes the same elements and functionality of controller 302 described above) is connected to input device 320 and portable operator device 330*a*. The structure and functionality of input device 320*a* and portable operator device 330*a* is identical to the structure and functionality of input device 320 and portable operator device 330, except that input device 320*a* and portable operator device 330*a* are used to control lock 200*a* as opposed to lock 200 which is controlled by input device 320 and portable operator device 330. Therefore, a description of input device 320*a* and portable operator device 330*a* is not repeated here for the sake of brevity.

Figure 35:
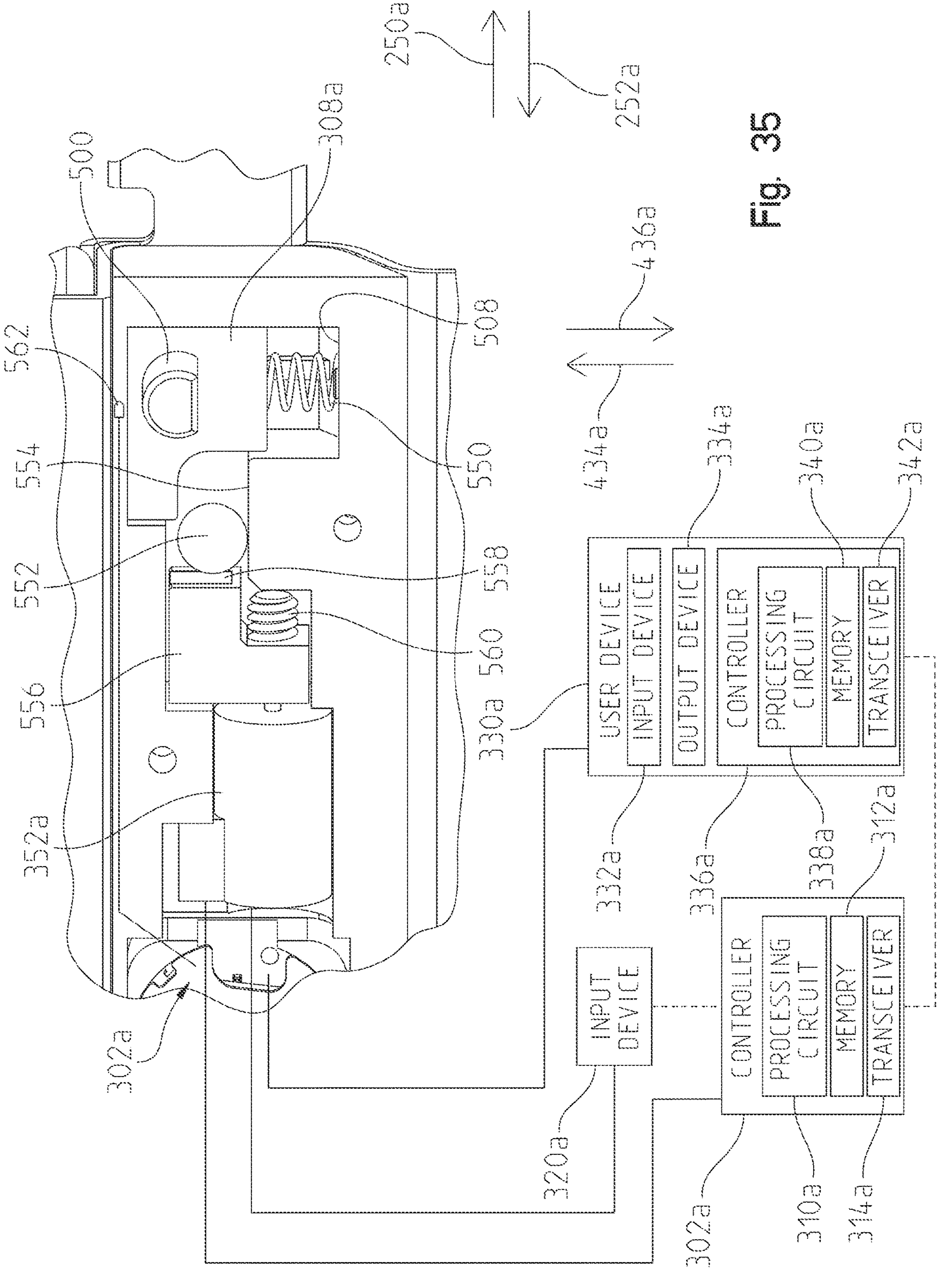

If a valid credential is determined to have been presented by one of input device 320*a* or portable operator device 330*a*, then controller 302*a* actuates electric motor 352*a* to translate armature 556 from the position shown, e.g., in FIG. 34 to the position shown, e.g., in FIG. 35. With the retainer blocker, i.e., bearing 552 removed from blocking position blocking actuation of retainer 308*a*, operator actuatable input 202*a* can be used to actuate boss 500 from the position shown in FIG. 16 to the position shown in FIG. 15 to move bolt 204*a* from the extended position to the retracted position. In this position, controller 302 will operate motor 352*a* to again position armature 556 and bearing 552 in the position shown in FIG. 35.

Sensor 562 can be used to signal to controller 302*a* that retainer 308*a* has returned to its normally biased position against upper stop surface 510. When this occurs, controller 302*a* actuates motor 352*a* to again position armature 556 and bearing 552 in the position shown in FIG. 35. A valid credential will again be needed to actuate motor 352*a* and allow lock 200*a* to be placed in the locked position, with bolt 204*a* in the extended position. This creates an audit trail of the state of lock 200*a*. Sensor 562 can be, e.g., a proximity sensor or an optical sensor.

When moving from the extended position of bolt 204*a* to the retracted position, the biasing force of spring 550 (FIGS. 34 and 35) as well as the biasing force of spring 540 (FIGS. 32 and 33) must be overcome. Once boss 500 is aligned with retraction upright 544 of aperture 240, spring 550 will urge boss 500 into the locked position shown in FIG. 15. When moving from the retracted position of bolt 204*a* to the extended position of bolt 204*a*, only the biasing force of spring 550 must be overcome. Once boss 500 travels from retraction upright 544 of aperture 240 into alignment with lateral displacement base 546 of aperture 240, then spring 540 will act to bias boss 500 into alignment with extension upright 548 of aperture 240 and then spring 550 will bias boss 500 into the locked position shown in FIG. 16. The biasing forces of springs 540 and 550 can be set so that the operator only needs to press boss 500 (via operator actuatable input 202*a*) into alignment with lateral displacement base 546 of aperture 240 at which point springs 540 and 550 will cooperate to snap boss 500 into the position shown in FIG. 16.

Figure 43:
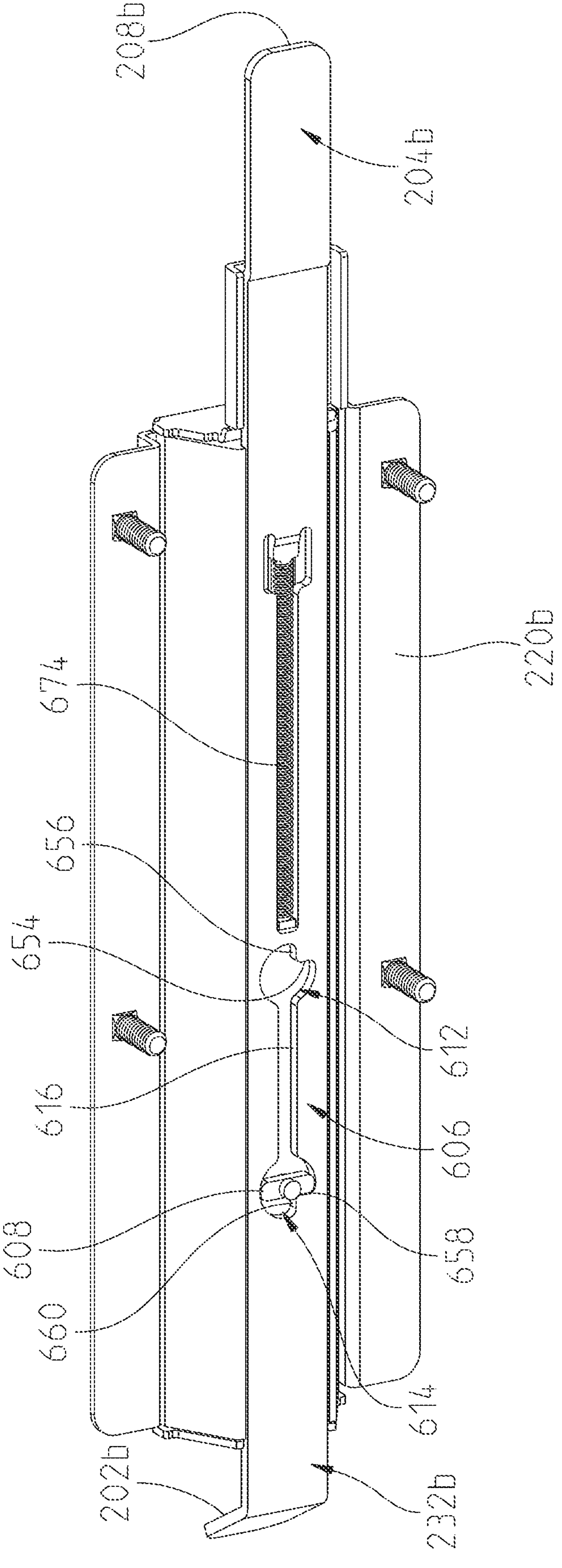
FIG. 43 is a rear perspective view of the locking assembly shown in FIGS. 36-42, with the intermediate mounting bracket removed to reveal the components underneath and showing the locking bolt in the extended position.
Figure 44:
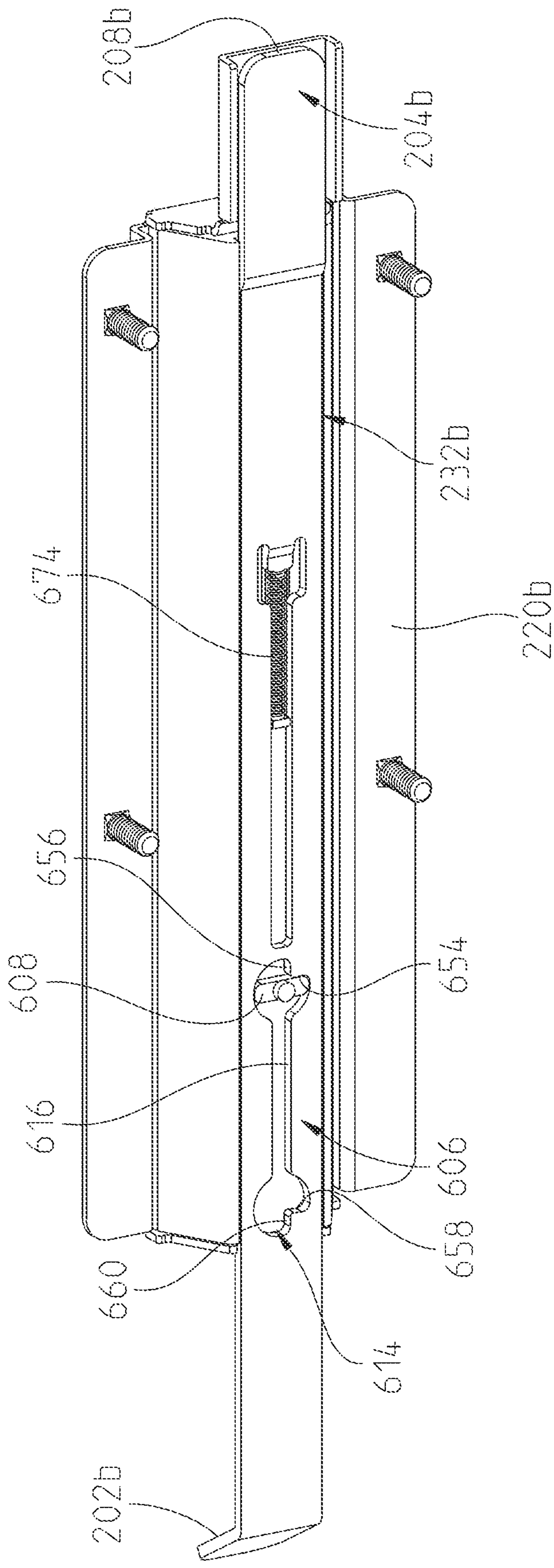
FIG. 44 is a rear, perspective view similar to the view of FIG. 43, but showing the bolt in the retracted position.

FIGS. 36-53 illustrate another alternative embodiment of the present disclosure. More particularly, door lock 200*b* is illustrated. Door lock 200*b* provides the same functionality as door locks 200 and 200*a*, i.e., door lock 200*b* controls the ability to move door 110 (when door lock 200*b* is installed in place of door lock 200 as shown in FIGS. 1A and 1B) from a closed position to an open position. Door lock 200*b* includes operator actuatable input 202*b* accessible from an exterior of storage container 100. Through an actuation of operator actuatable input 202*b* (which will be further described hereinbelow), bolt 204*b* of door lock 200*b* is moved from an extended position (FIGS. 36-38, 41 and 43) to a retracted position (FIG. 44).

When bolt 204*b* is in the extended position, a first end 208*b* of bolt 204*b* is received in a recess in storage container 100 to block rotation of door 110 in direction 112 (FIG. 1A) or vertical movement of door 110. A recess operable to cooperate with door lock 200*b* in this way is recess 120 illustrated in FIG. 6 in conjunction with door lock 200. Similar to the arrangement of door lock 200 shown in FIG. 8, when bolt 204*b* of lock 200*b* is in the retracted position, first end 208*b* of bolt 204*b* is positioned outside of a recess, e.g., recess 120 of storage container 100, and does not block actuation of a door to which it is attached. Based on its ability to alternately block (when extended) and allow movement (when retracted) of a door to which it is attached, bolt 204*a* can be referred to as a "blocker."

Figure 36:
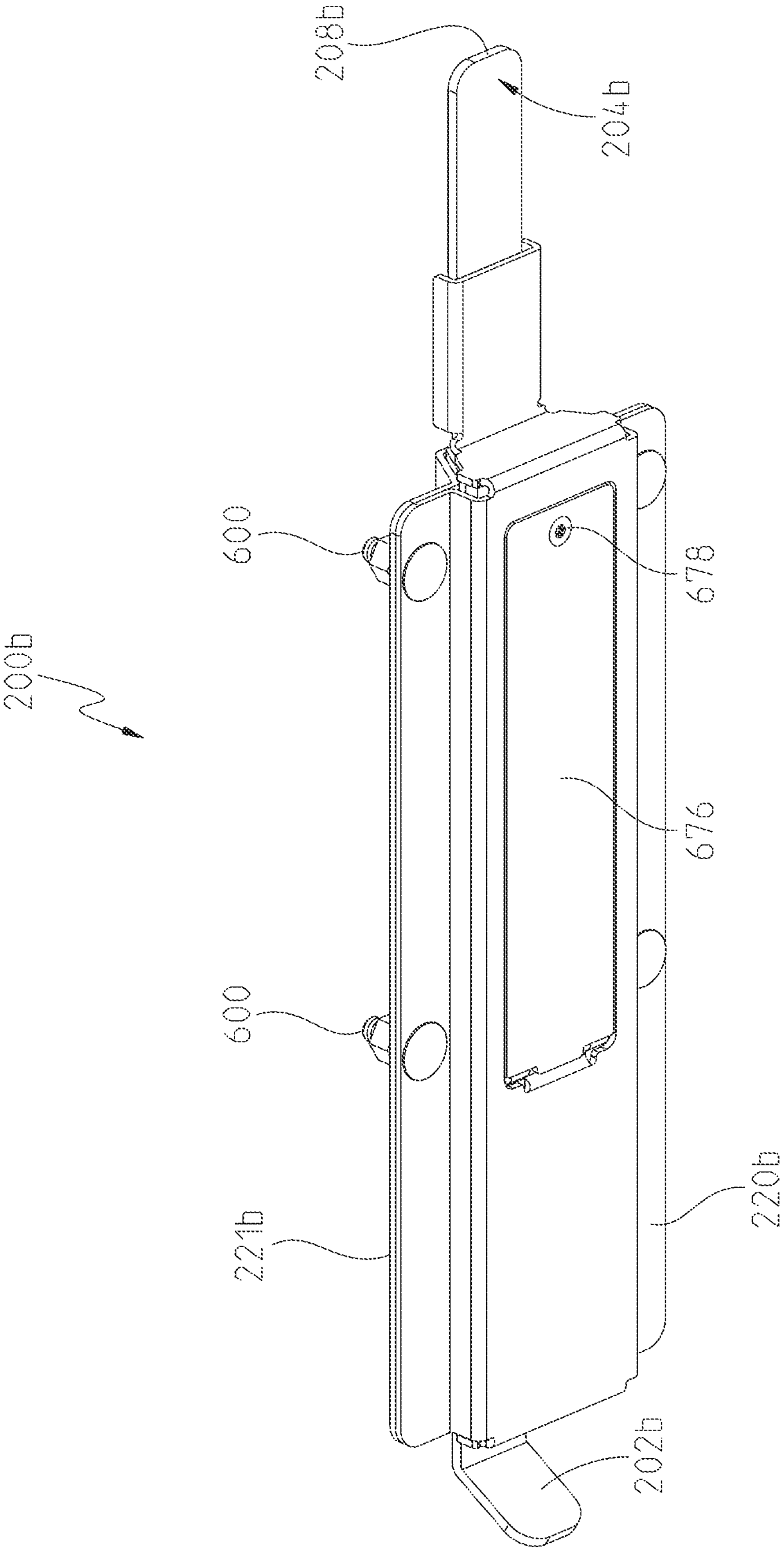
FIGS. 36 and 37 are, respectively, front and rear perspective views of an alternative embodiment lock of the present disclosure.
Figure 37:
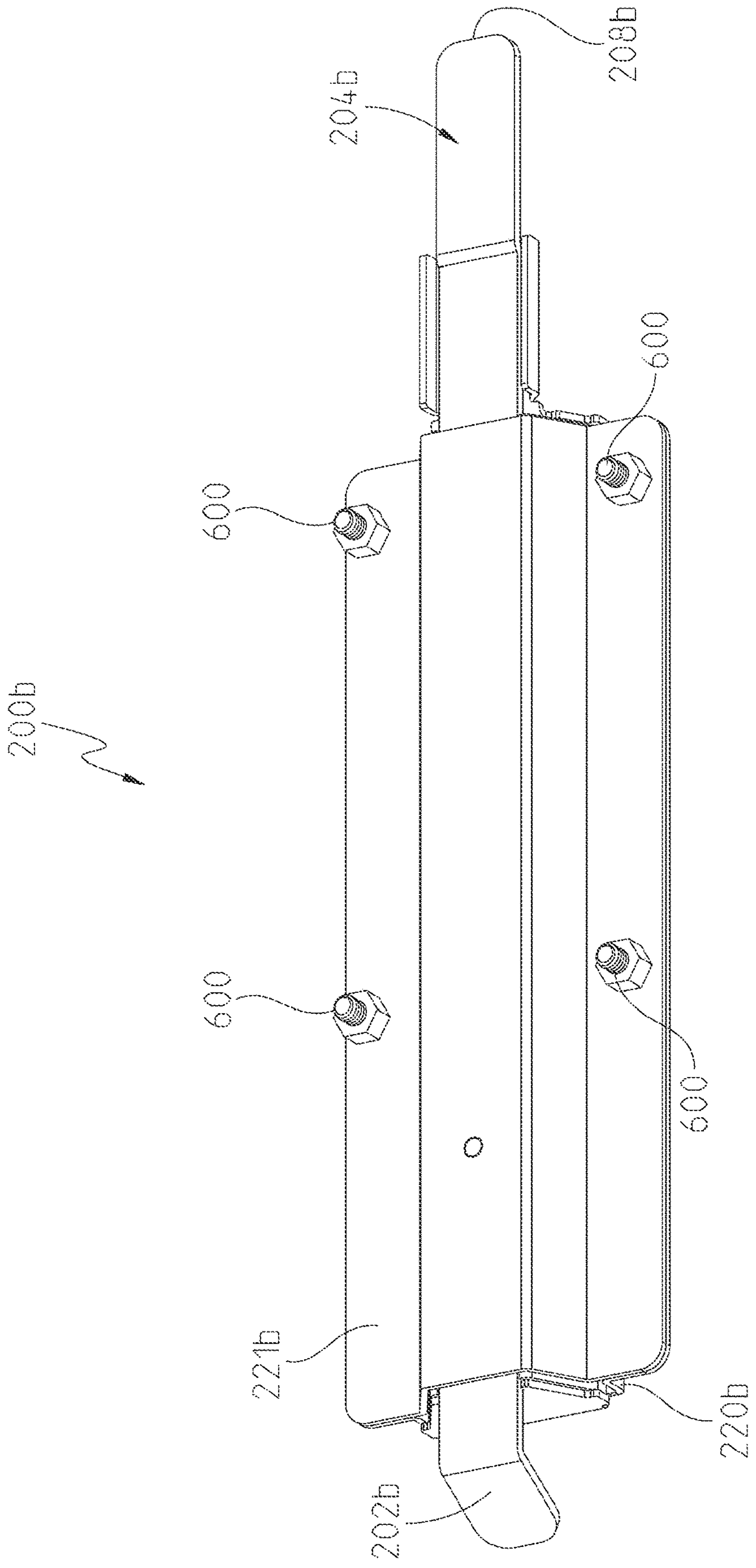
Figure 38:
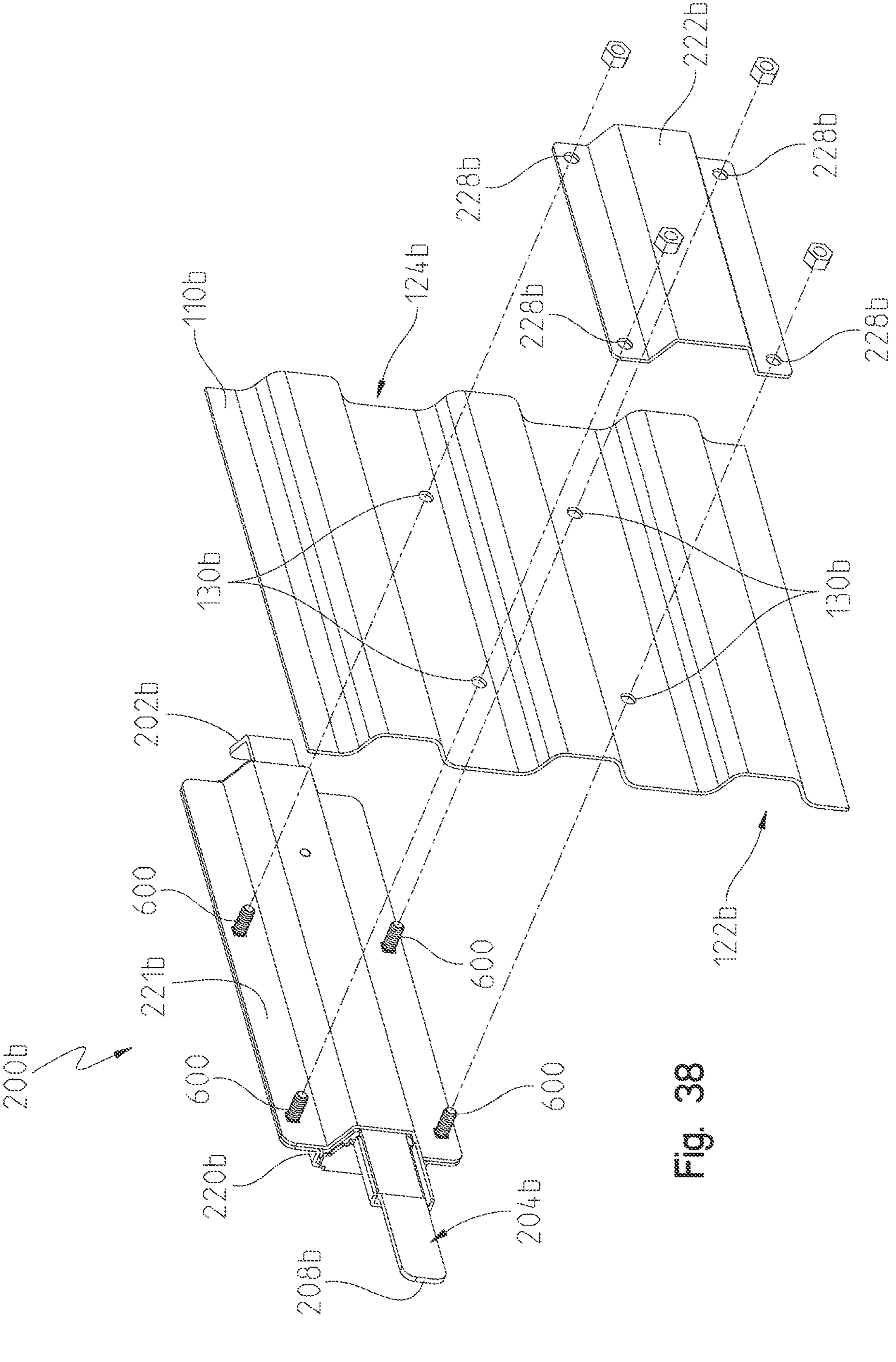
FIG. 38 is a rear exploded view of the door lock shown in FIGS. 36 and 37 and an associated door.
Figure 39:
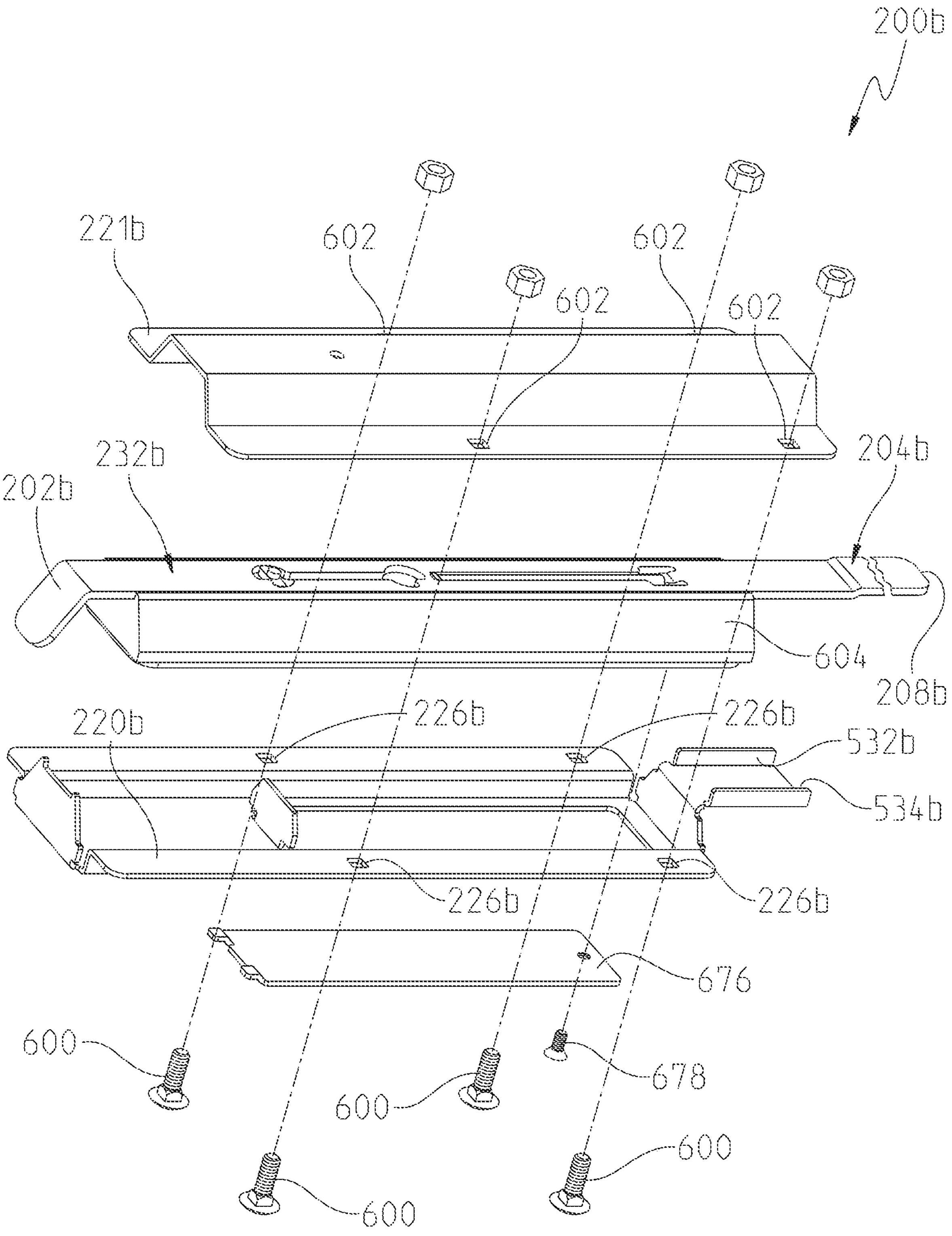
FIG. 39 is a front perspective, exploded view of the door lock shown in FIGS. 37-38.
Figure 40:
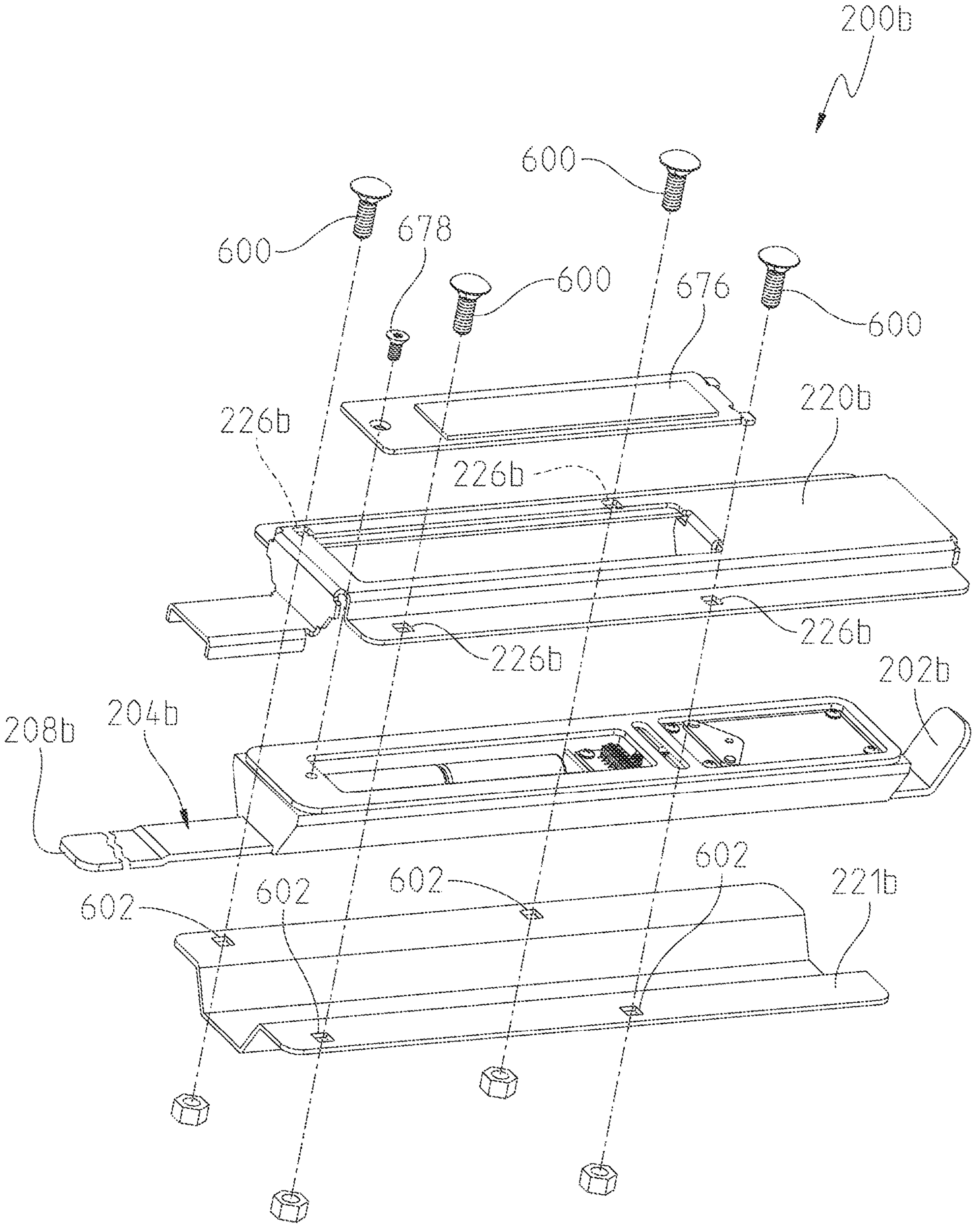
FIG. 40 is a front perspective, exploded view of the door lock shown in FIGS. 36-39.

Lock 200*b* includes front mounting bracket 220*b* and intermediate mounting bracket 221*b* as shown, e.g., in FIGS. 36-38. FIG. 38 also illustrates rear mounting bracket 222*b*. Similar to the arrangement of lock 200 shown in FIGS. 2A and 2B, front mounting bracket 220*b* can be placed over a front side 122*b* (see FIG. 38) of door 110*b* and rear mounting bracket 222*b* can be placed over a rear side 124*b* of door 110*b*. Front mounting bracket 220*b* and rear mounting bracket 222*b* can be, in use, secured to door 110*b*. In the illustrated embodiment as shown in FIG. 38, door 110*b* includes a plurality of apertures 130*b*, front mounting bracket 220*b* includes a plurality of apertures 226*b* (FIG. 39) alignable with the plurality of apertures 130*b* of door 110*b*, and rear mounting bracket 222*b* includes a plurality of apertures 228*b* (FIG. 38) also alignable with the plurality of apertures 130*b* of door 110*b*. Bolts 600 pass through respective aligned sets of apertures 130*b*, 226*a*, and 228*a* to hold front mounting bracket 220 and rear mounting bracket 222 to door 110. Intermediate mounting bracket 221*b* includes a corresponding set of apertures 602 (FIG. 39) allowing bolts 600 to pass.

Similar to the embodiment depicted in FIG. 6, bolt 204*b* is, in use, positioned adjacent to and actuated along the front side of door 110*b* to be positioned into and out of a recess similar recess 120 shown in FIG. 6. This is different from standard deadbolt locks, for example, in which a bolt extends from and is retracted into an aperture formed in the thickness of a door, i.e., between the front and back faces of the door. To actuate bolt 204*b* along directions 250*b*, 252*b* (FIGS. 41 & 42) atop first side of a door, operator actuatable input 202*b* receives input motion from a user to articulate operator actuatable input 202*b* along directions 250*b*, 252*b*.

Figure 41:
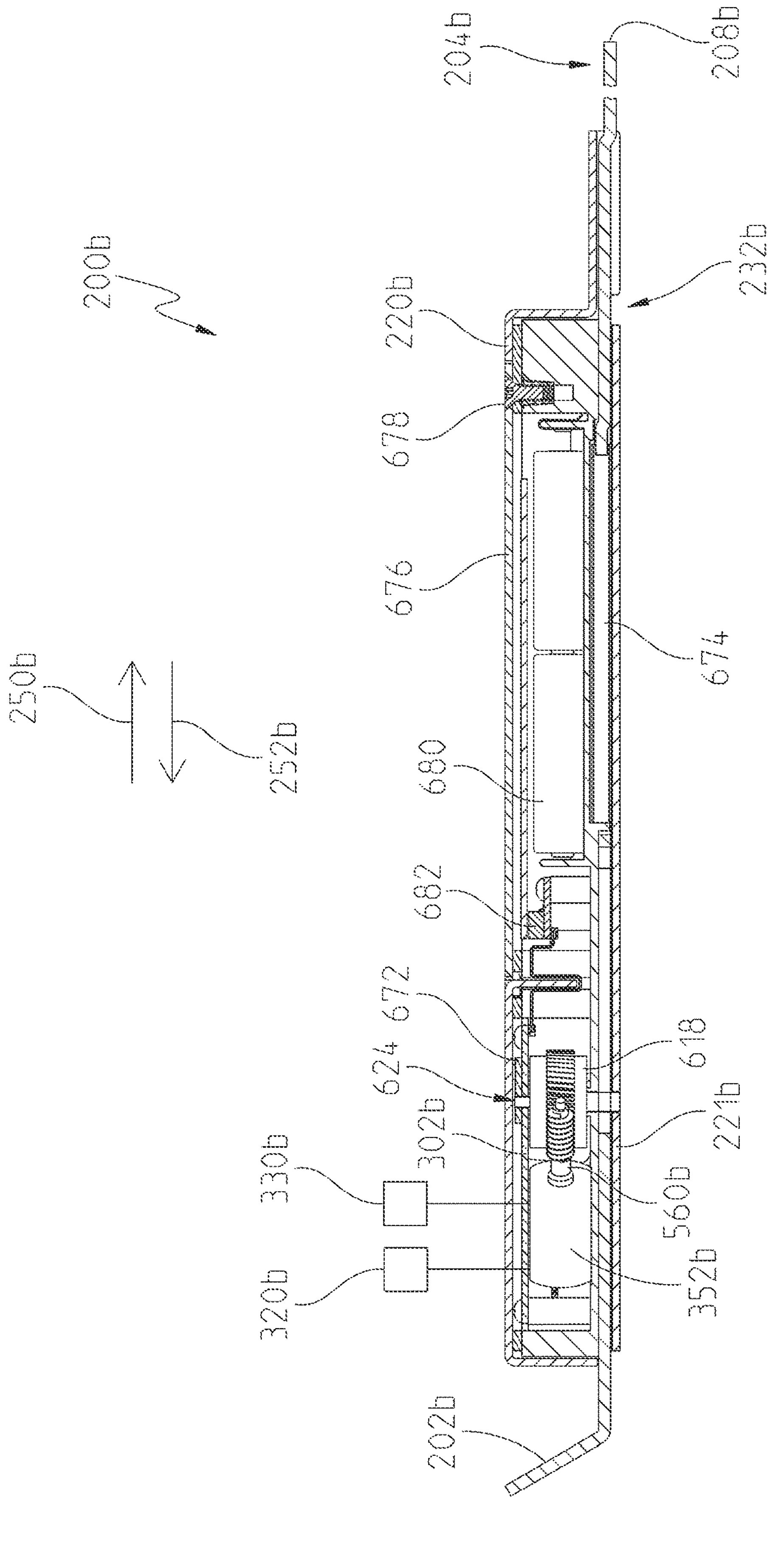
FIG. 41 is a sectional view through the door lock shown in FIGS. 36-40.

FIG. 41 illustrates slide 232*b* positioned between intermediate mounting bracket 221*b* and front mounting bracket 220*b*. In this position, slide 232*b* is able to reciprocate along directions 250*b*, 252*b* between the extended position of bolt 204*b* and the retracted position of bolt 204*b*, respectively. To effect such reciprocation, a user can grasp operator actuated bolt input 202*b* to move slide 232*b* along one of directions 250*b*, 252*b*. Such reciprocation of slide 232*b* can be guided by a longitudinal channel formed in locking assembly housing 604 into which slide 232*b* is received. Slide 232*b* can also be received between opposing guide surfaces 532*b*, 534*b* of front mounting bracket 220*b* to guide reciprocation of slide 232*b*. In alternative embodiments, locking assembly housing 604 and slide 232*b* form an electromechanical subassembly useable with a variety of mounting brackets having a variety of hole patterns matching alternative door hole patterns.

Battery door 676 can be secured relative to front mounting bracket 220*b* via battery door screw 678 and may carry auxiliary PCBA 680, which is connected to header 682 automatically upon final seating of battery door 676. Header 682 connects auxiliary PCBA to the main PCBA carrying controller 302*b*. In this way, the battery compartment door can be swapped out to add an alternative auxiliary PCBA adding functionality such as, new radios, sensors, or user interfaces. While battery door screw 678 is exposed, access to the battery compartment does not allow access to the locking mechanism or main PCBA. Battery door screw 678 may be designed for actuation only by a specialized tool. In all embodiments of the disclosure, controller 302, 302*a*, or 302*b* controls actuation of electric motor 352, 352*a*, or 352*b* by electrically connecting the electric motor to the batteries of the respective embodiment.

Locking assembly 200*b* can, alternatively, be utilized to maintain bolt 204*b* in one of the extended position or the retracted position. Slide 232*b* includes dumbbell shaped cutout 606 formed therein. Retainer 308, including cam 608, can selectively be used to maintain the position of the body of slide 232*b* between operator actuatable input 202*b* and bolt 204*b*, which can also aptly be termed a blocker actuator in that it is capable of actuating bolt 204*b* (a "blocker") between the retracted and extended positions. Specifically, cam 608 can be positioned in either bulbous end 612, 614 of dumbbell shaped cutout 606 and oriented such that cam longitudinal axis 610 is orthogonal to directions 250*b*, 252*b* (as shown in FIGS. 43 and 44) to prevent actuation of slide 232*b* along either of directions 250*b* and 252*b*. To allow actuation of slide 232*b*, cam longitudinal axis 610 must be positioned substantially parallel with directions 250*b*, 252*b* to allow cam 608 to travel through lateral displacement channel 616 of dumbbell shaped cutout 606.

An arrangement of cam longitudinal axis 610 oriented substantially parallel to directions 250*b*, 252*b* is illustrated in FIGS. 47-51. In construction, cam 608 is positioned to fit within the depth of slide 232*b*. Stated another way, a top surface of cam 608 is substantially coplanar with a top surface of slide 232*b* surrounding dumbbell shaped cutout 606 and a bottom surface of cam 608 is similarly substantially coplanar with a bottom surface of slide 232*b* surrounding dumbbell shaped cutout 606. In this way, cam 608 can act as a retainer selectively positionable to a blocking position (see, e.g., FIGS. 43 and 44) to block the blocker actuator from actuating the blocker, i.e., bolt 204*b*, and is also positionable in an unblocking position (see, FIGS. 47-51) to allow the blocker actuator to actuate the blocker.

Figure 42:
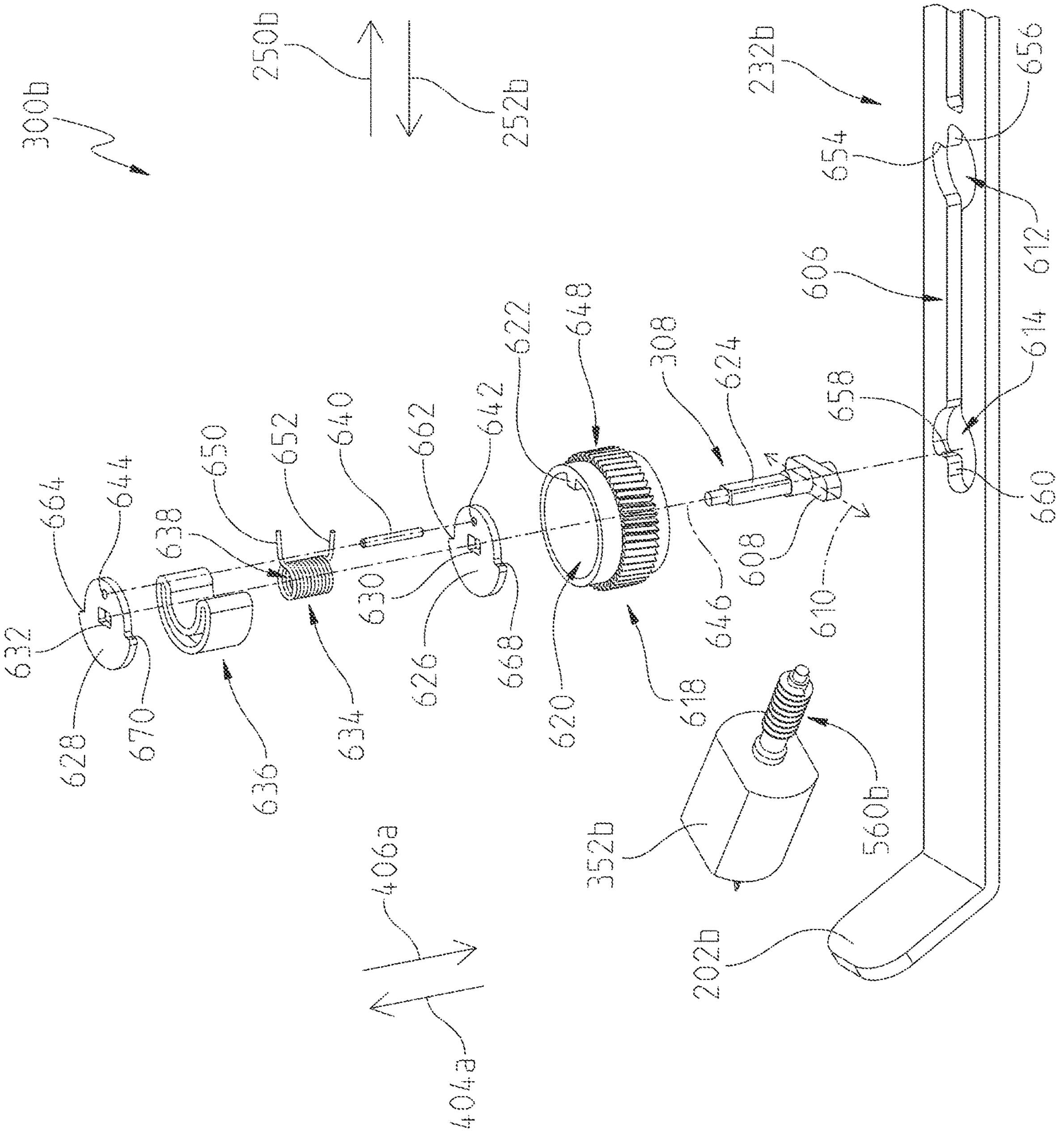
FIG. 42 is a partial, exploded view, illustrating the locking assembly used in conjunction with the door lock illustrated in FIGS. 36-41.

Referring to FIG. 42, blocking assembly 300*b* further includes worm wheel 618 having an open center 620 into which radial protrusion 622 extends. Cam drive shaft 624 is centrally positioned within open center 620 of worm wheel 618. Cam drive shaft 624 includes spaced stop plates 626, 628 keyed for rotation therewith. More particularly, central apertures 630, 632 have a cross-sectional shape matching the cross-sectional shape of cam drive shaft 624. Located between lower stop plate 626 and upper stop plate 628 is torsion spring 634. Specifically, torsion spring 634 is positioned about cam drive shaft 624 with cam drive shaft 624 positioned through central aperture 638 of torsion spring 634. In certain embodiments, torsion spring 634 may be utilized to facilitate spacing of lower stop plate 626 from upper stop plate 628. Secured between lower stop place 262 and upper stop plate 628 is torsion spring pin 640. Torsion spring pin 640 may be interference fit within aperture 642, 644 of stop plates 626, 628. Torsion spring pin 640 may incorporate a radial flange at each end thereof to further facilitate proper spacing of lower stop plate 626 from upper stop plate 628 along directions 404*a*, 406*a*. Optionally, spacer 636 may be positioned between lower stop place 626 and upper stop plate 628 to further effect proper spacing thereof along directions 404*a*, 406*a*.

When operably assembled, lower stop plate 626, upper stop plate 628 as well as the components positioned therebetween (torsion spring pin 640, torsion spring 634, and, optionally, spacer 636) are positioned within open center 620 of worm wheel 618 and are rotatable with cam drive shaft 624 about longitudinal axis 646 of worm wheel 618. Drive shaft 560*b* of electric motor 352*b* is arranged an intermeshing relationship with teeth 648 of worm wheel 618 such that actuation of electric motor 352*b* causes rotation of worm wheel 618 about longitudinal axis 646 of worm wheel 618. Upper torsion spring arm 650 and lower torsion spring arm 652 are, in construction, rotated relative to each other about longitudinal axis 646 of worm wheel 618 until torsion spring 634 is preloaded and torsion spring arms 650, 652 abut torsion spring pin 640 and radial protrusion 622 of worm wheel 618, as illustrated, e.g., in FIG. 46.

Figure 45:
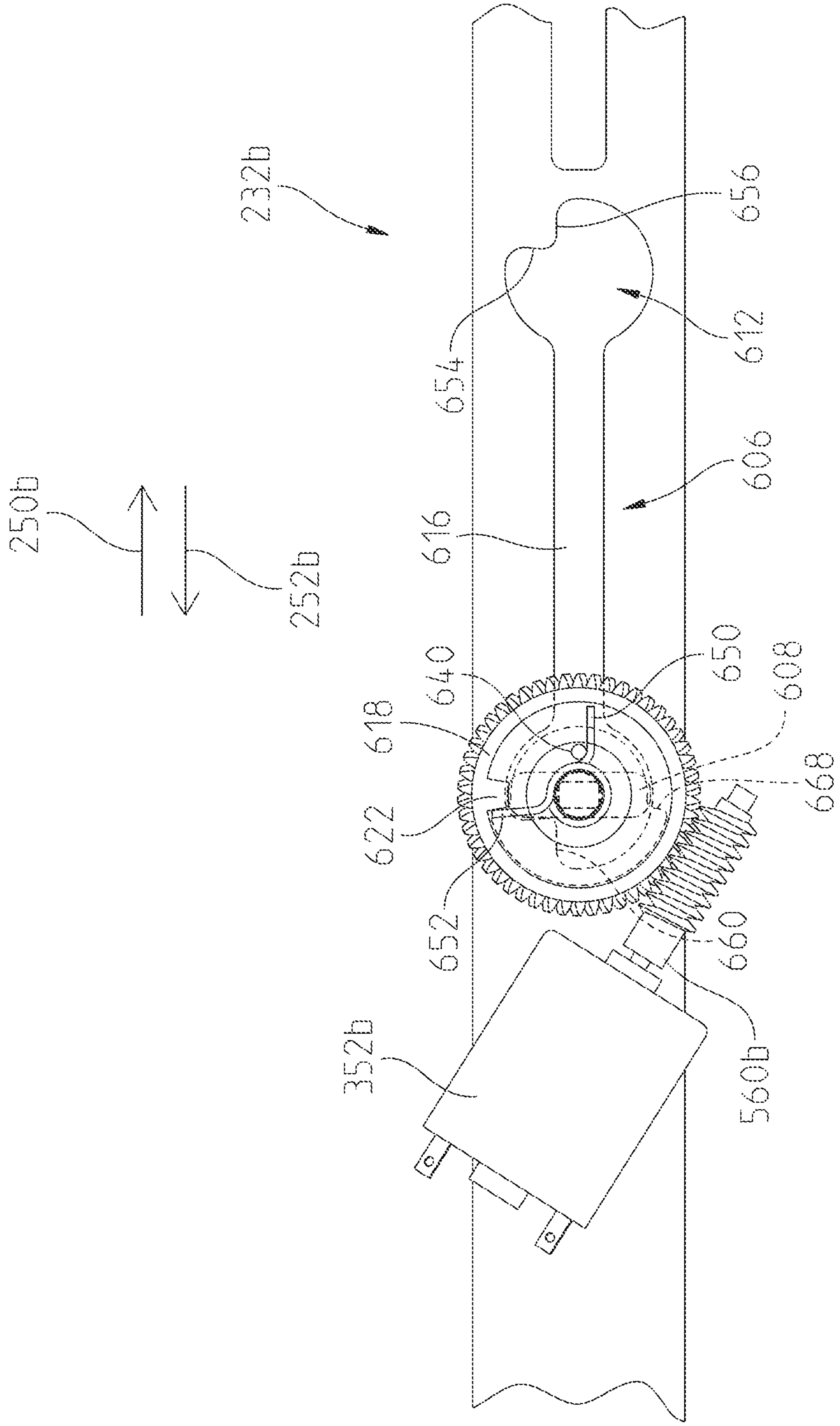
FIGS. 45-53 are partial, elevational views of the locking mechanism shown in FIG. 42, with each of FIGS. 45-53 illustrating progressive actuation of the lock illustrated in FIGS. 36-44.
Figure 46:
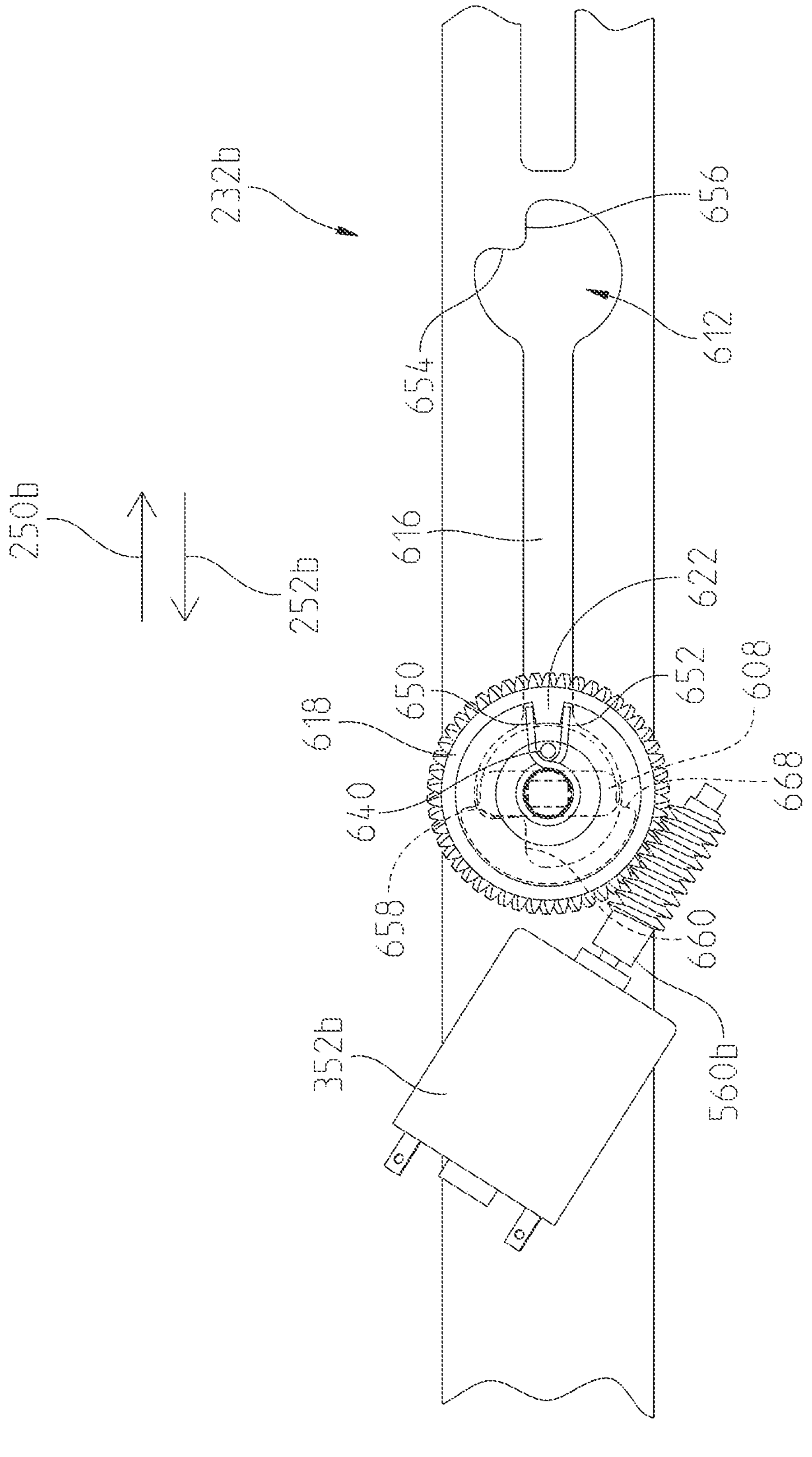
Figure 47:
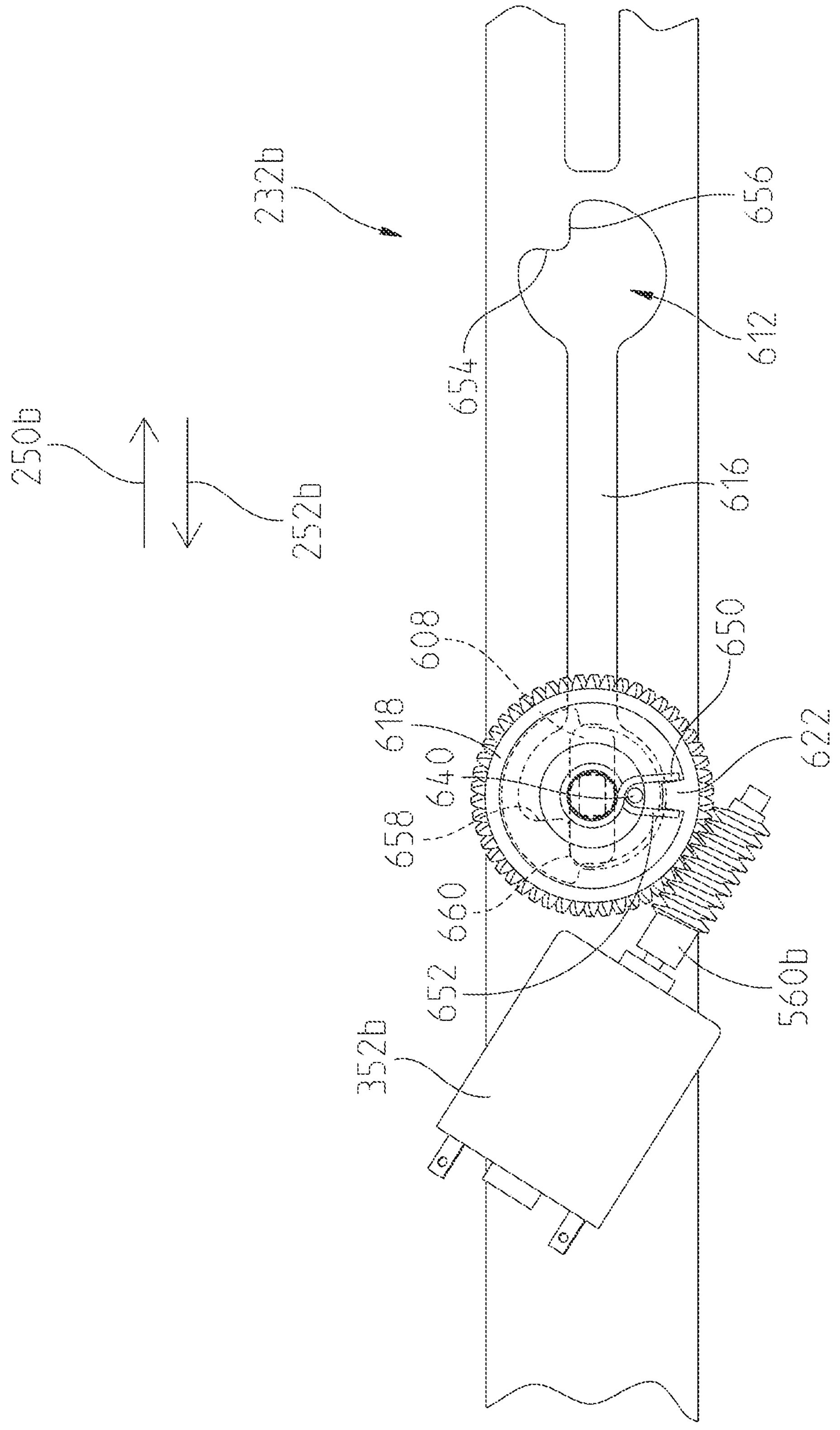
Figure 48:
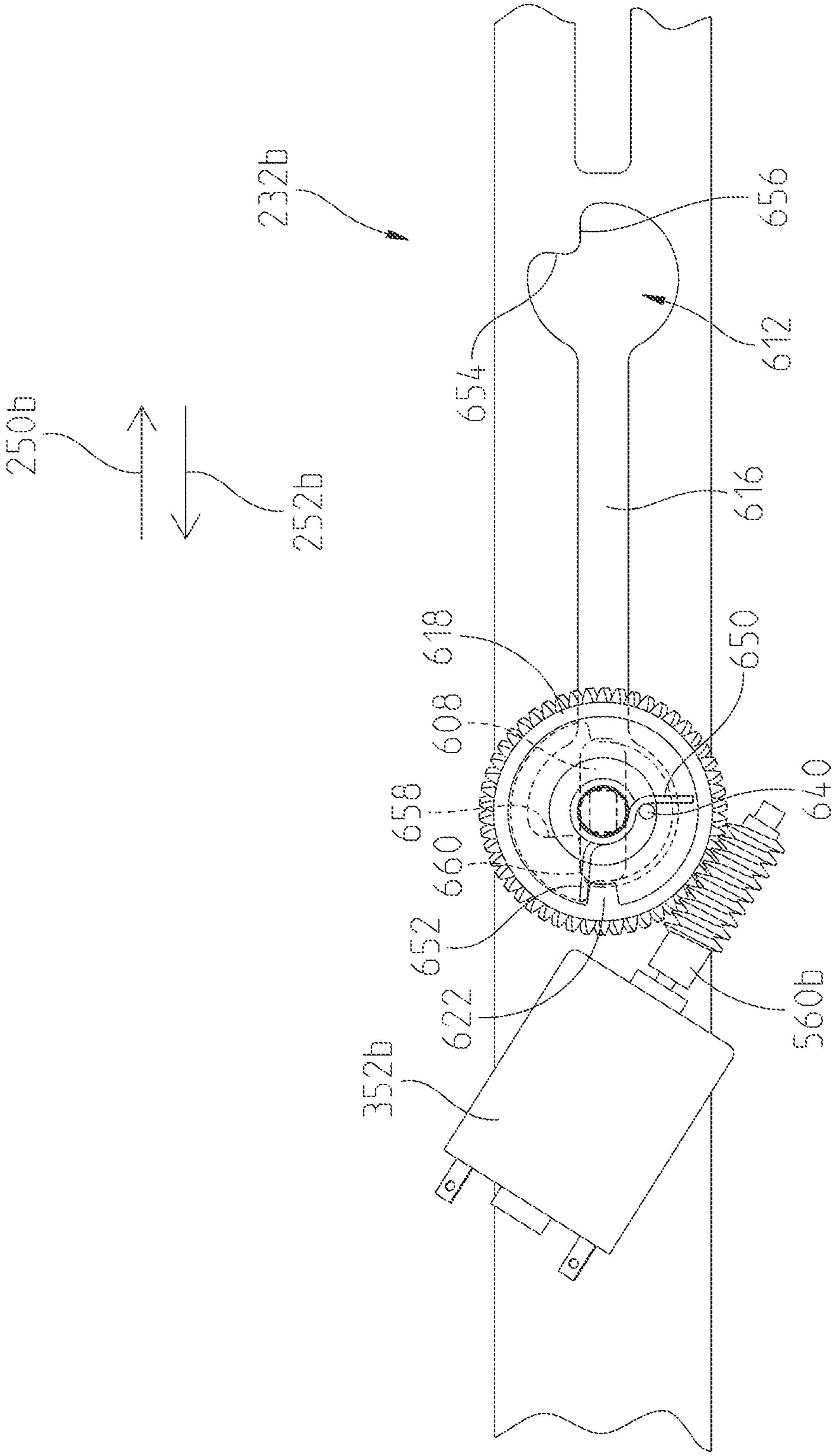
Figure 52:
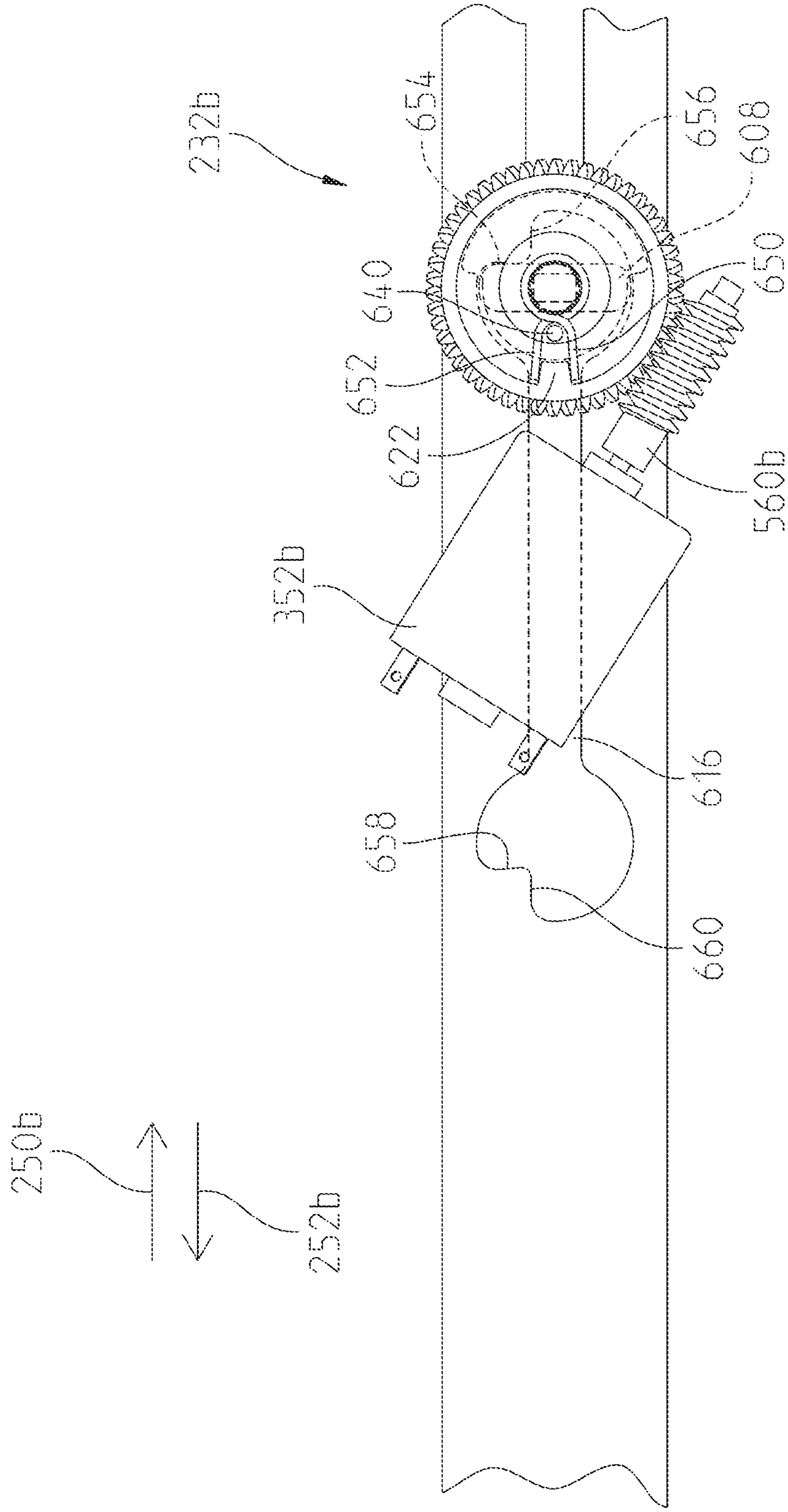
Figure 53:
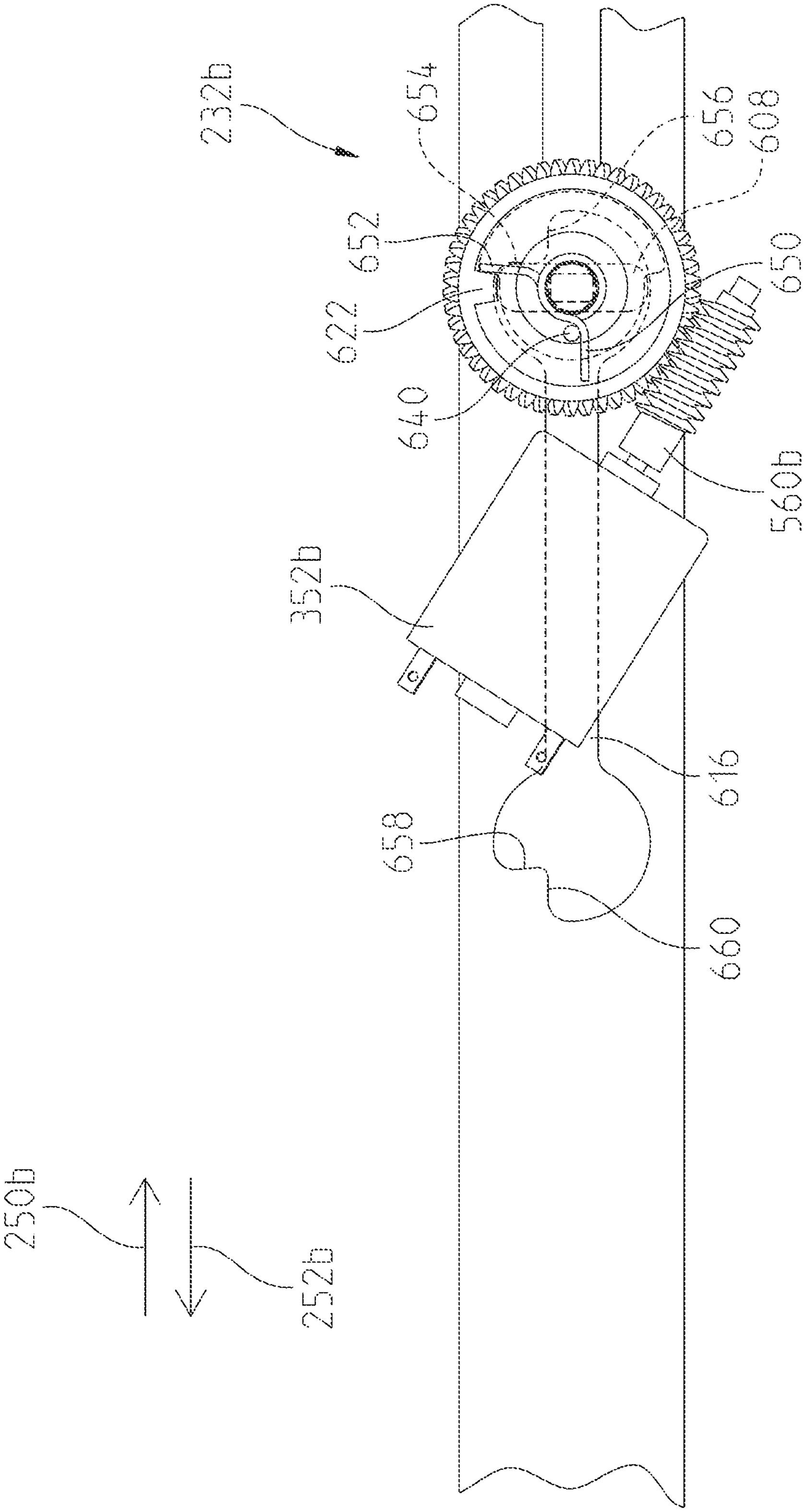

Cam 608 is rotatable within bulbous ends 612,614 within the limits set by stop surfaces 654, 656, 658,660. When cam 608 is rotated into abutting contact with lock stop surface 658 of extension bulbous end 614, slide 232*b* is locked in an extended position. This arrangement is illustrated in FIGS. 45 and 46. From this position, cam 608 can be rotated away from abutting contact with lock stop surface 658 about longitudinal axis 646 of worm wheel 618 and into abutting contact with unlock stop surface 660, as illustrated in FIGS. 47 and 48. Similarly, when cam 608 occupies retraction bulbous end 612, cam 608 can be positioned in abutting contact with lock stop surface 654 to retain slide 232*b*, and therefore bolt 604*b* in the retracted position. This arrangement is illustrated in FIGS. 52 and 53. Cam 608 can be rotated out of abutting contact with lock stop surface 654 by rotation about longitudinal axis 646 of worm wheel 618. More particularly, cam 608 can be rotated away from lock stop surface 654 and into abutting contact with unlock stop surface 656 to allow translation of slide 232*b* relative to cam 608

Operation of lock 200*b* can begin with bolt 204*b* in the secure state, with bolt 204*a* in the extended position illustrated in FIGS. 36, 37, 41, and 43 and with cam 608 abutting stop lock surface 658 of extension bulbous end 614. From this position, a valid credential is needed to actuate lock 200*b* to the unsecure state.

As shown in FIG. 41, controller 302*b* is carried by the main PCBA (Printed Circuit Board Assembly). Controller 302*b* includes the same elements and functionality of controllers 302, 302*a* described above and; therefore, the structure and functionality of controller 302*b* is not now described in detail for the sake of brevity. Controller 302*b* is connected to input device 320*b* and portable operator device 330*b*. The structure and functionality of input device 320*b* and portable operator device 330*b* is identical to the structure and functionality of input device 320 and portable operator device 330, except that input device 320*b* and portable operator device 330*b* are used to control lock 200*b* as opposed to lock 200 which is controlled by input device 320 and portable operator device 330. Therefore, a detailed description input device 320*b* and portable operator device 330*b* is not repeated here for the sake of brevity.

If a valid credential is determined to have been presented by one of input device 320*b* or portable operator device 330*b*, then controller 302*b* can actuate motor 352*b* to position cam 608 with its longitudinal axis 610 aligned with direction 252*b* as shown, e.g., in FIGS. 47 and 48 to allow bolt 204*b* to be retracted. Locking bolt 204*b* in the extended position is effected by placing cam 608 in abutting relationship with lock stop surface 658 of extension bulbous end 614, as described above. To prohibit cam 608 from rotating away from abutting contact with lock stop surface 658, worm wheel 618 can be rotated into the position shown in FIG. 45. In this position, radial protrusion 622 of worm wheel 618 abuts lock stop surfaces 662, 664 of stop plates 626, 628 as illustrated in FIG. 45. In this position, rotation of cam 608 about longitudinal axis 646 of worm wheel 618 is prohibited. When a valid credential is presented with cam 608 positioned as shown in FIG. 45, motor 352*b* will actuate worm wheel 618 from the position shown in FIG. 45, through the positions shown in FIGS. 46 and 47 until reaching the position shown in FIG. 48.

During the transition from the position shown in FIG. 45 to the position shown in FIG. 48, torsion spring 634 exerts differing biases on cam 608. In FIG. 45, torsion spring 634 biases cam 608 into abutting relationship with lock stop surface 658 (FIG. 42). As worm wheel 618 rotates about longitudinal axis 646 90° from the position shown in FIG. 45 to the position shown in FIG. 46, this spring bias is continually decreased. With worm wheel 618 in the position illustrated in FIG. 46, the biasing force of torsion spring 634 must be overcome to rotate cam 608 to the position illustrated in FIG. 47. As worm wheel 618 is rotated an additional 90° from the position illustrated in FIG. 46 to the position illustrated in FIG. 47, radial protrusion 622 rotates torsion spring arm 652 from the position illustrated in FIG. 46 to the position illustrated in FIG. 47. During this rotation, torsion spring arm 650 acts, with the biasing force of torsion spring 634 against torsion spring pin 640 to rotate cam drive shaft 624 (which is keyed to stop plates 626, 628) into the position illustrated in FIG. 47. In this position, cam 608 is placed in abutting relationship with unlock stop surface 660 of extension bulbous end 614. From this position, actuation of motor 352*b* continues, with radial protrusion 622 of worm wheel 618 rotating the against the biasing force of torsion spring 634. Actuation of motor 352*b* and; therefore, radial protrusion 622 of worm wheel 618 ceases when radial protrusion 622 abuts return stop surfaces 668, 670 of stop plates 626, 628, as illustrated in FIG. 48. Referring to FIG. 41, sensor 672 may be positioned about an end of cam drive shaft 624 opposite cam 608 and through the main PCBA carrying controller 302*b*. In this position, sensor 672 can be utilized to sense the rotary position of retainer 308 and, therefore, the position of cam 608. Sensor 672 can be, e.g., an optical sensor.

Figure 49:
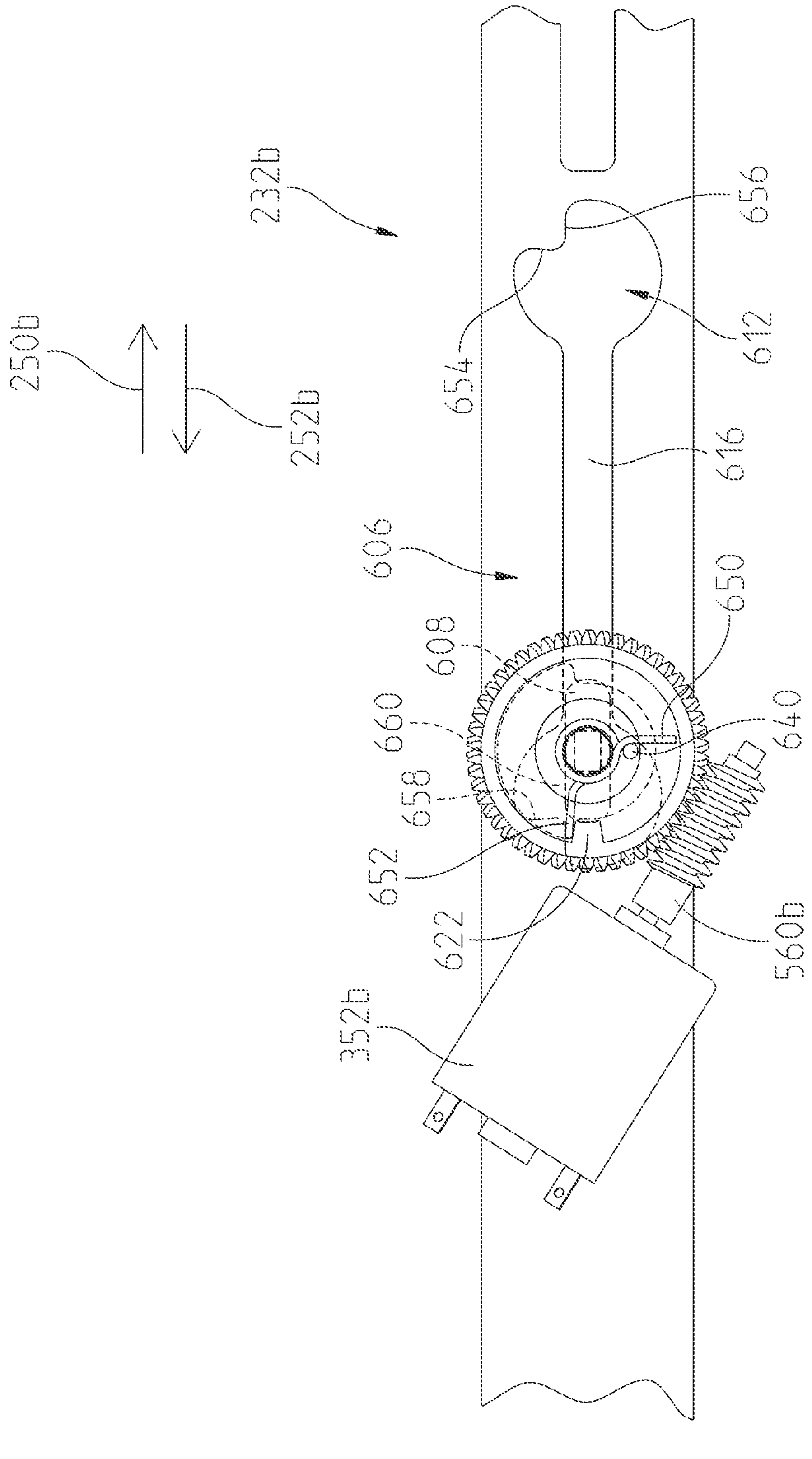
Figure 50:
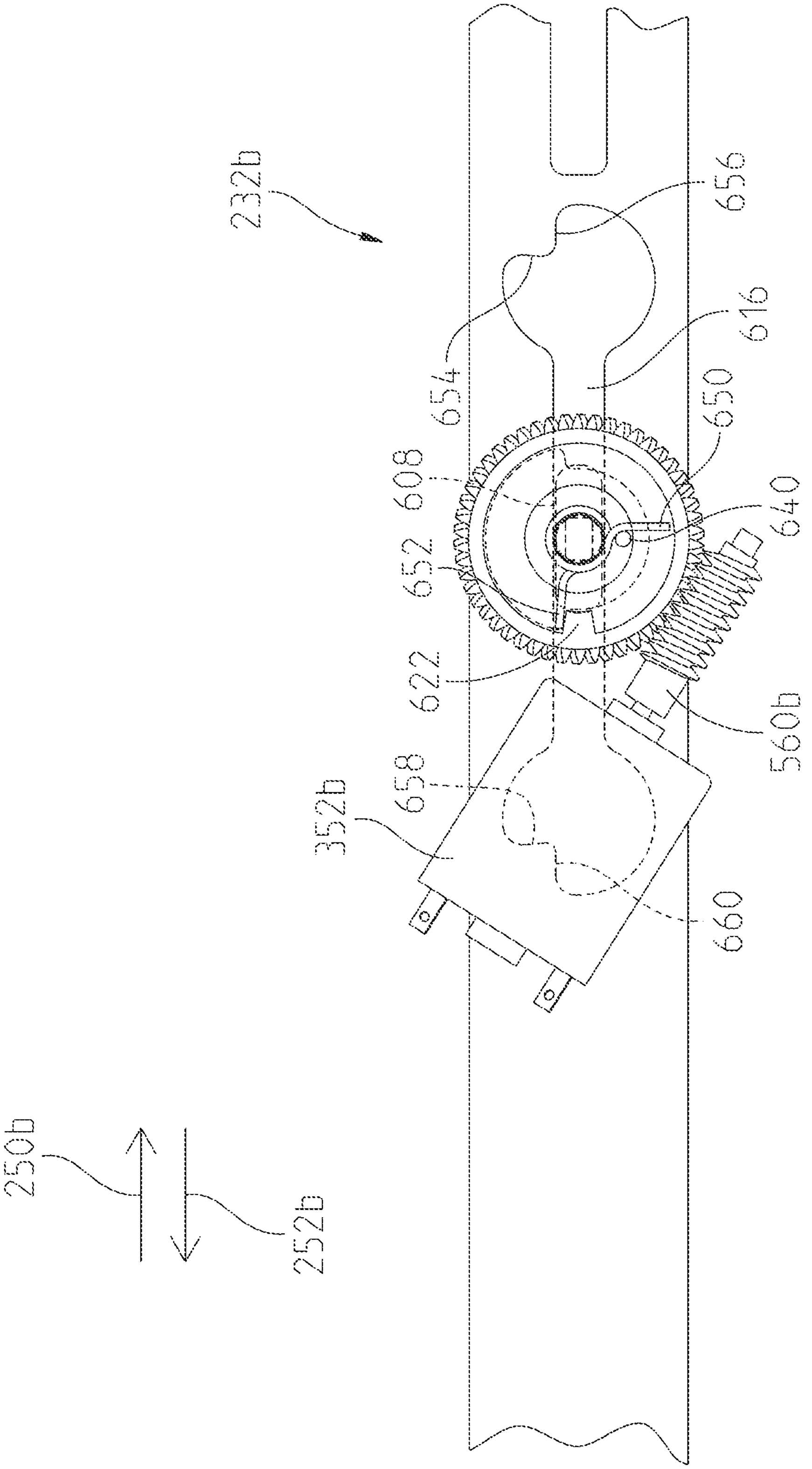
Figure 51:
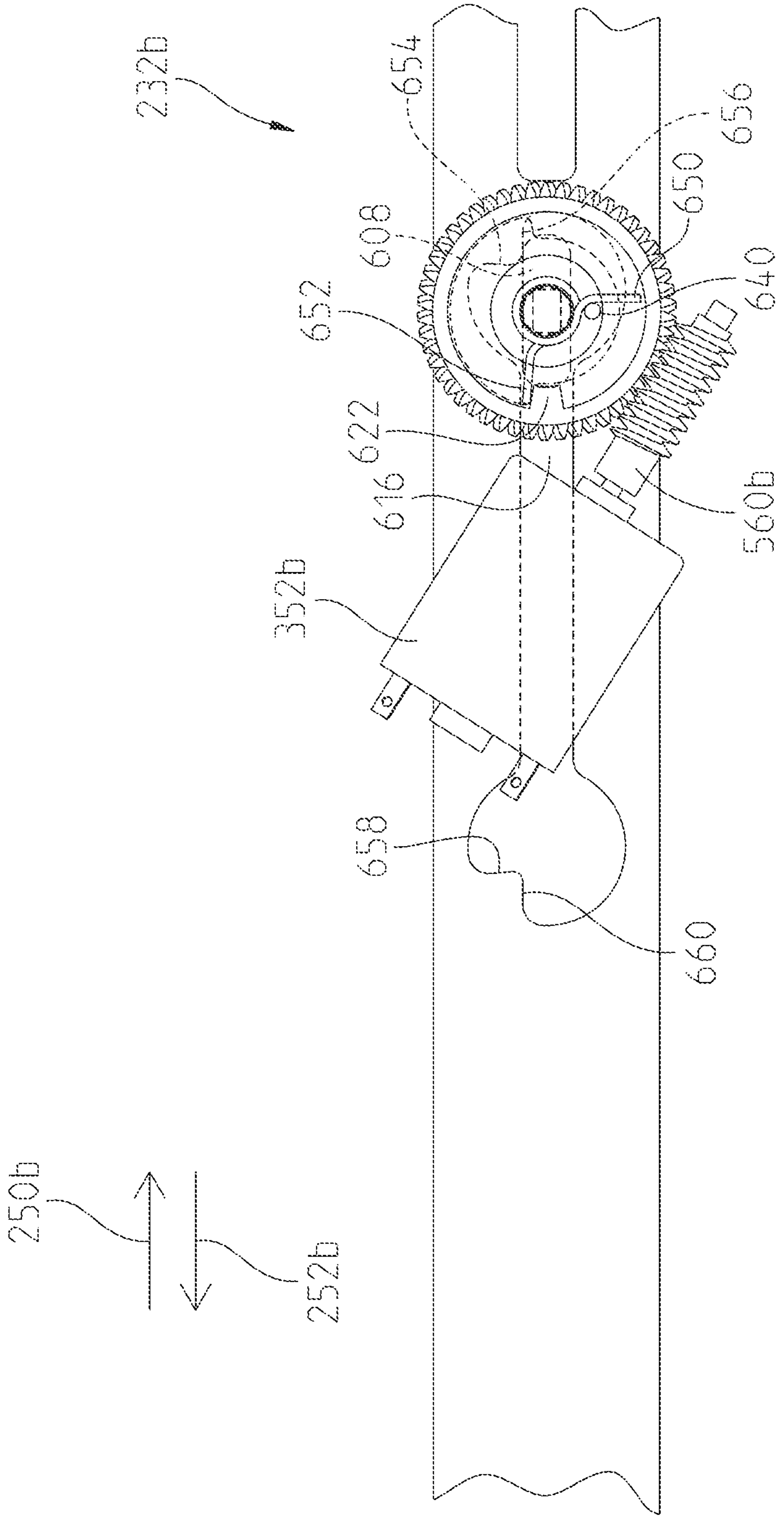

With the spring loaded as illustrated in FIG. 48, cam 608 is biased for a further 90° of rotation which is; however, prevented by contact of cam 608 with unlock stop surface 660. With an appropriate credential having been presented and electric motor 352*b* actuated to the position shown in FIG. 48, operator actuatable input 202*b* can be grasped by an operator to laterally actuate bolt 204*b* from the extended position to the retracted position. This actuation begins with movement of slide 232*b* along direction 252*b* from the position showing in FIG. 48 to the position shown in FIG. 49. As shown in FIG. 49, as cam 608 is laterally displaced from abutting contact with unlock stop surface 660, it is transitioned into lateral displacement channel 616 of dumbbell shaped cutout 606, as shown in FIG. 49. In this position, the opposing walls forming lateral displacement channel 616 prohibit rotation of cam 608. Therefore cam 608 travels from the position illustrated in FIG. 48 through the position illustrated in FIGS. 49, 50, and 51 (by actuation of operator actuatable input 202*b*) with torsion spring 634 supplying a biasing force to cam 608. As cam 608 disengages from the walls forming lateral displacement channel 616, this biasing force automatically actuates cam 608 from the position illustrated in FIG. 51 to the position illustrated in FIG. 52, with cam 608 abutting lock stop surface 654 of retraction bulbous end 612 to lock slide 232*b* in the retracted position. In this way, a single actuation of motor 352*b* can be utilized to unlock latch bolt 204*b* to allow its retraction and further to lock latch bolt 204*b* in the retracted position. For lock security, a sensor (not shown) may be utilized to signal that cam 608 has achieved the position illustrated in FIG. 52. From this position, motor 352*b* may be further actuated into the position shown in FIG. 53, with radial protrusion 622 rotated into abutting contact with return stop surfaces 668, 670 of stop plates 626, 628, as shown in FIG. 53.

A valid credential will again be needed to actuate motor 352*b* and allow lock 200*b* to be placed in the locked position, with bolt 204*b* in the extended position. This creates an audit trail of lock 200*b*. With cam 608 and worm wheel 618 positioned as shown in FIG. 53, presentation of a valid credential will activate motor 352*b* to rotate worm wheel 618 from the position shown in FIG. 53, through the position shown in FIG. 52 and finally to a position with cam 608 abutting unlock stop surface 656 of retraction bulbous end 612 and with a 90° spring preload caused by rotation of worm wheel 618 against torsion spring arm 650. While this position is not illustrated, it mirrors the position shown in FIG. 48. From this position, operator actuatable input 202*b* can be utilized to extend bolt 204*b* until cam 608 occupies extension bulbous end 614 and the biasing force of torsion spring 634 causes cam 608 to be positioned in abutting contact with lock stop surface 658. As with retraction of bolt 204*b*, a sensor may be utilized to signal full extension of bolt 204*b* and thereafter actuate motor 352*b* into the position illustrated in FIG. 45, with radial protrusion 622 abutting lock stop surfaces 662 and 664 and cam 608 fully constrained from a rotation in either direction about longitudinal axis 646 of worm wheel 618. Spring 674 (FIGS. 43 and 44) may be utilized to bias bolt 204*b* into an extended position similar to the biasing arrangements described above with respect to locks 200, 200*a*.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A storage area, comprising:

a door; and a lock, comprising:

a blocker positioned atop a front side of the door, the blocker moveable along a first direction between an extended position, locking the door, and a retracted position, unlocking the door;

a blocker actuator operable to receive a user input motion along the first direction to actuate the blocker between the extended position and the retracted position;

an electronic controller operatively coupled to the lock and actuatable to selectively block movement of the blocker actuator;

an input device, the electronic controller actuatable by the input device;

a retainer, selectively rotatable to a blocking position to block the blocker actuator from actuating the blocker and selectively rotatable to an unblocking position to allow the blocker actuator to actuate the blocker;

a retainer blocker operable to selectively cooperate with the retainer to maintain the retainer in the blocking position to block the blocker actuator from actuating the blocker, the electronic controller operatively coupled to the retainer blocker and actuatable to position the retainer blocker to cooperate with the retainer to maintain the retainer in the blocking position, the retainer blocker comprising at least one stop rotatable into a stop position preventing a rotation of the retainer;

a worm wheel carrying the at least one stop;

a motor; and a worm screw rotatable by the motor, the worm screw intermeshed with the worm wheel whereby energization of the motor actuates the at least one stop.

2. The storage area of claim 1, wherein the lock further comprises at least one stop surface presented by the blocker actuator, in the stop position, the retainer is trapped against rotation between the at least one stop and the at least one stop surface.

3. A storage area, comprising:

a door; and a lock, comprising:

a blocker positioned atop a front side of the door, the blocker moveable along a first direction between an extended position, locking the door, and a retracted position, unlocking the door;

a blocker actuator operable to receive a user input motion along the first direction to actuate the blocker between the extended position and the retracted position;

an electronic controller operatively coupled to the lock and actuatable to selectively block movement of the blocker actuator;

an input device, the electronic controller actuatable by the input device;

a retainer, selectively positionable to a blocking position to block the blocker actuator from actuating the blocker and selectively positionable to an unblocking position to allow the blocker actuator to actuate the blocker; and a retainer blocker operable to selectively cooperate with the retainer to maintain the retainer in the blocking position to block the blocker actuator from actuating the blocker, the electronic controller operatively coupled to the retainer blocker and actuatable to position the retainer blocker to cooperate with the retainer to maintain the retainer in the blocking position, wherein the retainer comprises a cam, wherein the retainer blocker comprises a worm wheel having a radial protrusion positionable to maintain the retainer in the blocking position to block the blocker actuator from actuating the blocker.

4. The storage area of claim 3, wherein the worm wheel includes an open center and the radial protrusion comprises a radially inward protrusion.

5. The storage area of claim 3, wherein the lock further comprises a biasing element, the biasing element selectively biasing the cam to selectively position the retainer between the blocking position and the unblocking position.

6. The storage area of claim 5, wherein the biasing element comprises a spring and the lock further comprises a moveable spring member, the moveable spring member moveable between a first position, corresponding to a neutral position in which the spring cooperates with the moveable spring member to position the retainer.

7. A lock, comprising:

a blocker;

a blocker actuator operable to selectively actuate the blocker;

a retainer selectively rotatable to a blocking position to block the blocker actuator from actuating the blocker and selectively rotatable to an unblocking position to allow the blocker actuator to actuate the blocker;

a retainer blocker operable to selectively cooperate with the retainer to maintain the retainer in the blocking position to block the blocker actuator from actuating the blocker, the retainer blocker comprising at least one stop rotatable into a stop position preventing a rotation of the retainer;

a worm wheel carrying the at least one stop;

a motor; and a worm screw rotatable by the motor, the worm screw intermeshed with the worm wheel whereby energization of the motor actuates the at least one stop.

8. The lock of claim 7, further comprising at least one stop surface presented by the blocker actuator, in the stop position, the retainer is trapped against rotation between the at least one stop and the at least one stop surface.

9. A storage area, comprising:

a door; and a lock, comprising:

a blocker positioned atop a front side of the door, the blocker moveable along a first direction between an extended position, locking the door, and a retracted position, unlocking the door;

a blocker actuator operable to receive a user input motion along the first direction to actuate the blocker between the extended position and the retracted position;

an electronic controller operatively coupled to the lock and actuatable to selectively block movement of the blocker actuator;

an input device, the electronic controller actuatable by the input device;

a retainer, selectively rotatable to a blocking position to block the blocker actuator from actuating the blocker and selectively rotatable to an unblocking position to allow the blocker actuator to actuate the blocker;

a retainer blocker operable to selectively cooperate with the retainer to maintain the retainer in the blocking position to block the blocker actuator from actuating the blocker, the electronic controller operatively coupled to the retainer blocker and actuatable to position the retainer blocker to cooperate with the retainer to maintain the retainer in the blocking position, the retainer blocker comprising at least one stop rotatable into a stop position preventing a rotation of the retainer; and a biasing element positionable to bias the retainer into the blocking position and further positionable to bias the retainer into the unblocking position, the at least one stop defining a reference for the biasing element.

10. The storage area of claim 9, wherein the biasing element comprises a torsion spring.

11. A lock, comprising:

a blocker;

a blocker actuator operable to selectively actuate the blocker;

a retainer selectively rotatable to a blocking position to block the blocker actuator from actuating the blocker and selectively rotatable to an unblocking position to allow the blocker actuator to actuate the blocker;

a retainer blocker operable to selectively cooperate with the retainer to maintain the retainer in the blocking position to block the blocker actuator from actuating the blocker, the retainer blocker comprising at least one stop rotatable into a stop position preventing a rotation of the retainer; and a biasing element positionable to bias the retainer into the blocking position and further positionable to bias the retainer into the unblocking position, the at least one stop defining a reference for the biasing element.

12. The lock of claim 11, wherein the biasing element comprises a torsion spring.

* * * * *